US012785907B2

(12) United States Patent
Cirik et al.

(10) Patent No.: US 12,785,907 B2
(45) Date of Patent: Nov. 3, 2026

(54) MULTIPLE ACTIVATED UNIFIED BEAMS

(71) Applicant: Comcast Cable Communications, LLC, Philadelphia, PA (US)

(72) Inventors: Ali Cagatay Cirik, Chantilly, VA (US); Hua Zhou, Vienna, VA (US); Esmael Hejazi Dinan, McLean, VA (US); Hyoungsuk Jeon, Centreville, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 507 days.

(21) Appl. No.: 18/448,639

(22) Filed: Aug. 11, 2023

(65) Prior Publication Data

US 2024/0056268 A1 Feb. 15, 2024

Related U.S. Application Data

(60) Provisional application No. 63/397,317, filed on Aug. 11, 2022.

(51) Int. Cl.
*H04L 5/00* (2006.01)
*H04W 52/36* (2009.01)

(52) U.S. Cl.
CPC ......... *H04L 5/0091* (2013.01); *H04W 52/365* (2013.01)

(58) Field of Classification Search
None
See application file for complete search history.

(56) References Cited

U.S. PATENT DOCUMENTS

| | | | | |
|---|---|---|---|---|
| 2021/0045070 | A1 | 2/2021 | Yi et al. | |
| 2021/0377876 | A1 | 12/2021 | Jeon et al. | |
| 2022/0030620 | A1 | 1/2022 | Cirik et al. | |
| 2022/0217653 | A1 | 7/2022 | Kung et al. | |
| 2022/0225360 | A1 | 7/2022 | Yi et al. | |
| 2022/0322246 | A1 | 10/2022 | Cirik et al. | |
| 2022/0361117 | A1 | 11/2022 | Jeon et al. | |
| 2024/0179633 | A1 * | 5/2024 | Zhang | H04W 52/146 |
| 2024/0224200 | A1 * | 7/2024 | Matsumura | H04W 72/1268 |
| 2025/0031155 | A1 * | 1/2025 | Yuan | H04W 52/365 |

(Continued)

FOREIGN PATENT DOCUMENTS

| | | | |
|---|---|---|---|
| CA | 3034014 | A1 | 8/2019 |
| WO | 2020168296 | A1 | 8/2020 |
| WO | 2021142432 | A1 | 7/2021 |

(Continued)

OTHER PUBLICATIONS

3GPP TS 38.213 V17.2.0 (Jun. 2022) 3rd Generation Partnership Project; Technical Specification Group Radio Access Network; NR; Physical layer procedures for control (Release 17).

(Continued)

*Primary Examiner* — Robert M Morlan
(74) *Attorney, Agent, or Firm* — Banner & Witcoff, Ltd.

(57) ABSTRACT

Multiple transmission reception points (multi-TRP) and single TRP modes may be enabled in a wireless device. By activating one or more transmission configuration indicator (TCI) states, a base station may dynamically switch the wireless device between the Multi-TRP and single TRP modes. A quantity of power headroom values in a power headroom report (PHR), sent to the base station, may be based on the quantity of active TCI states.

24 Claims, 24 Drawing Sheets

(56) References Cited

U.S. PATENT DOCUMENTS

2025/0193807 A1* 6/2025 Ling .................... H04L 5/0091

FOREIGN PATENT DOCUMENTS

| | | | |
|---|---|---|---|
| WO | 2021257951 | A1 | 12/2021 |
| WO | 2022026788 | A1 | 2/2022 |
| WO | 2022/046717 | A1 | 3/2022 |
| WO | 2022132635 | A1 | 6/2022 |
| WO | 2022140563 | A1 | 6/2022 |
| WO | 2022151337 | A1 | 7/2022 |
| WO | 2022212250 | A1 | 10/2022 |
| WO | 2022232103 | A1 | 11/2022 |

OTHER PUBLICATIONS

3GPP TS 38.214 V17.2.0 (Jun. 2022) 3rd Generation Partnership Project; Technical Specification Group Radio Access Network; NR; Physical layer procedures for data (Release 17).

3GPP TS 38.300 V17.1.0 (Jun. 2022), 3rd Generation Partnership Project; Technical Specification Group Radio Access Network; NR; NR and NG-RAN Overall Description; Stage 2 (Release 17).

3GPP TS 38.321 V17.1.0 (Jun. 2022), 3rd Generation Partnership Project; Technical Specification Group Radio Access Network; NR; Medium Access Control (MAC) protocol specification (Release 17).

3GPP TS 38.331 V17.1.0 (Jun. 2022), 3rd Generation Partnership Project; Technical Specification Group Radio Access Network; NR; Radio Resource Control (RRC) protocol specification (Release 17).

R1-2205130 3GPP TSG RAN WG1 Meeting #109-e, e-Meeting, May 9-20, 2022, Source: Moderator (ZTE), Title: Moderator Summary for Rel. 17 NR FeMIMO maintenance: Item 1: multi-beam.

R1-2205315 3GPP TSG RAN WG1 Meeting #109-e, e-Meeting, May 9-20, 2022, Source: Moderator (ZTE), Title: Moderator Summary #0 for Maintenance on Rel-17 Multi-Beam.

R1-2205422 3GPP TSG RAN WG1 Meeting #109-e, e-Meeting, May 9-20, 2022, Source: Moderator (ZTE), Title: Moderator Summary #1 for Maintenance on Rel-17 Multi-Beam.

R1-2205631 3GPP TSG RAN WG1 Meeting #109-e, e-Meeting, May 9-20, 2022, Source: Moderator (ZTE), Title: Moderator Summary #2 for Maintenance on Rel-17 Multi-Beam.

R2-2202557 3GPP TSG-RAN WG2 Meeting #117, Electronic, Feb. 21-Mar. 3, 2022, Source: Apple, Title: MAC impact of FeMIMO.

R2-2202670 3GPP TSG-RAN WG2 #117-e, Electronic Meeting, Feb. 21-Mar. 3, 2022, Source: Intel Corporation, Title: Remaining issues on MAC Ces.

R2-2202851 3GPP TSG-RAN WG2 Meeting #117 electronic, Online, Feb. 21-Mar. 3, 2022, Source: ASUSTek, Title: Discussion on Power Headroom Reporting for mTRP PUSCH repetition.

R2-2202852 3GPP TSG-RAN WG2 Meeting #117 electronic, Online, Feb. 21-Mar. 3, 2022, Source: ASUSTek, Title: Discussion on MAC CE design regarding separate and joint TCI state.

R2-2202928 3GPP TSG-RAN WG2 Meeting #117-e, Electronic Meeting, Feb. 21-Feb. 3, 2022, Source: Samsung, Title: Discussions on PHR enhancements for mTRP PUSCH repetition.

R2-2202958 3GPP TSG-RAN WG2 Meeting #117 electronic, Online, Feb. 21-Mar. 3, 2022, Source: Qualcomm Incorporated, Title: Remaining issues on MAC and MIMO MAC CES.

R2-2203044 3GPP TSG-RAN WG2 Meeting #117 electronic, Online, Feb. 2022, Source: Ericsson, Title: MAC CE impacts.

R2-2203093 3GPP TSG-RAN2#117-e, Online, Feb. 21-Mar. 3, 2022, Source: LG Electronics Inc., Title: Remaining issues on MAC.

R2-2203247 3GPP TSG-RAN2#117-e, Electronic, Feb. 21-Mar. 4, 2022, Source: ZTE Corporation, Sanechips, Title: Consideration on new PHR For mTRP PUSCH repetition.

R2-2203269 3GPP TSG-RAN WG2 Meeting #117 Electronic, Elbonia, Feb. 21-Mar. 3, 2022, Source: Nokia, Nokia Shanghai Bell, Title: PHR reporting for FeMIMO.

R2-2203382 3GPP TSG-RAN WG2 Meeting #117, Electronic, Feb. 21-Mar. 3, 2022, Source: Huawei, HiSilicon, Title: FeMIMO MAC open issues.

R2-2203426 3GPP TSG-RAN WG2 Meeting #117-e, e-Meeting, Feb. 21-Mar. 3, 2022, Source: InterDigital, Inc., Title: Enhancements to PHR reporting with mTRP.

R2-2203709 3GPP TSG-RAN WG2 #117, Online, Feb. 21-Mar. 3, 2022, Source: Samsung, Title: [Pre117] [016] [feMIMO] Summary of 8.17.4.2 MAC (Samsung).

R2-2205205 3GPP TSG-RAN WG2 Meeting #118 electronic, E-Meeting, May 9-20, 2022, Source: Samsung, Title: Considerations on Enhanced PHR for multiple TRP MAC CE.

R2-2205416 GPP TSG-RAN WG2 Meeting #118-e, Online, May 9-May 20, 2022, Source: ZTE Corporation, Title: CR on 38.331 for PHR-Config.

R2-2207570 3GPP TSG-RAN2#119-e , E-Meeting, Aug. 17-Aug. 26, 2022, Source: LG Electronics, Title: Correction on PH selection.

R2-2208018 3GPP TSG-RAN WG2 Meeting #119 Electronic, Elbonia, Aug. 17-26, 2022, Source: Nokia, Nokia Shanghai Bell, Title: Remaining issues on PHR for FeMIMO.

Jan. 4, 2024—European Search Report—EP App. No. 23191098.5.

R2-2208114 3GPP TSG RAN WG2 #119, e-Meeting, Aug. 17-29, 2022, Source: Qualcomm Incorporated, Title: Remaining issues of feMIMO MAC.

R2-2205676 3GPP TSG RAN WG2 #118, e-Meeting, May 9-20, 2022, Source: Apple, Title: mTRP PHR report procedure.

* cited by examiner

```
ServingCellConfig ::=          SEQUENCE {
...
MIMOParam ::= SEQUENCE {
additionalPCI-ToAddModList          SEQUENCE (SIZE(1..maxNrofAdditionalPCI)) OF SSB-MTC-AdditionalPCI
additionalPCI-ToReleaseList         SEQUENCE (SIZE(1..maxNrofAdditionalPCI)) OF AdditionalPCIIndex
unifiedTCI-StateType                ENUMERATED {separate, joint}
uplink-PowerControlToAddModList     SEQUENCE (SIZE (1..maxUL-TCI)) OF Uplink-powerControl
uplink-PowerControlToReleaseList    SEQUENCE (SIZE (1..maxUL-TCI)) OF Uplink-powerControlId
sfnSchemePDCCH                      ENUMERATED {sfnSchemeA,sfnSchemeB}
sfnSchemePDSCH                      ENUMERATED {sfnSchemeA,sfnSchemeB}
}

SSB-MTC-AdditionalPCI ::=      SEQUENCE {
additionalPCIIndex                  AdditionalPCIIndex,
additionalPCI                       PhysCellId,
...
}

Uplink-powerControl ::=        SEQUENCE {
ul-powercontrolId                   Uplink-powerControlId,
p0AlphaSetforPUSCH                  P0AlphaSet
p0AlphaSetforPUCCH                  P0AlphaSet
p0AlphaSetforSRS                    P0AlphaSet}

P0AlphaSet::=                  SEQUENCE {
p0                                  INTEGER (-16..15)
alpha                               Alpha
closedLoopIndex                     ENUMERATED { i0, i1}
}
```

FIG. 17

MULTIPLE ACTIVATED UNIFIED BEAMS

CROSS-REFERENCE TO RELATED APPLICATIONS

This application claims the benefit of U.S. Provisional Application No. 63/397,317 filed on Aug. 11, 2022. The above-referenced application is hereby incorporated by reference in its entirety.

BACKGROUND

A wireless device receives downlink control information (DCI) from a base station. The wireless device sends power headroom reports based on a quantity of transmission control indicator (TCI) states associated with a cell.

SUMMARY

The following summary presents a simplified summary of certain features. The summary is not an extensive overview and is not intended to identify key or critical elements.

A wireless device may communicate with a base station. The wireless device may determine and send a power headroom report indicating power headroom values. A power headroom value may indicate remaining transmission power for a wireless device. Multiple transmission and reception points (TRPs) may be supported by activating multiple transmission configuration indicator (TCI) states. The wireless device may determine a quantity of power headroom values to calculate for a power headroom report (PHR), based on the quantity of TCI states that are activated. The wireless device may send a single power headroom value, for example, if a single TCI state is activated. Alternatively, the wireless device may send two power headroom values, for example, if two TCI states are activated. Resources may be conserved, for example, by limiting power headroom calculation to a single power headroom value if only a single TCI state is activated.

These and other features and advantages are described in greater detail below.

BRIEF DESCRIPTION OF THE DRAWINGS

Examples of several of the various embodiments of the present disclosure are described herein with reference to the drawings.

FIG. 17 shows an example of MIMO configuration parameters.

DETAILED DESCRIPTION

Figure 1A:
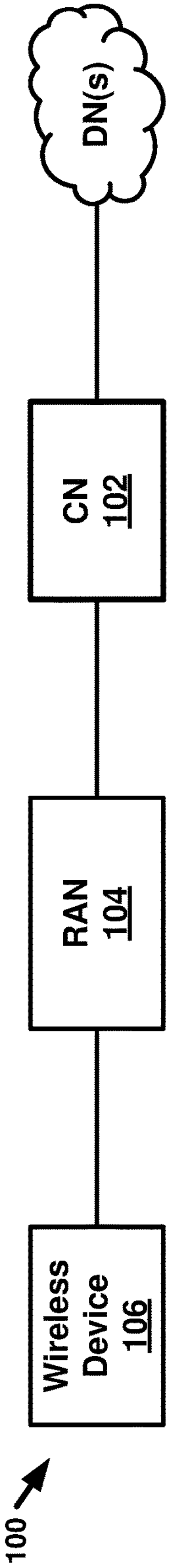
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
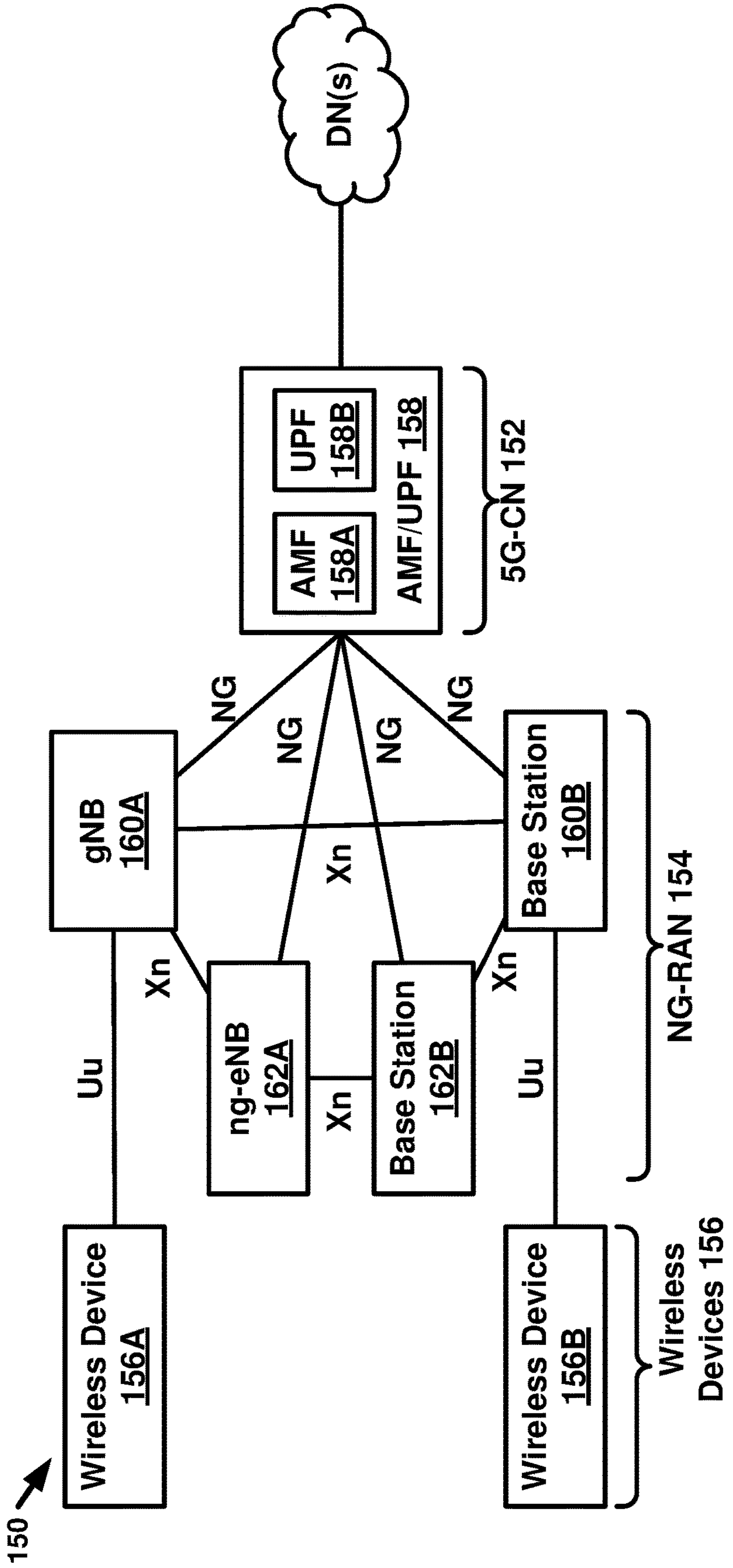

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
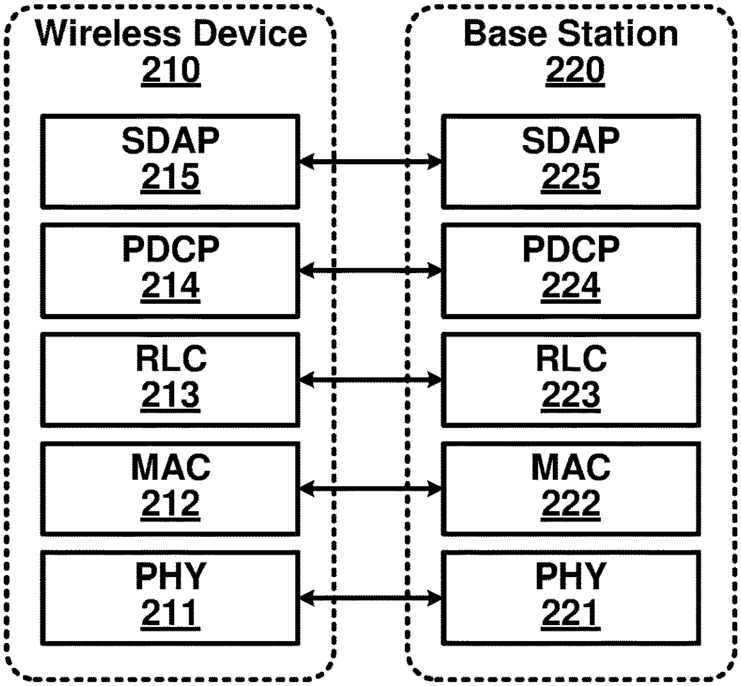
FIG. 2A shows an example user plane.
Figure 2B:
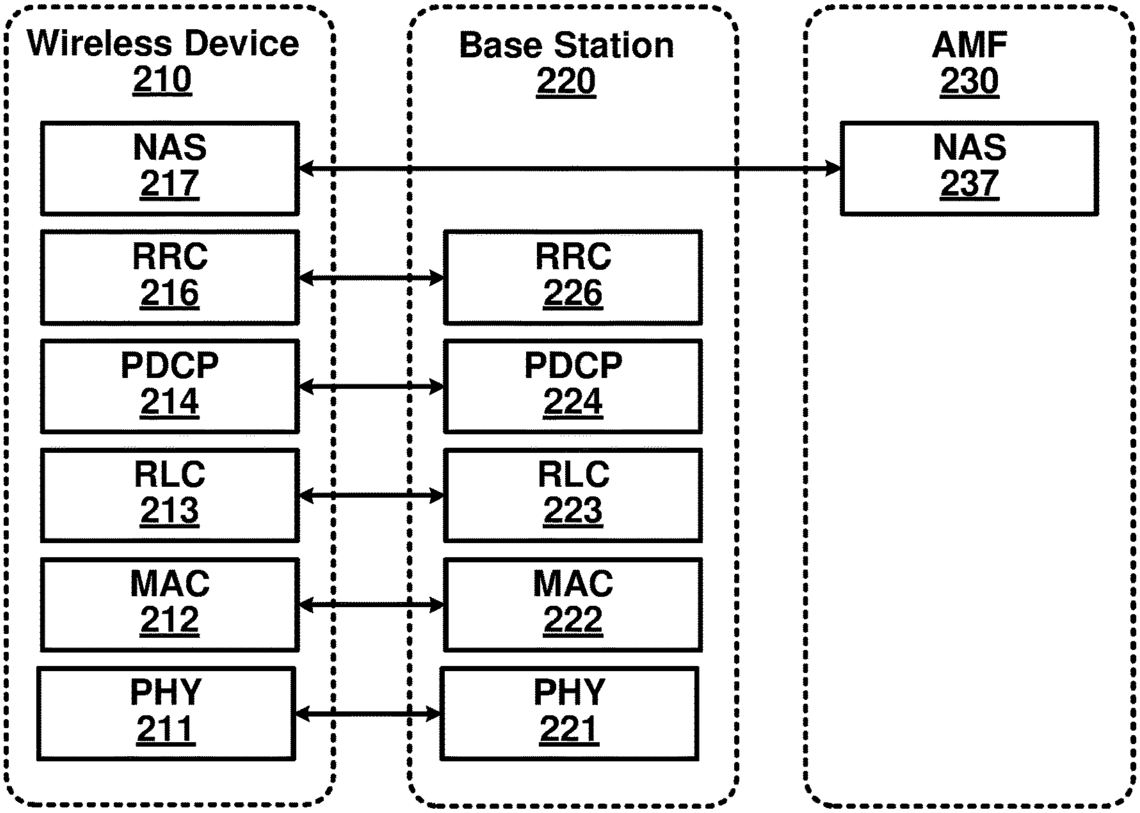
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
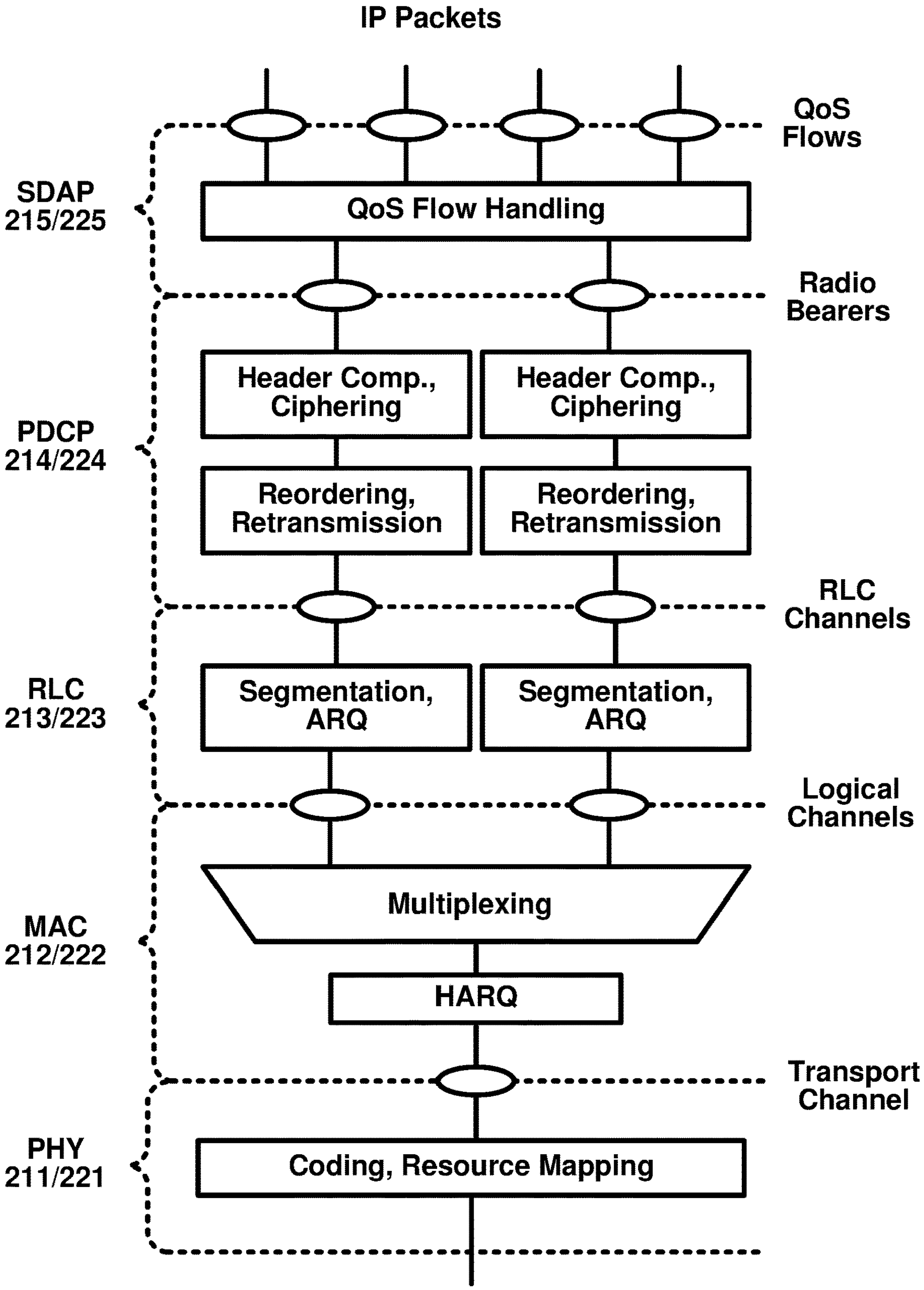
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted (e.g., sent) over the air interface, ciphering/deciphering to prevent unauthorized decoding of data transmitted (e.g., sent) over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MAC s 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4A:
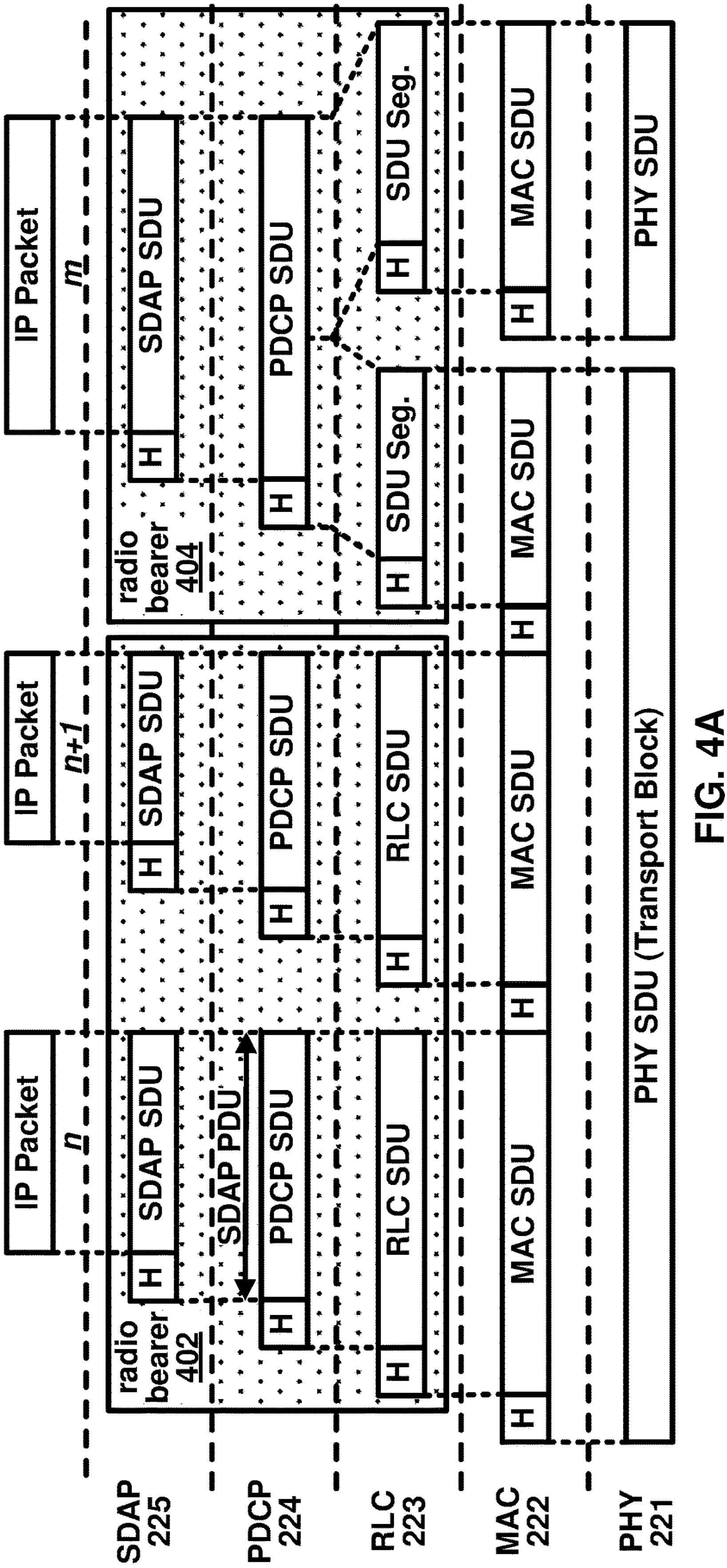
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TB s, for example, based on the uplink data flow via an NR user plane protocol stack. A first quantity of packets (e.g., three or any other quantity) may be determined from a second quantity of TB s (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a quantity/number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

Figure 4B:
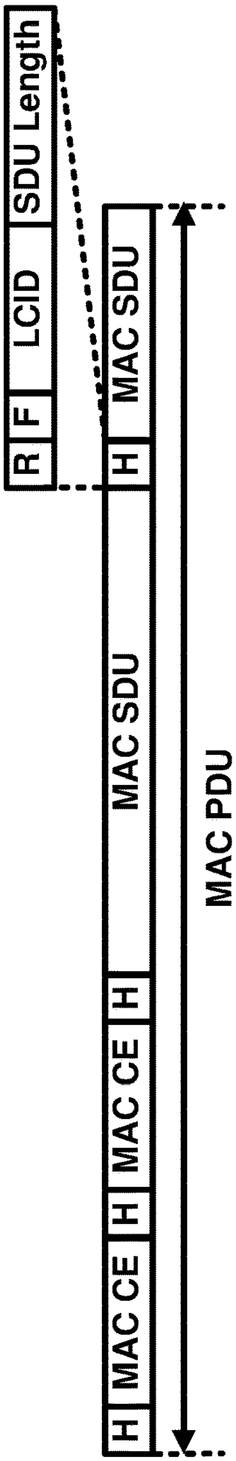
FIG. 4B shows an example format of a Medium Access Control (MAC) subheader in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figures 5A, 5B:
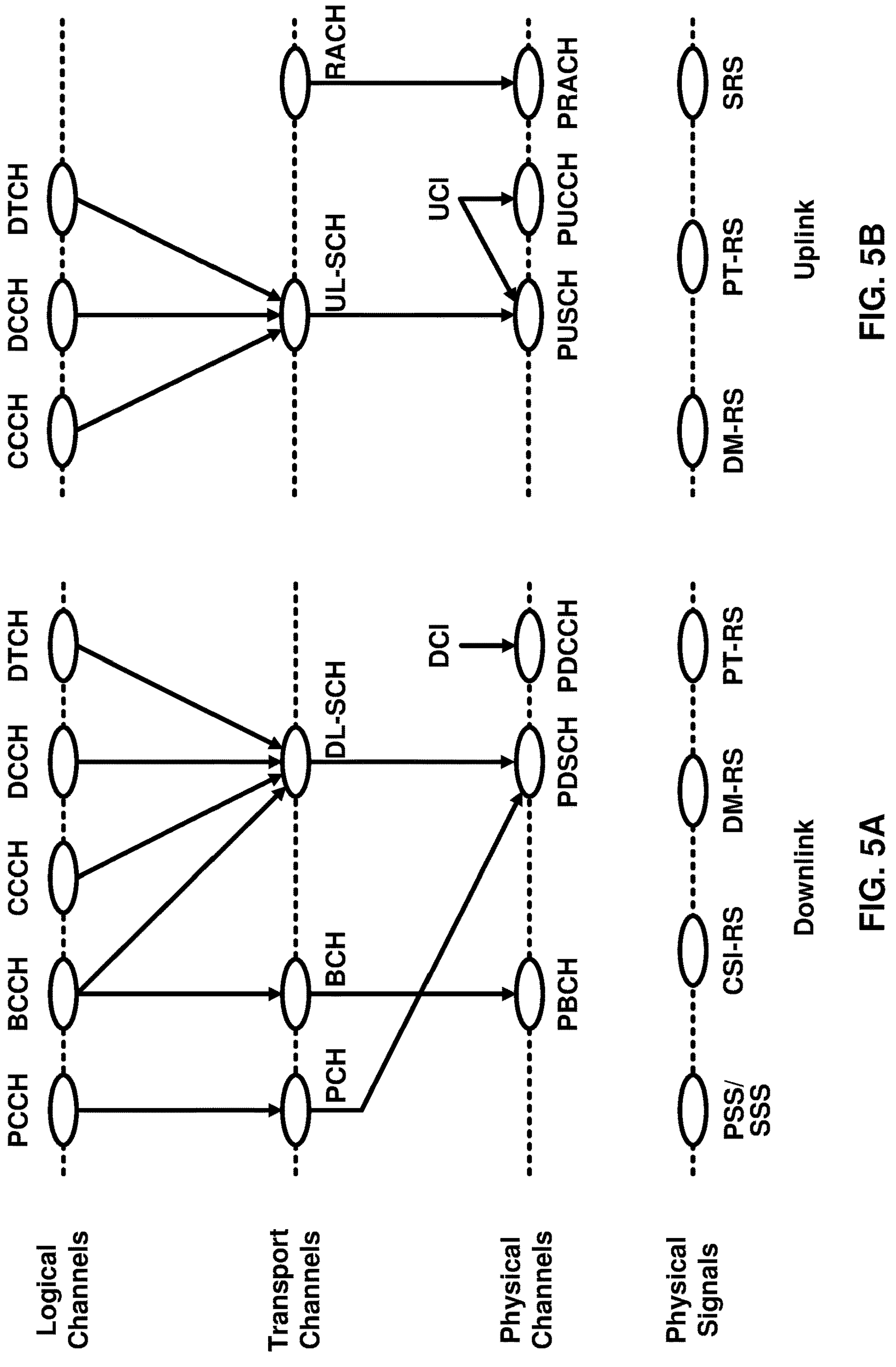
FIG. 5A shows an example mapping for downlink channels.
FIG. 5B shows an example mapping for uplink channels.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
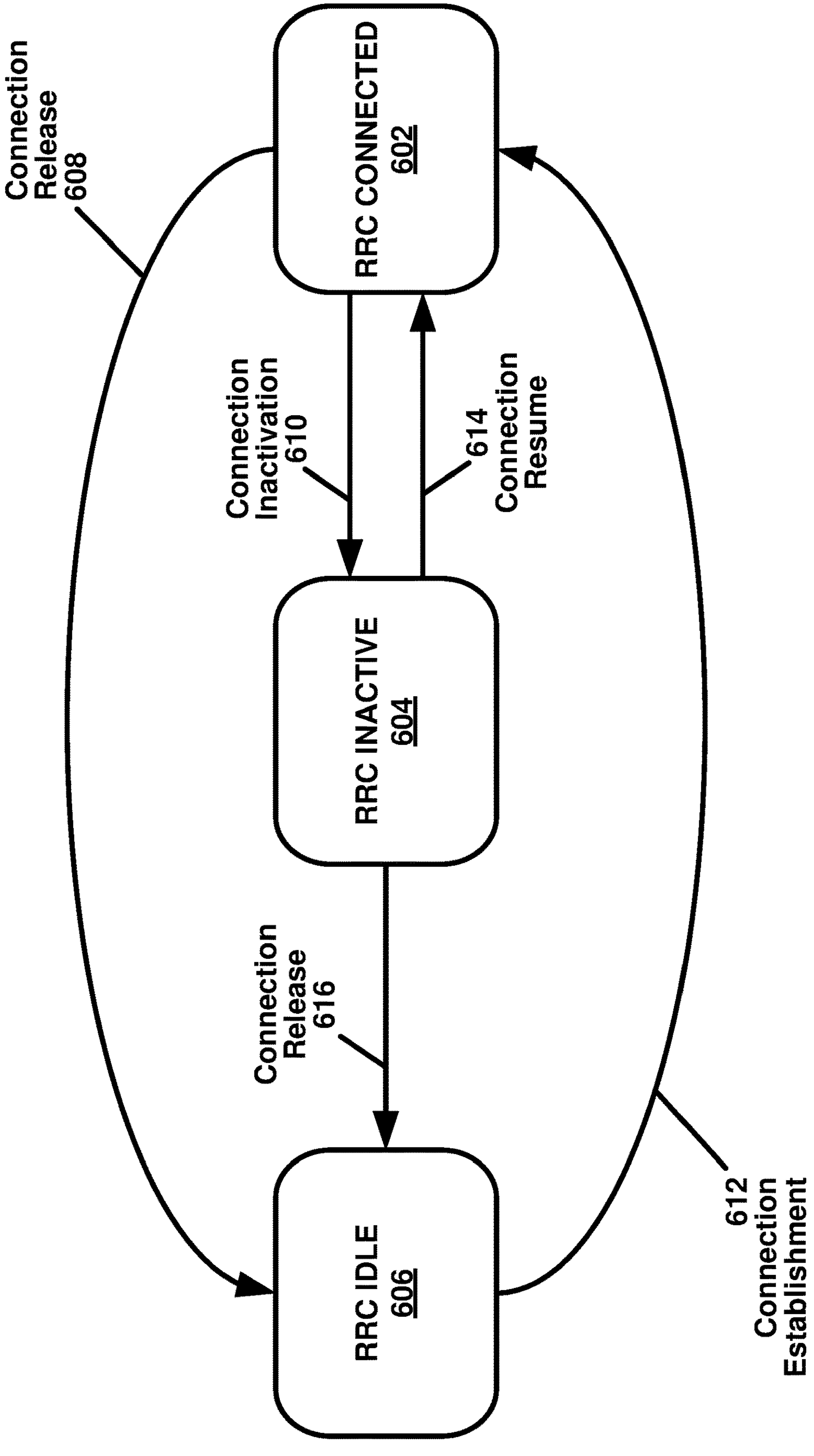
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNB s 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
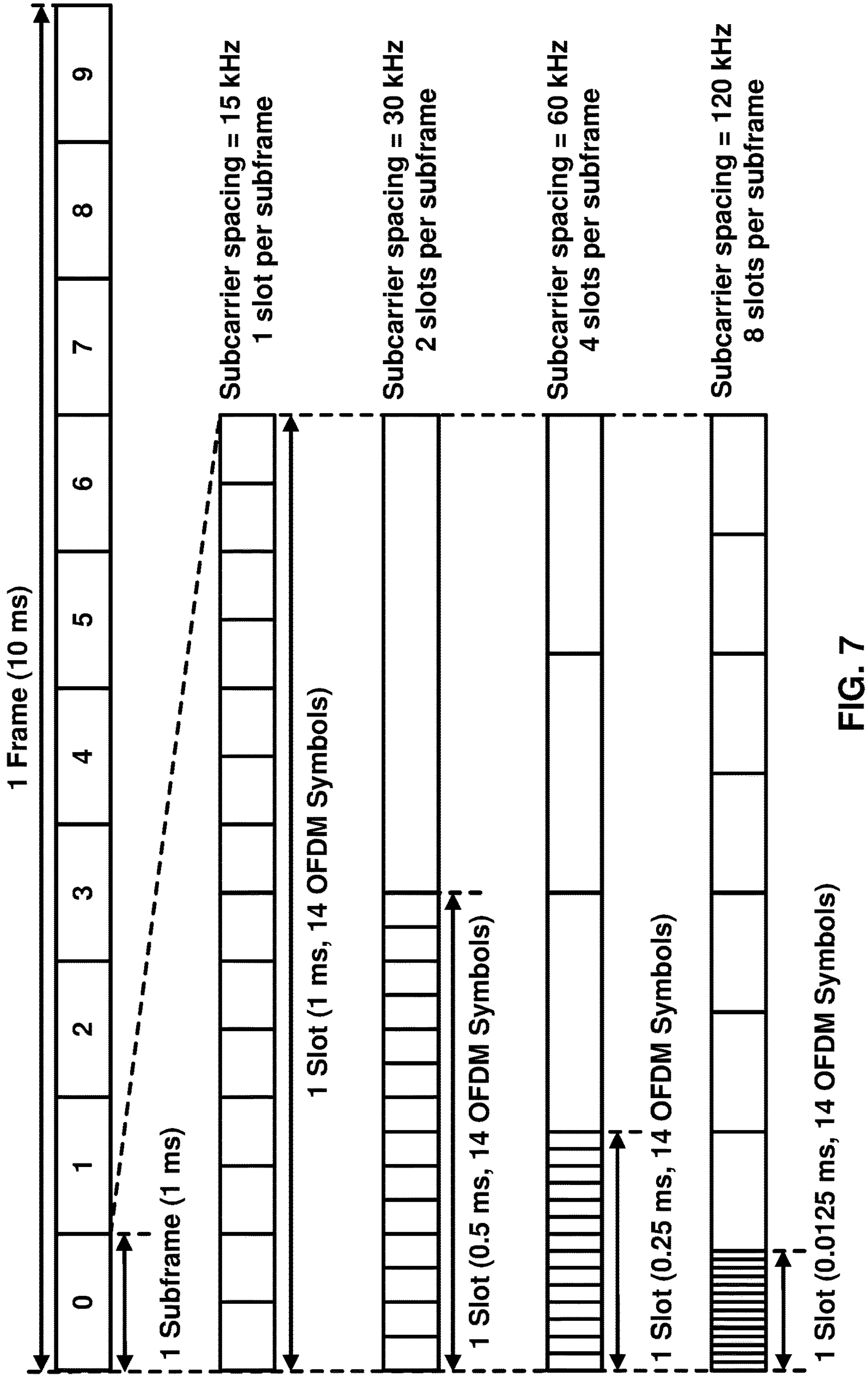
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame quantity/number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other sub carrier spacing/cyclic prefix duration combinations.

A slot may have a fixed quantity/number of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
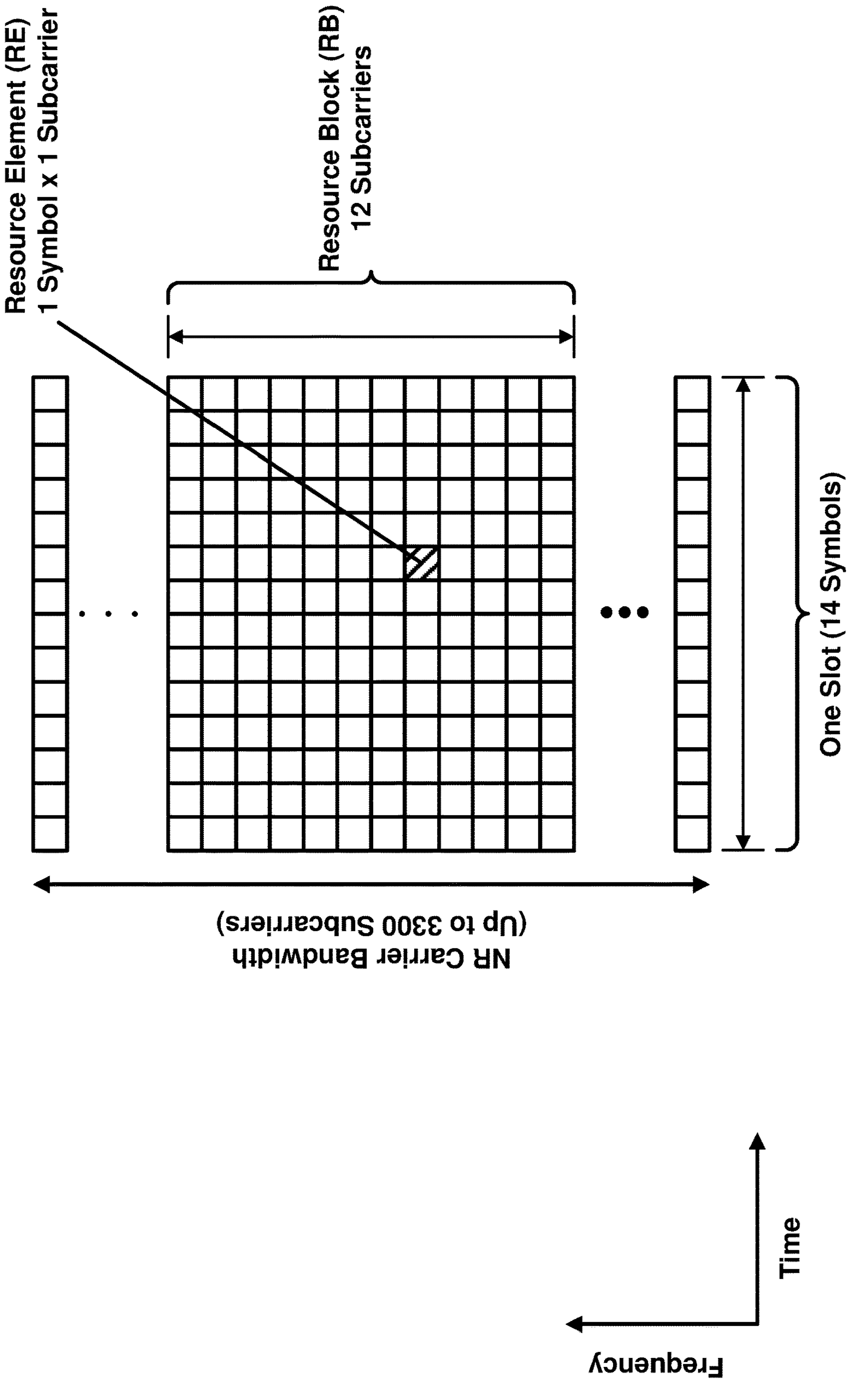
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time.

The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, based on (e.g., after or in response to) receiving DCI indicating the second BWP as an active BWP. A wireless device may switch an active BWP from a first BWP to a second BWP, for example, based on (e.g., after or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
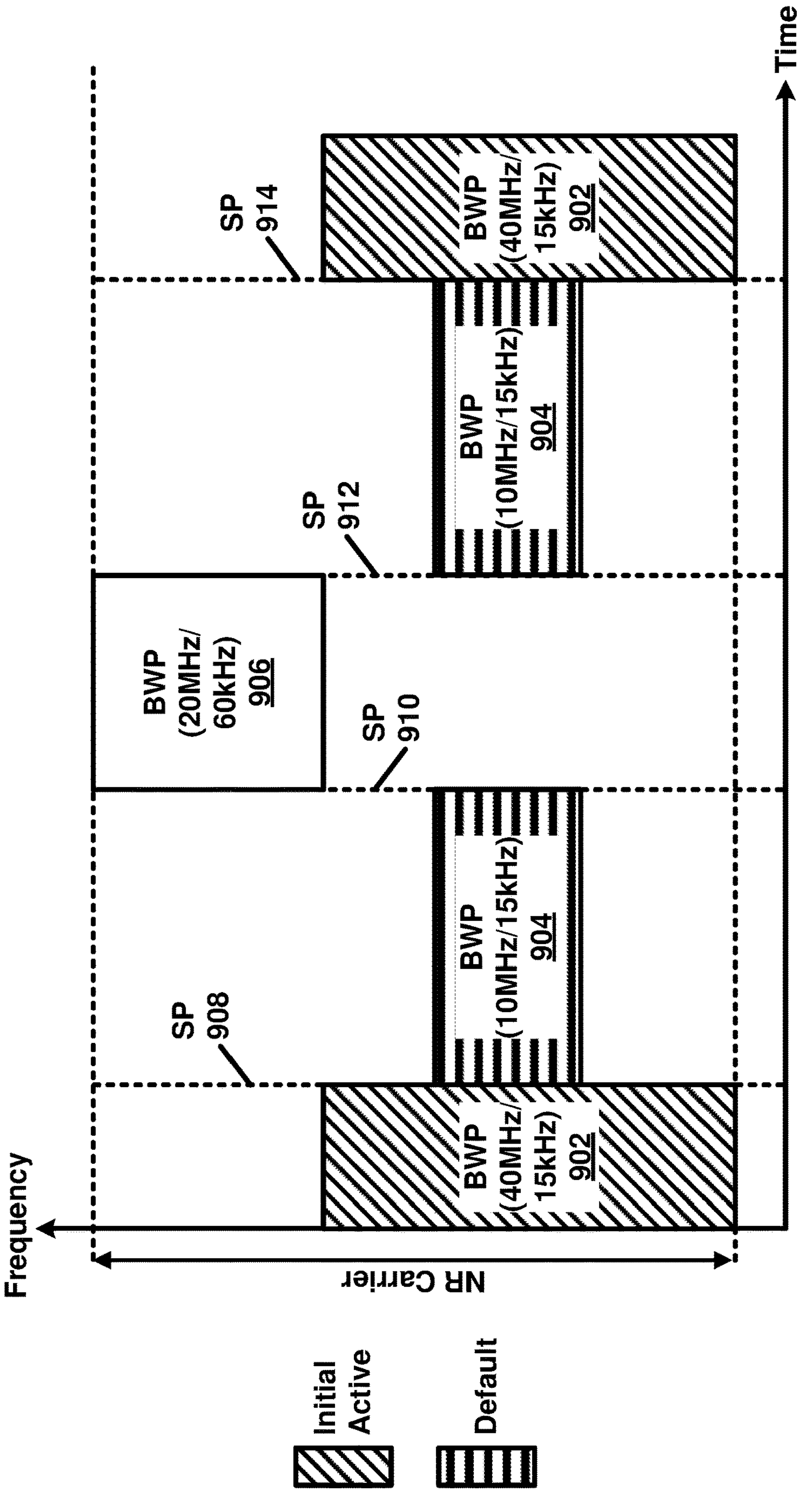
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, based on (e.g., after or in response to) an expiry of a BWP inactivity timer (e.g., indicating switching to the default BWP). The switching at the switching point 908 may occur, for example, based on (e.g., after or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, a based on (e.g., after or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a quantity/number of serving cells for the wireless device (e.g., one serving cell for a CC), for example, if CA is configured/used. The CCs may have multiple configurations in the frequency domain.

Figure 10A:
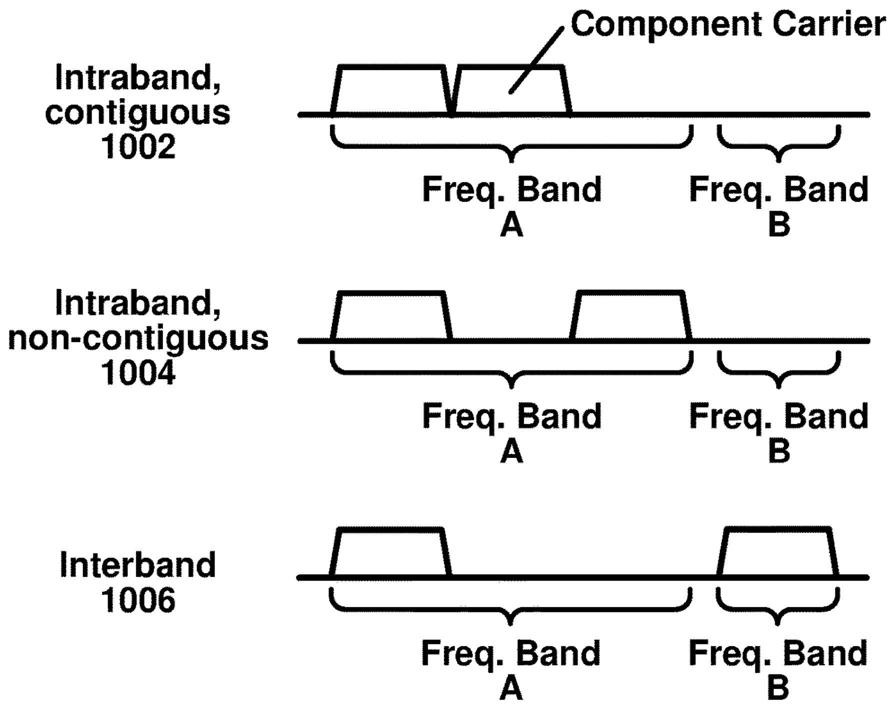
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, based on (e.g., after or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger quantity/number of aggregated downlink CCs, the PUCCH of the PCell may become overloaded. Cells may be divided into multiple PUCCH groups.

Figure 10B:
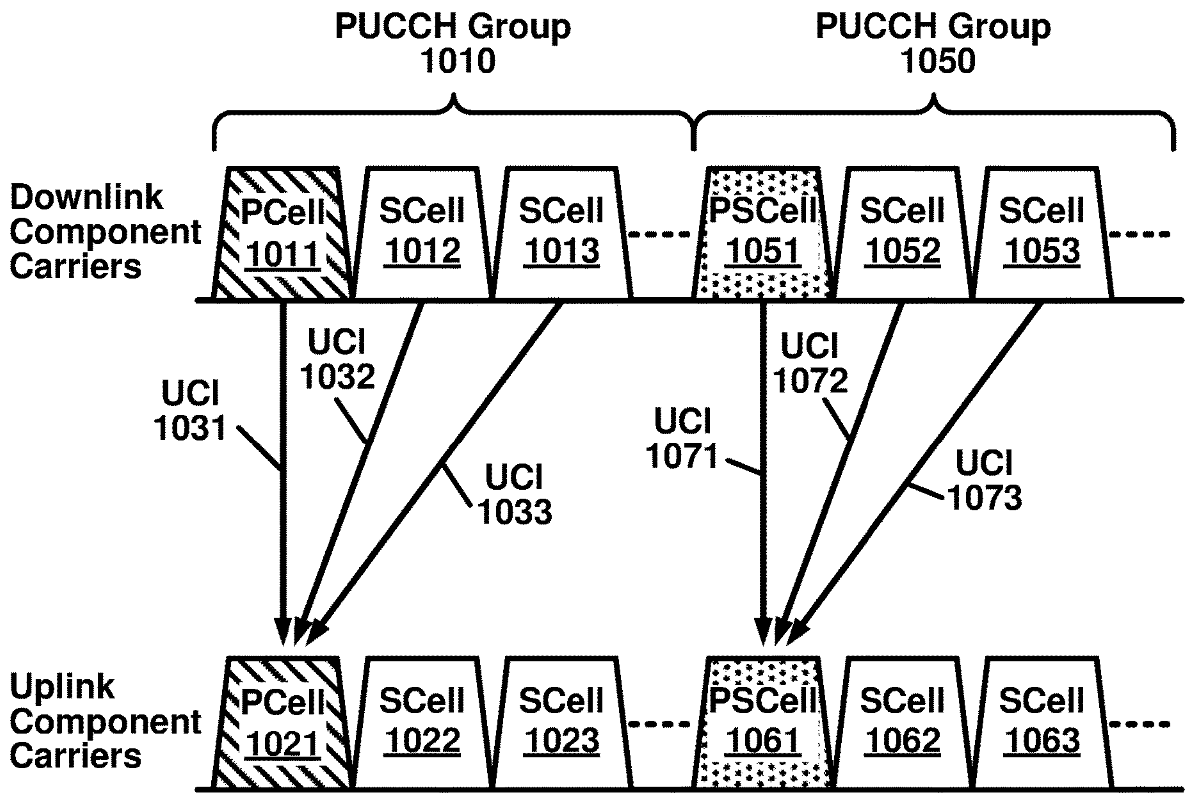
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
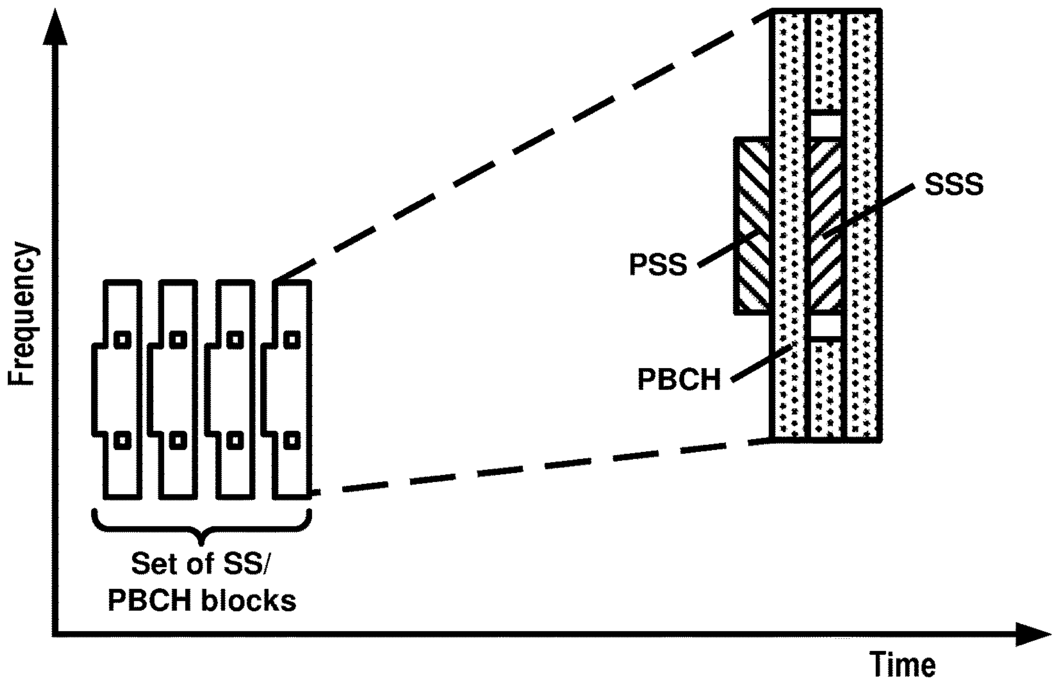
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the quantity/number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RS s for demodulation of the PBCH. The PBCH may comprise an indication of a current system frame quantity/number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/ comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RS s for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RS s may be sent/transmitted by a base station and received/used by a wireless device for a channel estimation. The downlink DM-RS s may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a quantity/number (e.g. a maximum quantity/number) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RS s for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RS s may be configured to send/transmit at one or more symbols of a PUSCH and/or a PUCCH. The base station may semi-statically configure the wireless device with a quantity/number (e.g., the maximum quantity/number) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RS s (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a quantity/number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a quantity/number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread;

a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
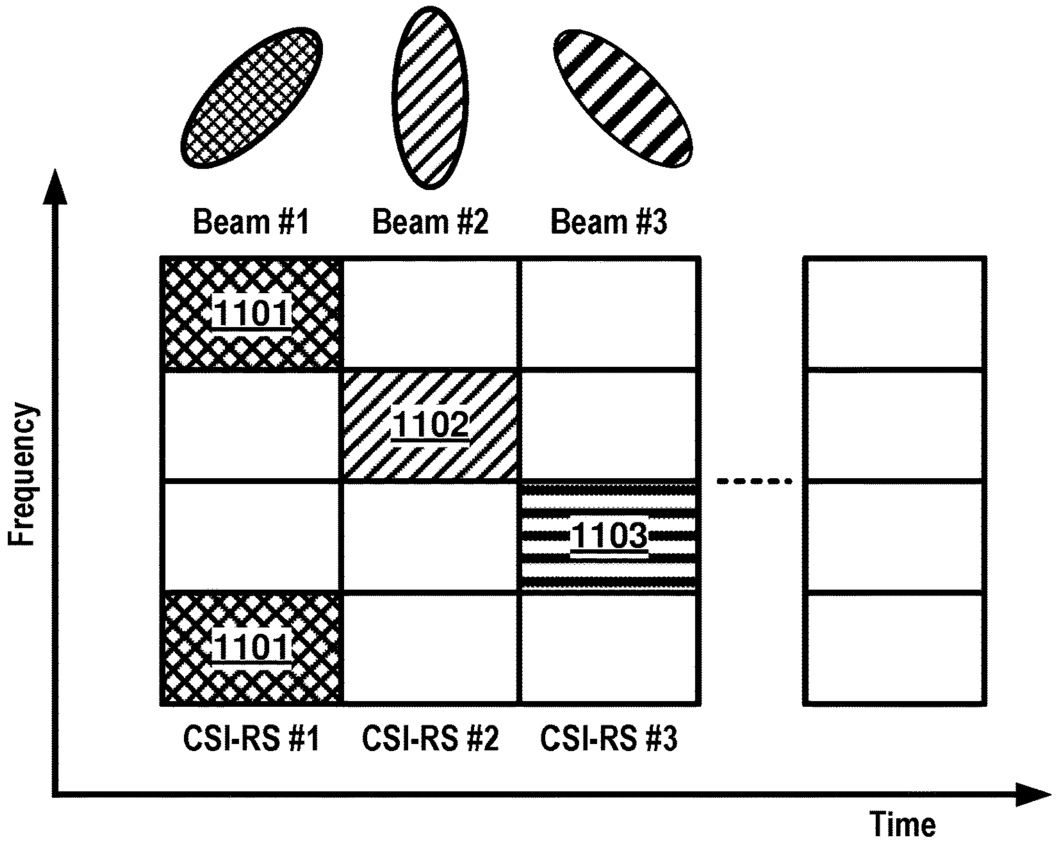
FIG. 11B shows an example mapping of one or more channel state information reference signals (CSI-RSs).

FIG. 11B shows an example mapping of one or more CSI-RSs. The CSI-RS s may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RS s. One or more of parameters may be configured by higher layer signaling (e.g., RRC and/or MAC signaling) for a CSI-RS resource configuration. The one or more of the parameters may comprise at least one of: a CSI-RS resource configuration identity, a quantity/number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RS s 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a quantity/number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

Figure 12A:
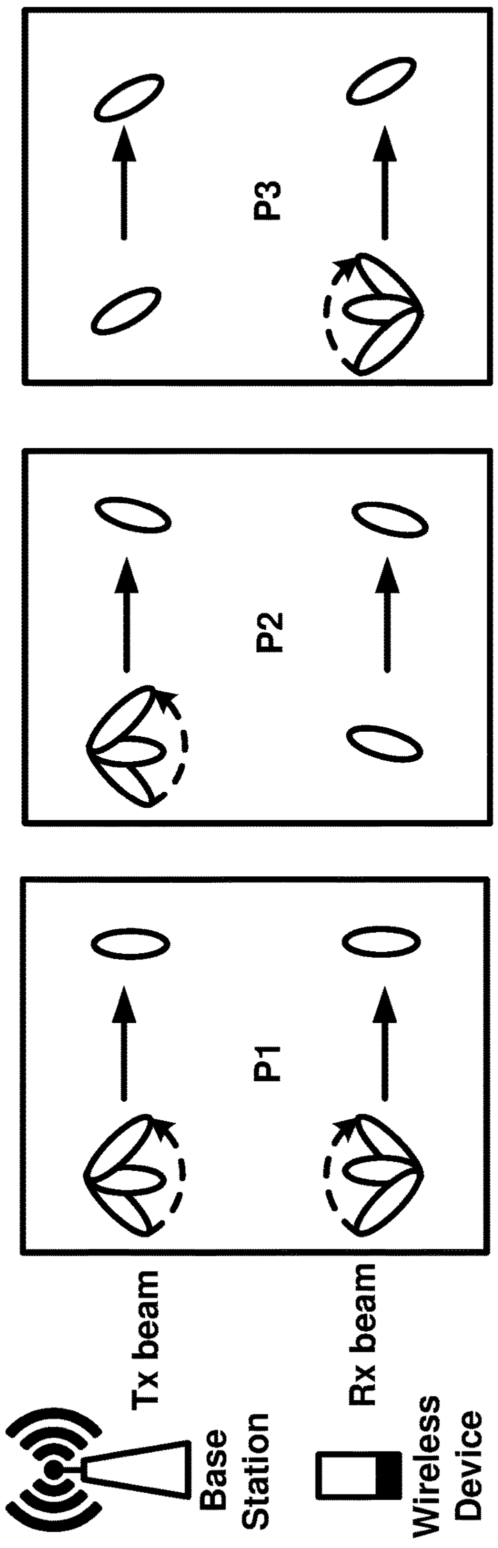
FIG. 12A shows examples of downlink beam management procedures.

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

Figure 12B:
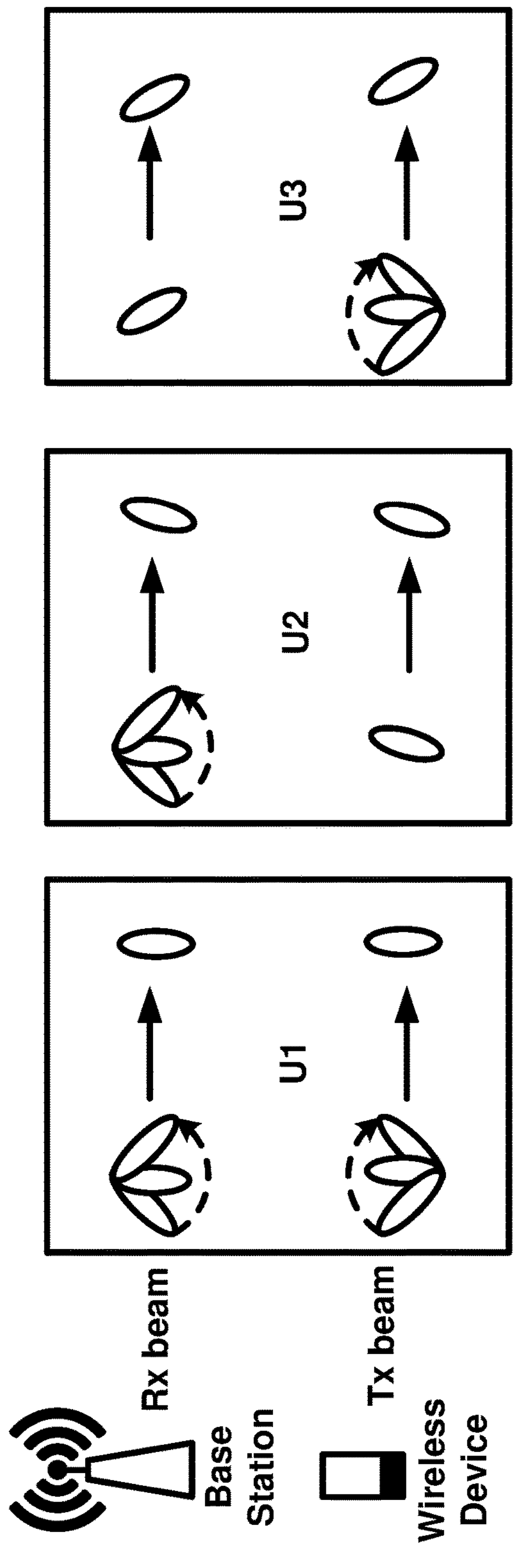
FIG. 12B shows examples of uplink beam management procedures.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the wireless device (e.g., UE) uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RS s) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RS s of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figure 13C:
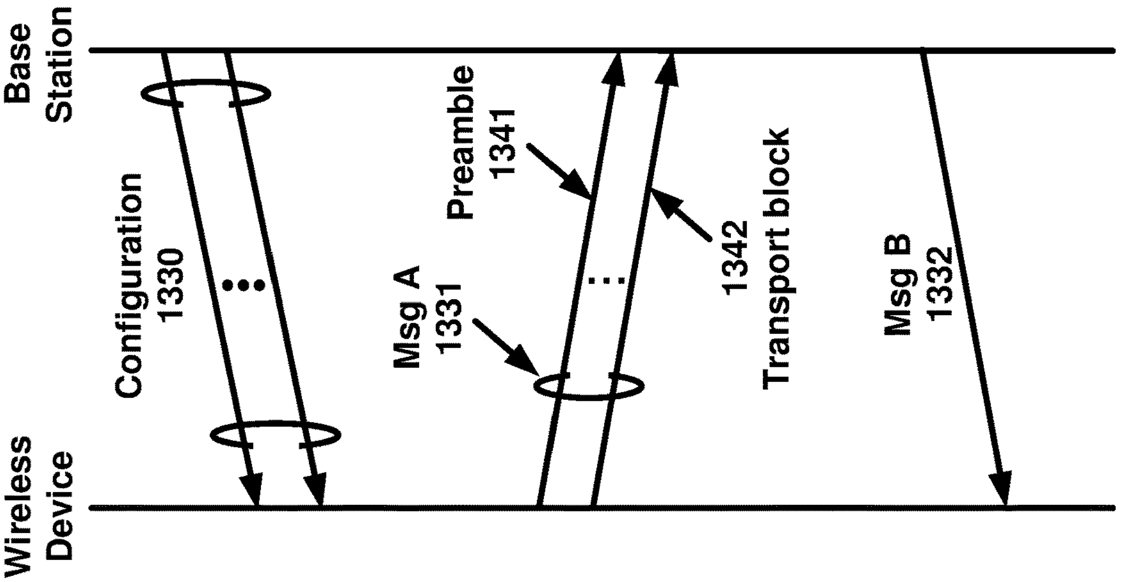
FIG. 13C shows an example two-step random access procedure.
Figure 13B:
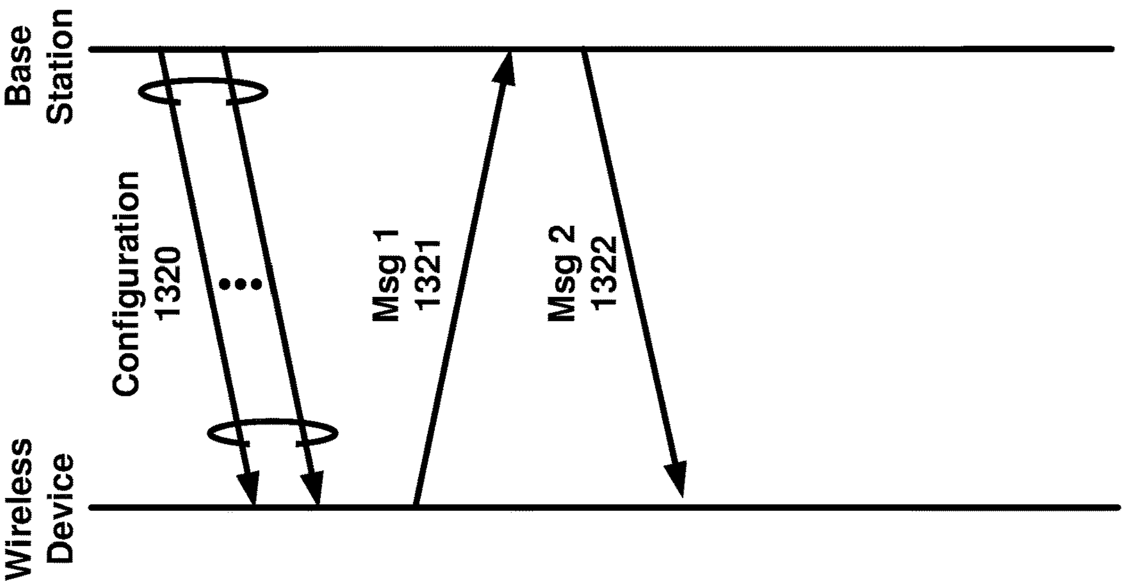
FIG. 13B shows an example two-step random access procedure.
Figure 13A:
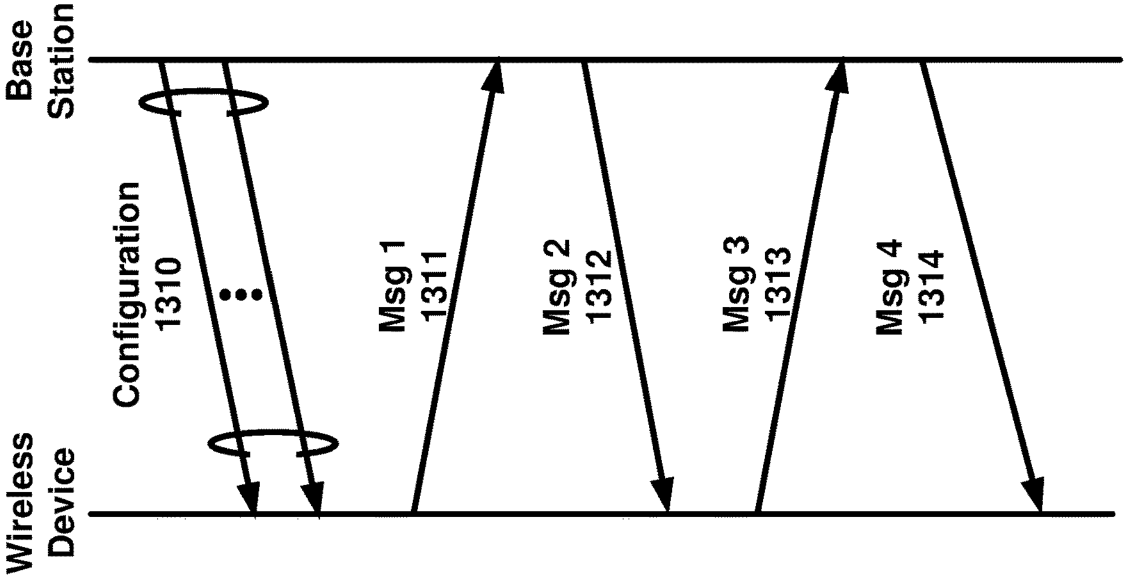
FIG. 13A shows an example four-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RS s). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RS s) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received based on (e.g., after or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE-_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, based on (e.g., after or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/ starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$\text{RA-RNTI}=1+s\_\text{id}+14\times t\_\text{id}+14\times 80\times f\_\text{id}+14\times 80\times 8\times \text{ul\_carrier\_id}$$

where s_id may be an index of a first OFDM symbol of the PRACH occasion (e.g., 0≤s_id<14), t_id may be an index of a first slot of the PRACH occasion in a system frame (e.g., 0≤t_id<80), fid may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, based on (e.g., after or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, based on (e.g., after or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, based on (e.g., after or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, based on (e.g., after or in response to) sending/ transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, based on (e.g., after or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a quantity/number of contiguous control channel elements (CCEs), for example, based on a payload size of the DCI and/or a coverage of the base station. The quantity/number of the contiguous CCEs (referred to as aggregation level) may be 1, 2, 4, 8, 16, and/or any other suitable quantity/number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
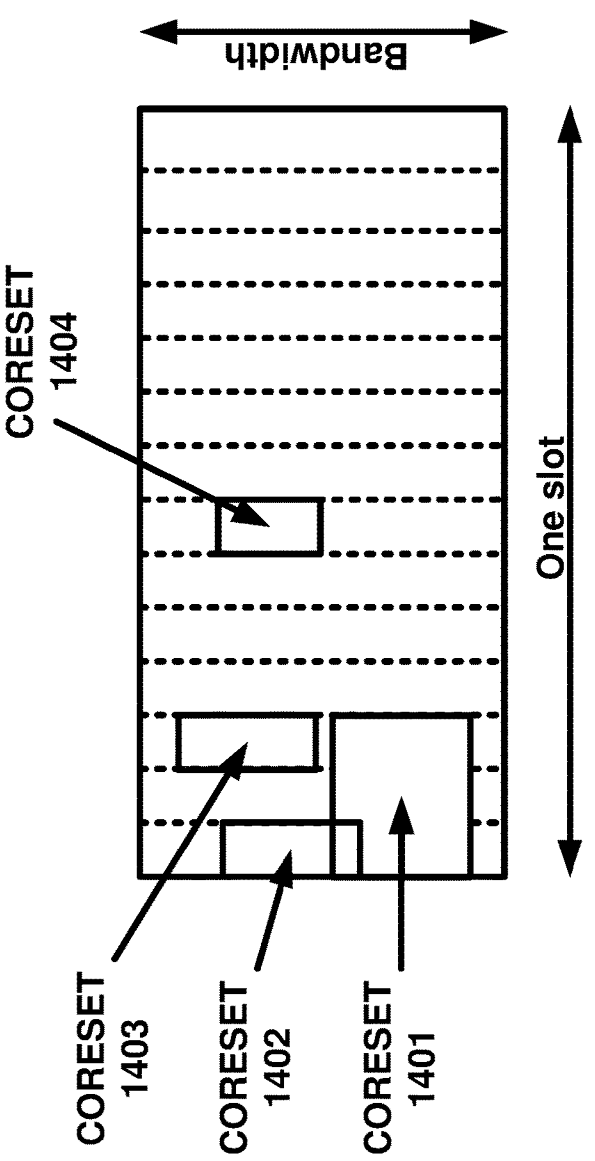
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different quantity/number of resource blocks in frequency domain.

Figure 14B:
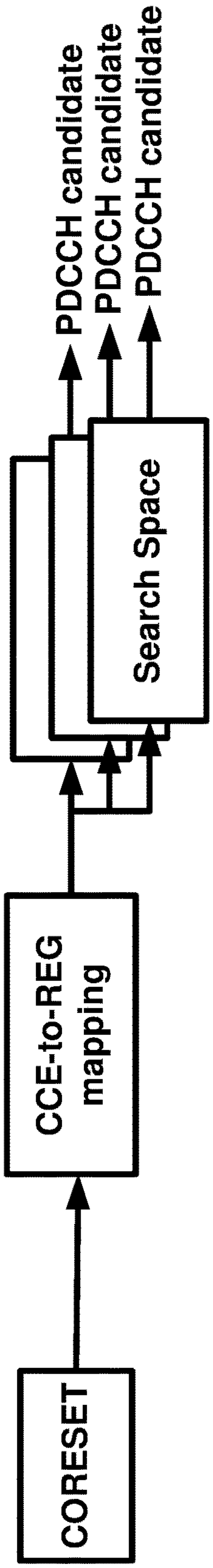
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a quantity/number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a quantity/number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the quantity/number of CCEs, the quantity/number of PDCCH candidates in common search spaces, and/or the quantity/number of PDCCH candidates in the wireless device-specific search spaces) and possible (or configured) DCI formats. The decoding may be referred to as blind decoding. The wireless device may determine DCI as valid for the wireless device, for example, based on (e.g., after or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The may send/transmit uplink control signaling (e.g., UCI) to a base station. The uplink control signaling may comprise HARQ acknowledgements for received DL-SCH transport blocks. The wireless device may send/transmit the HARQ acknowledgements, for example, based on (e.g., after or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a quantity/number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a quantity/number of OFDM symbols (e.g., between four and fourteen OFDM symbols) and may comprise two or fewer bits. The wireless device may use PUCCH format 1, for example, if the transmission is over/via four or more symbols and the quantity/number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a quantity/number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a quantity/number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a quantity/number (e.g. a maximum quantity/number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
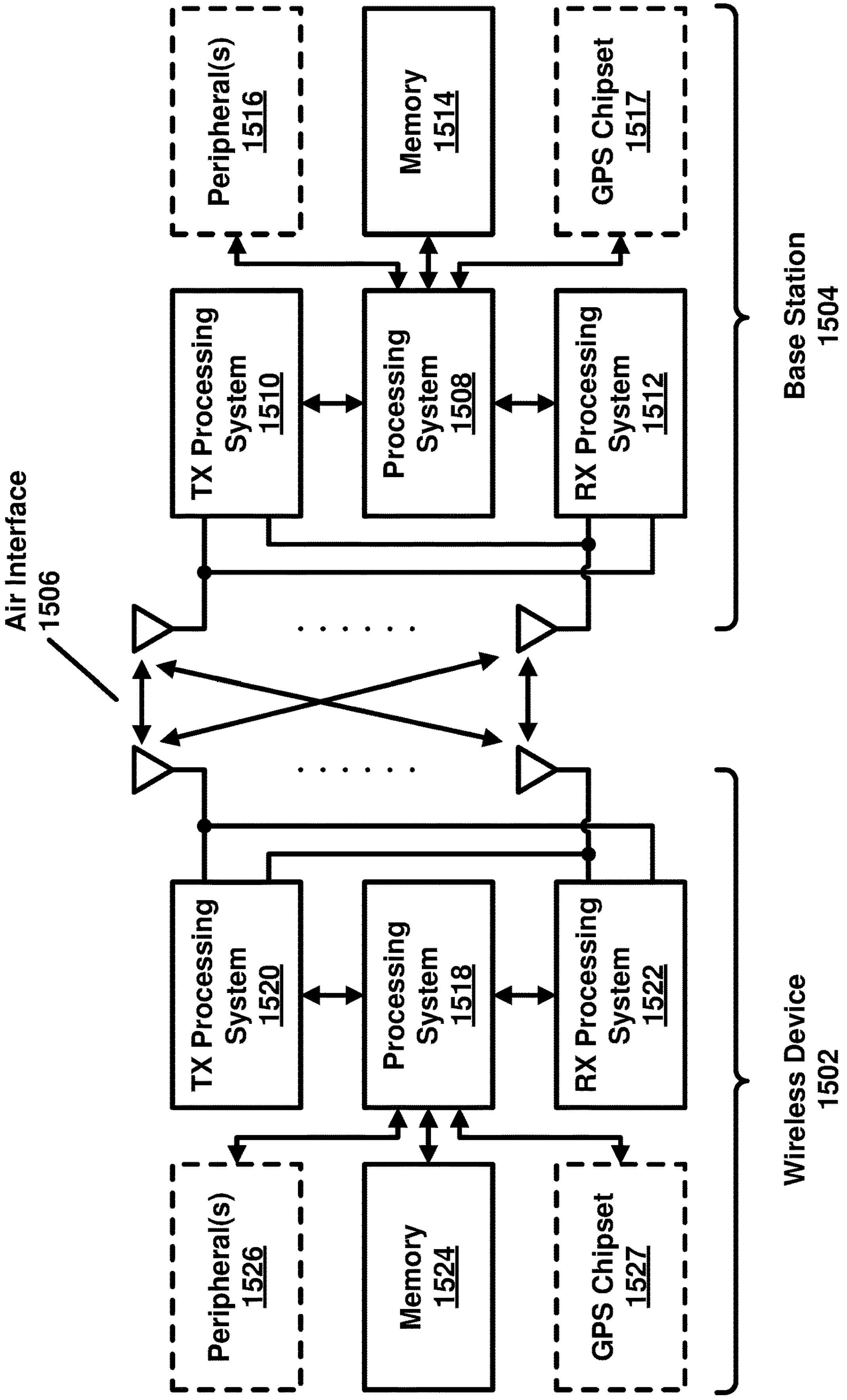
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
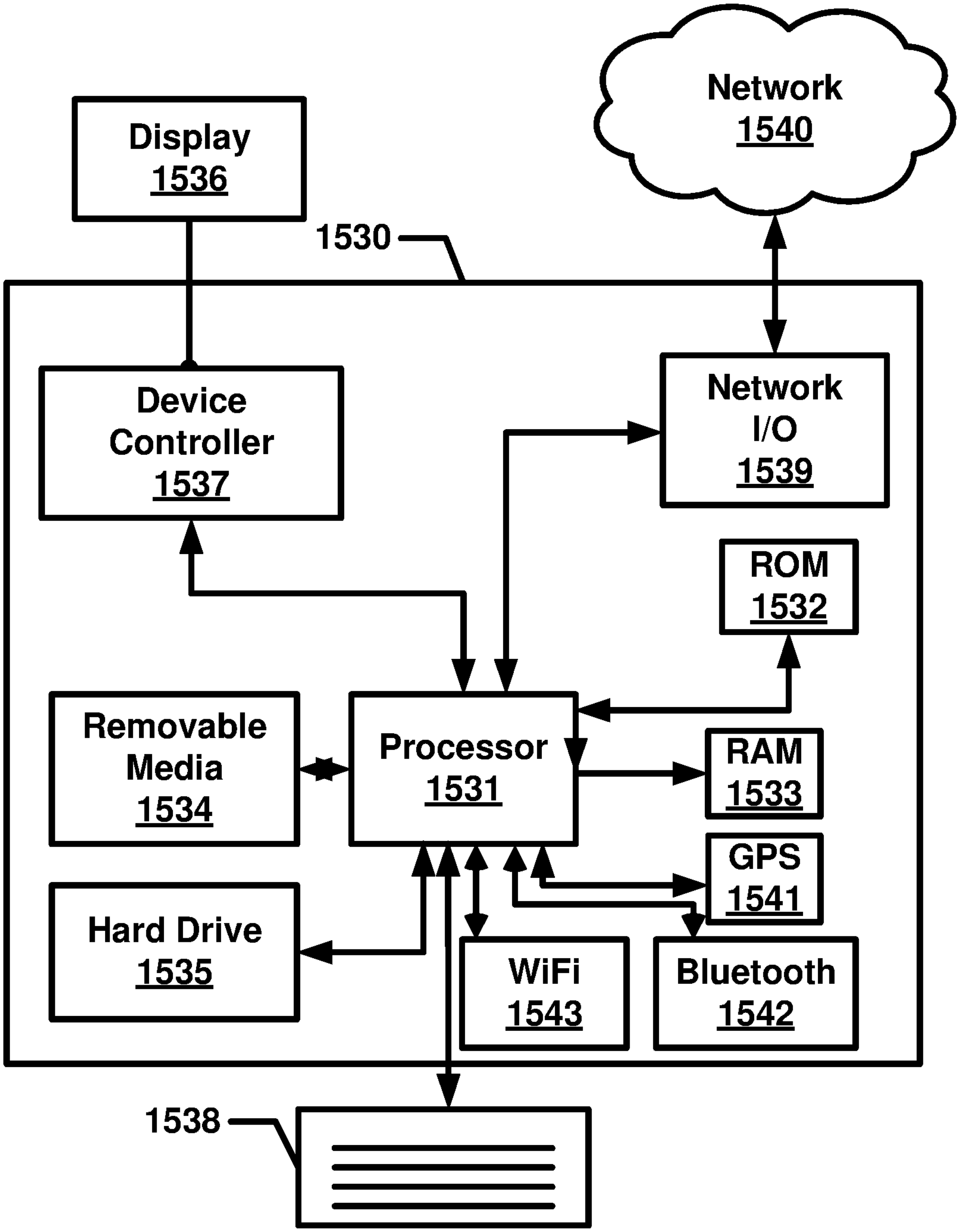
FIG. 15B shows example elements of a computing device that may be used to implement any of the various devices described herein

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figure 16A:
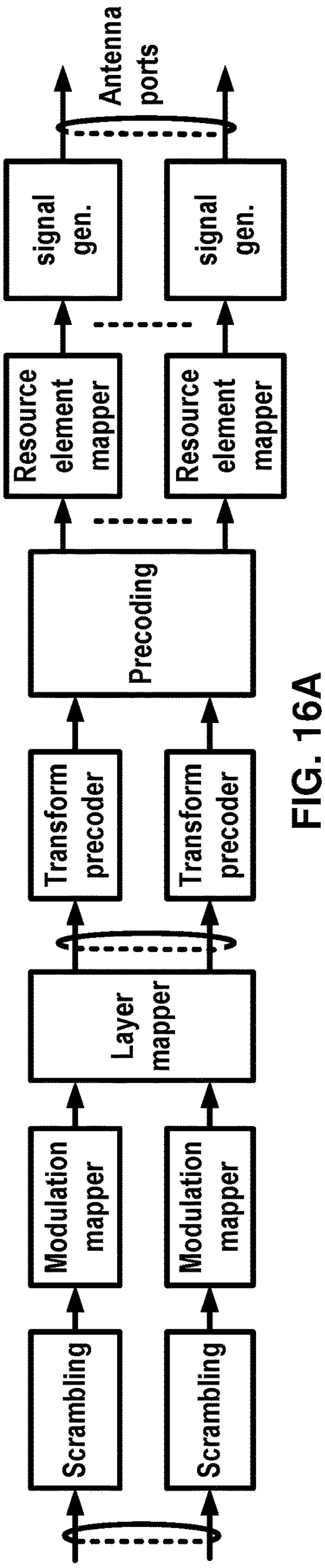
FIG. 16A, FIG. 16B, FIG. 16C, and FIG. 16D show examples of uplink and downlink signal transmission.

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

Figure 16B:
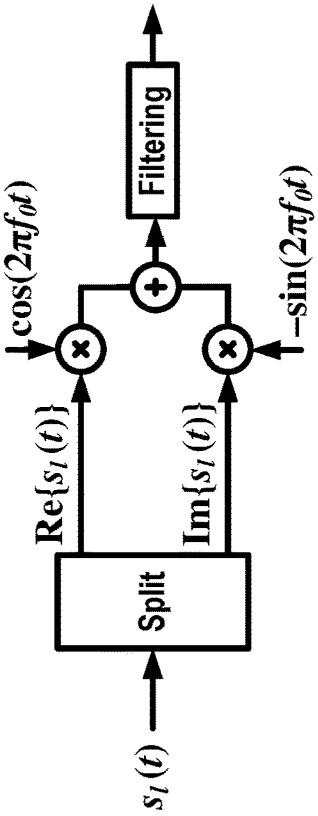

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

Figure 16D:
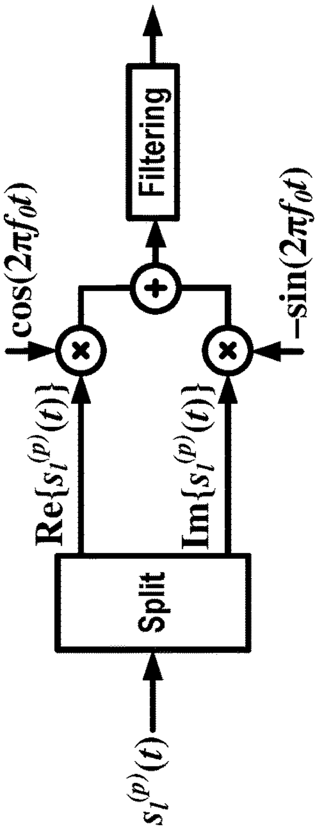
Figure 16C:
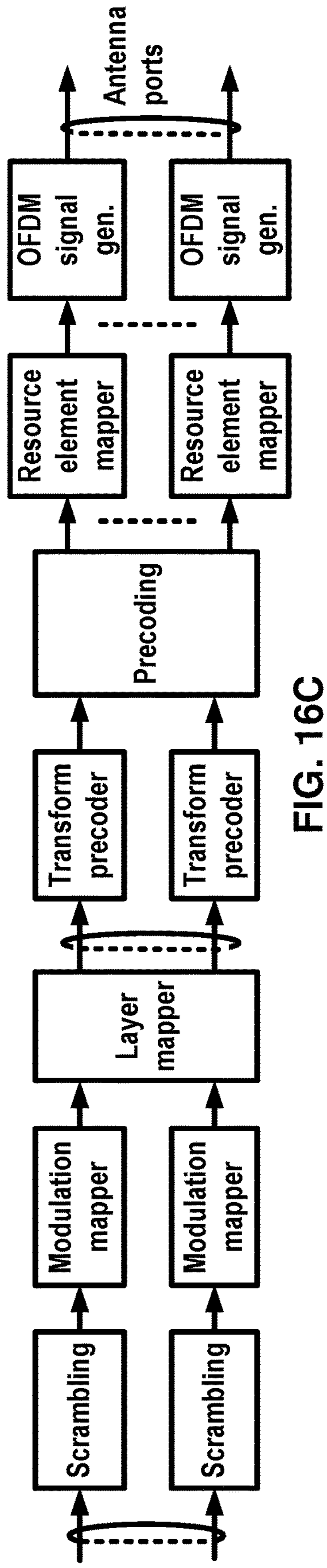

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running. A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

In at least some systems, a wireless device may send an uplink signal (e.g., a PUSCH transmission and/or a PUCCH transmission) repeatedly via a plurality of physical resource blocks (PRBs). The wireless device may be served by multiple TRPs. Parameters for transmissions of/to/towards each of the TRPs may be indicated by a corresponding TCI state. At least two TCI states (e.g., a first TCI state and a second TCI state) may be activated, for example, to support the multiple TRPs. It may be unclear which TCI state is to be used for sending the uplink signal via each PRB. This uncertainty may result in misalignment between the wireless device and the base station and/or may cause unsuccessful reception of the uplink signal, which may lead to unacceptable/high error rates.

As described herein, an SRS resource set indicator may be sent from a base station to a wireless device. The SRS resource set indicator may indicate a corresponding TCI state, of at least two TCI states, for sending an uplink signal via each PRB of a plurality of PRBs. For example, the SRS resource set indicator may associate one or more first PRBs with a first TCI state of the at least two TCI states. The SRS resource set indicator may associate one or more second PRBs with the second TCI state of the at least two TCI states. The wireless device may send, based on the first TCI state, the uplink signal via the one or more first PRBs. Based on the SRS resource set indicator, the wireless device may send a repetition of the uplink signal. For example, the wireless device may send, based on the second TCI state of the at least two TCI states, the uplink signal via the one or more second PRBs. Additionally or alternatively, the wireless device may ignore the SRS resource set indicator or determine the SRS resource set indicator as a default value, for example, if a single TCI state is currently activated. The wireless device may send the uplink signal based on the single TCI state. In this way, the wireless device and the base station may be aligned within one or more domains (e.g., time domain, frequency domain, or spatial domain) using multiple TRPs and/or other nodes, reception of the uplink signal via each PRB may be successful, and/or error rates may be reduced.

In at least some systems, DCI scheduling an uplink signal (e.g., PUSCH transmission, PUCCH transmission, etc.) may indicate, for the uplink signal, which TCI state to be used, if at least two TCI states are activated. However, Type 1 configured uplink grant may be configured by RRC configuration parameters. Scheduling DCI may not be sent from the base station if the uplink signal is sent via Type 1 configured uplink grants. It may be unclear how the wireless device determines which TCI state(s) to use for sending the uplink signal via a Type 1 configured uplink grant. This lack of clarity may result in unsuccessful reception of the uplink signal, which may lead to unacceptable/high error rates.

As described herein, one or more configuration parameters may comprise one or more transmit precoding fields. The one or more configuration parameters may be comprised in an RRC message that configures the Type 1 configured uplink grant. Each of the one or more transmit precoding fields may be associated with a TCI state, of at least two TCI states, that are activated. The association between the one or more transmit precoding fields and the one or more TCI states may be indicated by an indicator. The wireless device may send the uplink signal based on each of the one or more transmit precoding fields and the corresponding TCI state.

In at least some systems, DCI may indicate an update to the currently active TCI state(s). For example, the DCI may indicate a codepoint of a new TCI state. The wireless device may deactivate the previous TCI state(s) and activate the new TCI state(s). It may be unclear which previous TCI state(s) to be deactivated if the quantity/number of new TCI state(s) is less than the quantity/number of previous TCI state(s).

As described herein, a control command (e.g., DCI or a MAC CE) may indicate one or more selected TCI states. The wireless device may deactivate the selected TCI state(s) indicated in the field, for example, if the quantity/number of new TCI state(s) indicated in the DCI is less than the quantity/number of previous TCI state(s). The wireless device may activate the new TCI states.

FIG. 17 shows an example of MIMO configuration parameters. The MIMO configuration parameters may be indicated (e.g., to a wireless device) via an RRC message. Additional details regarding MIMO configuration parameters are further described herein.

Figure 18:
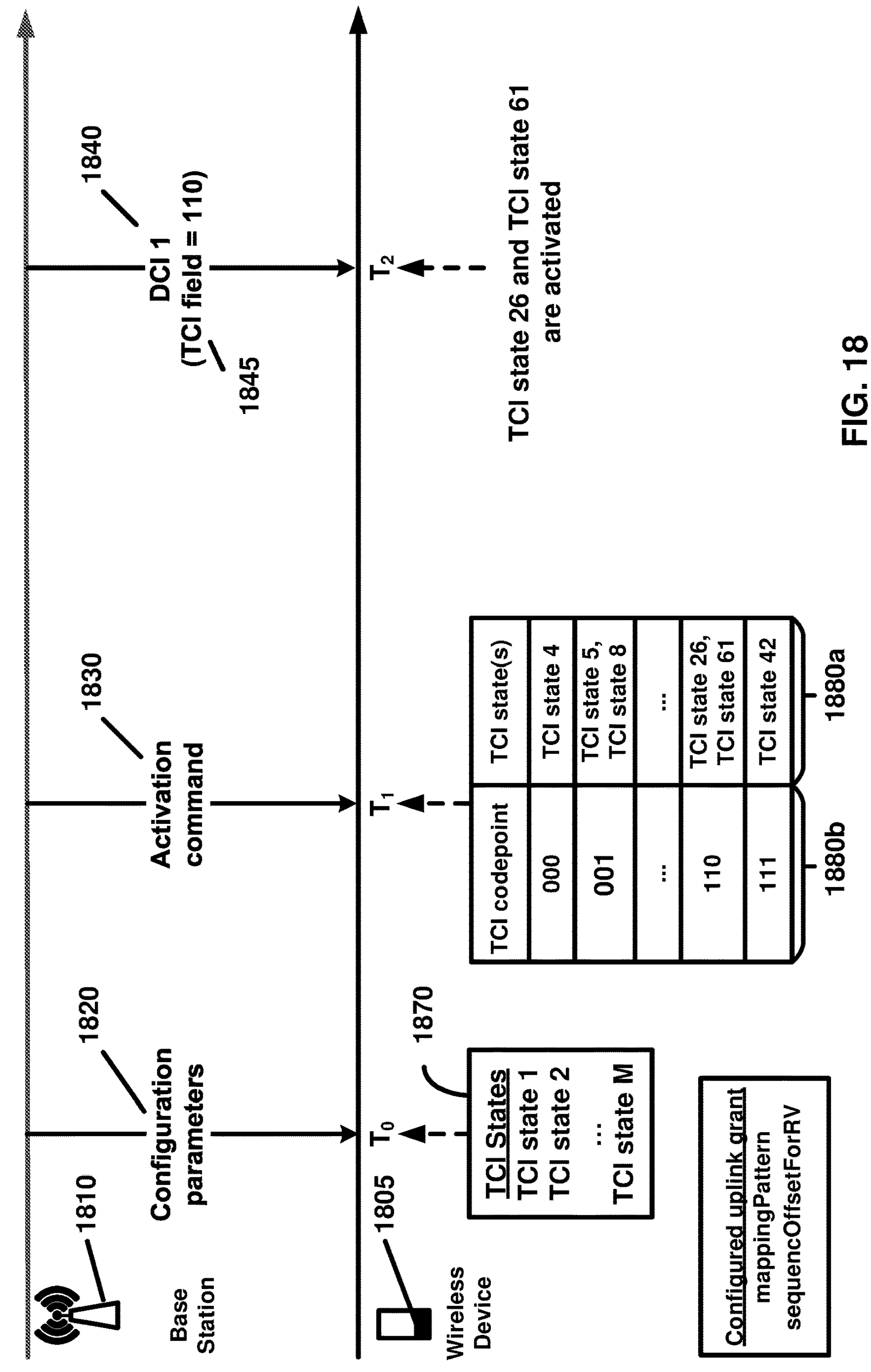
FIG. 18 and FIG. 19 show examples of TCI state activation.
Figure 19:
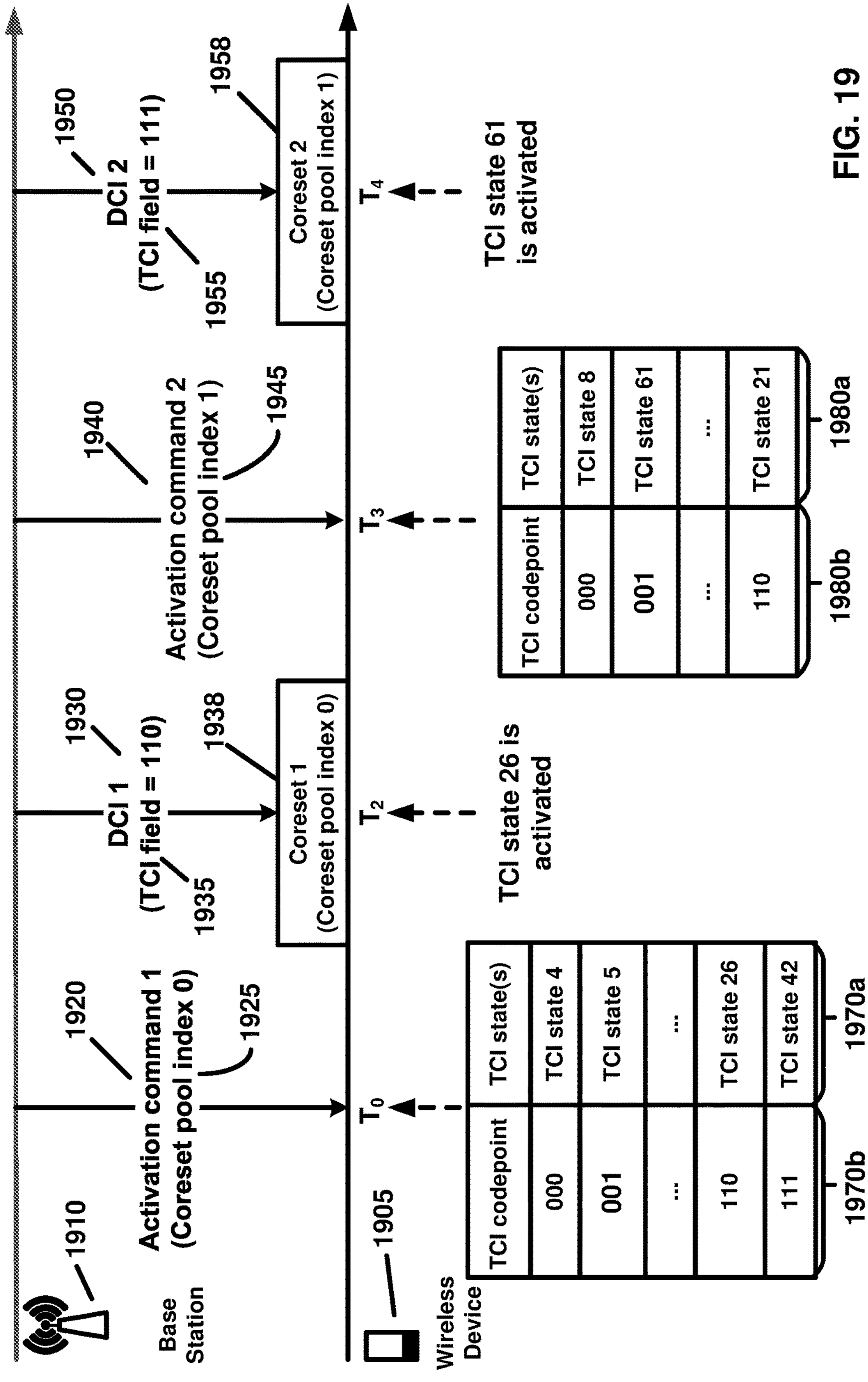

FIG. 18 and FIG. 19 show examples of TCI state activation. A wireless device may receive one or more messages. FIG. 18 shows an example of TCI state activation. The wireless device 1805 may receive the one or more messages from a base station 1810. The wireless device 1805 may receive the one or more messages from a relay node. The wireless device 1805 may receive the one or more messages from another wireless device (e.g., TRP, vehicle, remote radio head, etc.). The one or more messages may comprise one or more configuration parameters 1820 (e.g., Configuration parameters at time TO as described herein in FIG. 18). The one or more configuration parameters 1820 may be RRC configuration parameters. The one or more configuration parameters 1820 may be RRC reconfiguration parameters. The one or more configuration parameters 1820 may be for one or more cells.

One or more cells may comprise a cell. The cell may be, for example, a serving cell. At least one configuration parameter of the one or more configuration parameters 1820 may be for the cell. The cell may be a primary cell (PCell). The cell may be a primary secondary cell (PSCell). The cell may be a secondary cell (SCell). The cell may be a secondary cell configured with PUCCH (e.g., PUCCH SCell). The cell may be an unlicensed cell (e.g., operating in an unlicensed band). The cell may be a licensed cell (e.g., operating in a licensed band). The cell may operate in a first frequency range (FR1). The FR1 may, for example, comprise frequency bands below 6 GHz. The cell may operate in a second frequency range (FR2). The FR2 may, for example, comprise frequency bands from 24 GHz to 52.6 GHz. The cell may operate in a third frequency range (FR3). The FR3 may, for example, comprise frequency bands from 52.6 GHz to 71 GHz. The FR3 may, for example, comprise frequency bands starting from 52.6 GHz.

A wireless device 1805 may perform uplink transmissions (e.g., PUSCH, PUCCH, PUCCH) via and/or of the cell in a first time and/or in a first frequency. The wireless device 1805 may perform downlink receptions (e.g., PDCCH, PDSCH) via and/or of the cell in a second time and/or in a second frequency. The cell may operate in a time-division duplex (TDD) mode. In the TDD mode, the first frequency and the second frequency may be the same. In the TDD mode, the first time and the second time may be different. The cell may operate in a frequency-division duplex (FDD) mode. In the FDD mode, the first frequency and the second frequency may be different. In the FDD mode, the first time and the second time may be the same. The wireless device 1805 may be in an RRC connected mode. The wireless device 1805 may be in an RRC idle mode. The wireless device 1805 may be in an RRC inactive mode.

A cell may comprise a plurality of BWPs. The plurality of BWPs may comprise one or more uplink BWPs comprising an uplink BWP (UL BWP) of the cell. The plurality of BWPs may comprise one or more downlink BWPs comprising a downlink BWP of the cell. The BWP of the plurality of BWPs may be in one of an active state and an inactive state. In the active state of a downlink BWP of the one or more downlink BWPs, for example, a wireless device 1805 may monitor a downlink channel and/or signal (e.g., PDCCH, DCI, CSI-RS, PDSCH) on, for, and/or via the downlink BWP. in the active state of a downlink BWP of the one or more downlink BWPs, the wireless device 1805 may receive a PDSCH on, for, and/or via the downlink BWP. In the inactive state of a downlink BWP of the one or more downlink BWPs, the wireless device 1805 may not monitor a downlink channel and/or signal (e.g., PDCCH, DCI, CSI-RS, PDSCH) on, for, and/or via the downlink BWP. In the inactive state of a downlink BWP of the one or more downlink BWPs, the wireless device may stop monitoring and/or receiving a downlink channel and/or signal (e.g., PDCCH, DCI, CSI-RS, PDSCH) on, for, and/or via the downlink BWP. In the inactive state of a downlink BWP of the one or more downlink BWPs, the wireless device 1805 may not receive a PDSCH on, for, and/or via the downlink BWP. In the inactive state of a downlink BWP of the one or more downlink BWPs, the wireless device 1805 may stop receiving a PDSCH on, for, and/or via the downlink BWP.

In an active state of an uplink BWP of one or more uplink BWPs, a wireless device 1805 may send (e.g., transmit) an uplink channel and/or signal (e.g., PUCCH, preamble, PUSCH, PRACH, PUCCH, etc.) on and/or via the uplink BWP. in the inactive state of an uplink BWP of the one or more uplink BWPs, the wireless device may not send (e.g., transmit) an uplink channel and/or signal (e.g., PUCCH, preamble, PUSCH, PRACH, PUCCH, etc.) on and/or via the uplink BWP.

A wireless device 1805 may activate a downlink BWP of one or more downlink BWPs of a cell. The activating the downlink BWP may comprise setting and/or switching to the downlink BWP as an active downlink BWP of the cell. The activating the downlink BWP may comprise setting the downlink BWP in the active state. The activating the downlink BWP may comprise switching the downlink BWP from the inactive state to the active state.

A wireless device 1805 may activate an uplink BWP of one or more uplink BWPs of a cell. The activating the uplink BWP may comprise the wireless device 1805 setting and/or switching to the uplink BWP as an active uplink BWP of the cell. The activating the uplink BWP may comprise setting the uplink BWP in the active state. The activating the uplink BWP may comprise switching the uplink BWP from the inactive state to the active state.

One or more configuration parameters may be for a downlink BWP (e.g., an active downlink BWP) of the cell. At least one configuration parameter of the one or more configuration parameters may be for the downlink BWP of the cell. The one or more configuration parameters may indicate a subcarrier spacing and/or a numerology for the downlink BWP.

One or more configuration parameters may be for a uplink BWP (e.g., an active uplink BWP) of a cell. At least one configuration parameter of the one or more configuration parameters may be for the uplink BWP of the cell. The one or more configuration parameters may indicate a subcarrier spacing and/or a numerology for the uplink BWP.

A value of the subcarrier spacing, of the downlink BWP and/or the uplink BWP, may be and/or indicate, for example, 15 kHz (mu=0). A value of the subcarrier spacing may be and/or indicate, for example, 30 kHz (mu=1). A value of the subcarrier spacing may be and/or indicate, for example, 60 kHz (mu=2). A value of the subcarrier spacing may be and/or indicate, for example, 120 kHz (mu=3). A value of the subcarrier spacing may be and/or indicate, for example, 240 kHz (mu=4). A value of the subcarrier spacing may be and/or indicate, for example, 480 kHz (mu=5). A value of the subcarrier spacing may be and/or indicate, for example, 960 kHz (mu=6). 480 kHz may be valid and/or applicable in FR3. 960 kHz may be valid and/or applicable in FR3. 240 kHz may be valid and/or applicable in FR3. 120 kHz may be valid and/or applicable in FR3.

One or more configuration parameters may indicate a plurality of control resource sets (coresets). The one or more configuration parameters may indicate the plurality of coresets for a downlink BWP (e.g., an active downlink BWP) of a cell. The downlink BWP (e.g., the active downlink BWP) may comprise the plurality of coresets. The one or more configuration parameters may indicate a plurality of coreset indexes, identifiers, and/or indicators (e.g., provided by a higher layer parameter ControlResourceSetId) for the plurality of coresets. Each coreset of the plurality of coresets may be identified and/or indicated by a respective coreset index of the plurality of coreset indexes. A first coreset of the plurality of coresets may be identified by a first coreset index of the plurality of coreset indexes. A second coreset 1958 of the plurality of coresets may be identified by a second coreset index of the plurality of coreset indexes.

One or more configuration parameters 1820 may indicate one or more coreset pool indexes (e.g., provided by a higher layer parameter CoresetPoolIndex) for a plurality of coresets. Each coreset of the plurality of coresets may be configured by, be indicated by, and/or comprise the one or more configuration parameters by a respective coreset pool index of the one or more coreset pool indexes (e.g., 0, 1, etc.). The one or more configuration parameters 1820 may indicate, for each coreset of the plurality of coresets, a respective coreset pool index of the one or more coreset pool indexes. The one or more configuration parameters 1820 may indicate, for a first coreset of the plurality of coresets, for example, a first coreset pool index 1925 (CoresetPoolIndex=0). The one or more configuration parameters may indicate, for a second coreset of the plurality of coresets, a second coreset pool index 1945 (CoresetPoolIndex=1). The one or more coreset pool indexes may comprise the first coreset pool index 1925 and the second coreset pool index 1945.

Also, or alternatively, one or more configuration parameters 1820 may not indicate, for a coreset of the plurality of coresets, a coreset pool index. A higher layer parameter CoresetPoolIndex may be absent in configuration parameters of the coreset. A 1905 wireless device may determine a value (e.g., a default value) of a coreset pool index of the coreset as a first coreset pool index 1925 (CoresetPoolIndex=0). The first coreset pool index 1925 (CoresetPoolIndex=0) may be the coreset pool index of the coreset, for example, based on the one or more configuration parameters not indicating, for the coreset, a coreset pool index. The wireless device 1905 may determine the value (e.g., the default value) of the coreset pool index of the coreset as the first coreset pool index 1925, for example, based on the one or more configuration parameters not indicating, for the coreset, a coreset pool index.

A first coreset pool (e.g., Coreset pool 0) may comprise one or more first coresets with a coreset pool index that may be equal to a first coreset pool index 1925 (e.g., CoresetPoolIndex=0). One or more configuration parameters 1820 may indicate the first coreset pool index 1925 for each coreset of the one or more first coresets in the first coreset pool. The plurality of coresets may comprise the one or more first coresets.

A second coreset pool (e.g., Coreset pool 1) may comprise one or more second coresets with a coreset pool index that is equal to a second coreset pool index 1945 (e.g., CoresetPoolIndex=1). One or more configuration parameters 1820 may indicate the second coreset pool index 1945 for each coreset of the one or more second coresets in the second coreset pool. The plurality of coresets may comprise the one or more second coresets.

One or more configuration parameters 1920 may not indicate a coreset pool index for a coreset of the plurality of coresets. A wireless device 1905 may determine a default value for the coreset pool index of the coreset, for example, based on the one or more configuration 1920 parameters not indicating the coreset pool index for the coreset. The default value may be equal to zero (e.g., CoresetPoolIndex=0). The default value may be equal to the first coreset pool index 1925 (e.g., zero). The first coreset pool may comprise the coreset, for example, based on the one or more configuration parameters not indicating, for the coreset, the coreset pool index. The first coreset pool may comprise the coreset based on the default value of the coreset pool index of the coreset being equal to the first coreset pool index 1925.

A first coreset pool index 1925 of a first coreset and a second coreset pool index 1945 of a second coreset 1958 may be the same. One more configuration parameters may indicate the same coreset pool index for the first coreset and the second coreset 1958. A plurality of coresets may comprise the first coreset and the second coreset 1958. One or more coreset pool indexes may comprise the first coreset pool index 1925 and the second coreset pool index 1945. A wireless device 1905 may group the first coreset and the second coreset 1958 in a same coreset pool (e.g., CoresetPoolIndex=0 or CoresetPoolIndex=1), for example, based on the first coreset pool index 1925 of the first coreset and the second coreset pool index 1940 of the second coreset 1958 being the same. A first coreset pool comprising the first coreset and a second coreset pool comprising the second coreset 1958 may be the same, for example, based on the first coreset pool index 1925 of the first coreset and the second coreset pool index 1940 of the second coreset 1958 being the same.

A first coreset pool index 1925 of a first coreset and a second coreset pool index 1940 of a second coreset 1958 may be different. A plurality of coresets may comprise the first coreset and the second coreset 1958. One or more coreset pool indexes may comprise the first coreset pool index 1925 and the second coreset pool index 1940. A wireless device 1905 may group the first coreset and the second coreset 1958 in different coreset pools, for example, based on the first coreset pool index 1925 of the first coreset and the second coreset pool index 1940 of the second coreset 1958 being different. The wireless device 1905 may group the first coreset in a first coreset pool (e.g., CoresetPoolIndex=0). The wireless device 1905 may group the second coreset 1958 in a second coreset pool (e.g., CoresetPoolIndex=1) that is different from the first coreset pool, for example, based on the first coreset pool index 1925 and the second coreset pool index 1940 being different. The first coreset pool and the second coreset pool may be different, for example, based on the first coreset pool index 1925 of the first coreset and the second coreset pool index 1940 of the second coreset 1958 being different.

One or more configuration parameters 1920 may indicate at least two coreset pool indexes (e.g., 0 and 1) for a higher layer parameter CORESETPoolIndex. The one or more configuration parameters 1920 may comprise the higher layer parameter CORESETPoolIndex with and/or set to the at least two coreset pool indexes. The at least two coreset pool indexes may comprise a first coreset pool index 1925 (e.g., 0) for one or more first coresets of a plurality of coresets. The at least two coreset pool indexes may comprise a second coreset pool index 1940 (e.g., 1), different from the first coreset pool index 1925 for one or more second coresets of the plurality of coresets. The one or more first coresets may comprise one or more third coresets, of the plurality of coresets, without a value for a higher layer parameter CORESETPoolIndex. The one or more configuration parameters 1920 may not comprise the higher layer parameter CORESETPoolIndex for the one or more third coresets.

A cell may comprise a plurality of transmission and reception points (TRPs). The plurality of TRPs may serve the cell and/or a wireless device 1905 in, via, and/or of the cell. At least one TRP of the plurality of TRPs may serve the cell and/or the wireless device in, via, and/or of the cell. The plurality of TRPs may comprise a first TRP and a second TRP. The first TRP may send (e.g., transmit) a downlink transmission and/or signal (e.g., PDSCH, PDCCH, DCI) via a first coreset pool. Transmitting the downlink transmission and/or signal (e.g., PDCCH, DCI) via the first coreset pool may comprise the first TRP transmitting the downlink transmission and/or signal via a first coreset having and/or being associated with the first coreset pool index. The first TRP may not send (e.g., transmit) a downlink transmission and/or signal (e.g., PDSCH, PDCCH, DCI) via a second coreset pool. Not transmitting the downlink transmission and/or signal (e.g., PDSCH, PDCCH, DCI) via the second coreset pool may comprise the first TRP does not sending (e.g., transmitting) the downlink transmission and/or signal via a second coreset 1958 having and/or being associated with the second coreset pool index.

A second TRP may send (e.g., transmit) a downlink transmission and/or signal (e.g., PDSCH, PDCCH, DCI) via a second coreset pool. Transmitting the downlink transmission and/or signal (e.g., PDCCH, DCI) via the second coreset pool may comprise the second TRP sending (e.g., transmitting) the downlink transmission and/or signal via a second coreset 1958 having and/or being associated with the second coreset pool index. The second TRP may not send (e.g., transmit) a downlink transmission and/or signal (e.g., PDCCH, DCI) via the first coreset pool. Not transmitting the downlink transmission and/or signal (e.g., PDCCH, DCI) via the first coreset pool may comprise the second TRP does not sending (e.g., transmitting) the downlink transmission and/or signal via a first coreset having and/or being associated with the first coreset pool index.

One or more configuration parameters may indicate a plurality of uplink resources (e.g., PUCCH-Resource, SRS-Resource, etc.). The one or more configuration parameters may indicate the plurality of uplink resources for the uplink BWP (e.g., an active uplink BWP) of a cell. The uplink BWP (e.g., an active uplink BWP) may comprise the plurality of uplink resources. The uplink BWP (e.g., an active uplink BWP) of an uplink carrier (e.g., NUL, SUL) of the cell may comprise the plurality of uplink resources. A plurality of uplink resources may comprise, for example, a plurality of PUCCH resources. The plurality of uplink resources may comprise, for example, a plurality of SRS resources. The plurality of uplink resources may comprise, for example, a plurality of PUSCH resources.

One or more configuration parameters may indicate one or more uplink resource sets and/or groups (e.g., PUCCH-ResourceGroup, SRS-ResourceSet). The one or more uplink resource sets and/or groups may comprise a plurality of uplink resources. Each uplink resource set and/or group of the one or more uplink resource sets and/or groups may comprise respective uplink resources of the plurality of uplink resources. a first uplink resource set and/or group of the one or more uplink resource sets and/or groups may comprise one or more first uplink resources of the plurality of uplink resources. A second uplink resource set and/or group of the one or more uplink resource sets and/or groups may comprise one or more second uplink resources of the plurality of uplink resources. The first uplink resource set and/or group and the second uplink resource set and/or group may not comprise (e.g., share) a common (e.g., shared, same, etc.) uplink resource of the plurality of uplink resources. A first uplink resource that may be in the first uplink resource set and/or group may not be in the second uplink resource set and/or group.

One or more configuration parameters may indicate a plurality of uplink resource indexes, identifiers, and/or indicators (e.g., provided by a higher layer parameter PUCCH-ResourceId, SRS-ResourceId) for a plurality of uplink resources. Each uplink resource of the plurality of uplink resources may be identified and/or indicated by a respective uplink resource index of the plurality of uplink resource indexes. A first uplink resource of the plurality of uplink resources may be identified by a first uplink resource index of the plurality of uplink resource indexes. A second uplink resource of the plurality of uplink resources may be identified by a second uplink resource index of the plurality of uplink resource indexes.

One or more configuration parameters may indicate one or more uplink resource set and/or group indexes, identifiers, and/or indicators (e.g., provided by a higher layer parameter PUCCH-ResourceGroupId, SRS-ResourceSetId) for one or more uplink resource sets and/or groups. Each uplink resource set and/or group of the one or more uplink resource sets and/or groups may be identified and/or indicated by a respective uplink resource set and/or group index of the one or more uplink resource set and/or group indexes. A first uplink resource set and/or group of the one or more uplink resource sets and/or groups may be identified by a first uplink resource set and/or group index of the one or more uplink resource set and/or group indexes. A second uplink resource set and/or group of the one or more uplink resource sets and/or groups may be identified by a second uplink resource set and/or group index of the one or more uplink resource set and/or group indexes.

One or more configuration parameters may indicate one or more coreset pool indexes (e.g., provided by a higher layer parameter CoresetPoolIndex) for a plurality of uplink resources. Each uplink resource of the plurality of uplink resources may comprise, be configured by, and/or be indicated by the one or more configuration parameters by a respective coreset pool index of the one or more coreset pool indexes (e.g., 0, 1). The one or more configuration parameters may indicate, for each uplink resource of the plurality of uplink resources, a respective coreset pool index of the one or more coreset pool indexes. The one or more configuration parameters may indicate, for a first uplink resource of the plurality of uplink resources, for example, a first coreset pool index (CoresetPoolIndex=0). The one or more configuration parameters may indicate, for a second uplink resource of the plurality of uplink resources, for example, a second coreset pool index (CoresetPoolIndex=1). The one or more coreset pool indexes may comprise the first coreset pool index and the second coreset pool index.

One or more configuration parameters may not indicate, for an uplink resource of the plurality of uplink resources, a coreset pool index. A higher layer parameter CoresetPoolIndex may be absent in configuration parameters of the uplink resource. A wireless device 1905 may determine a value (e.g., a default value) of a coreset pool index of the uplink resource as the first coreset pool index (CoresetPoolIndex=0). The wireless device may determine the value (e.g., the default value) of the coreset pool index of the uplink resource as the first coreset pool index, for example, based on the one or more configuration parameters not indicating, for the uplink resource, a coreset pool index. The first coreset pool index (CoresetPoolIndex=0) may be the coreset pool index of the uplink resource, for example, based on the one or more configuration parameters not indicating, for the uplink resource, a coreset pool index.

One or more configuration parameters may indicate at least two coreset pool indexes (e.g., 0 and 1) for a higher layer parameter CORESETPoolIndex. The one or more configuration parameters may comprise the higher layer parameter CORESETPoolIndex with and/or set to the at least two coreset pool indexes. The at least two coreset pool indexes may comprise a first coreset pool index (e.g., 0) for one or more first uplink resources of the plurality of uplink resources. The at least two coreset pool indexes may comprise a second coreset pool index (e.g., 1), different from the first coreset pool index, for one or more second uplink resources of the plurality of uplink resources. The one or more first uplink resources may comprise one or more third uplink resources, of the plurality of uplink resources, without a value for a higher layer parameter CORESETPoolIndex. The one or more configuration parameters may not comprise the higher layer parameter CORESETPoolIndex for the one or more third uplink resources.

A cell may comprise a plurality of transmission and reception points (TRPs). The plurality of TRPs may serve the cell and/or the wireless device in, via, and/or of the cell. At least one TRP of the plurality of TRPs may serve the cell and/or the wireless device in, via, and/or of the cell. The plurality of TRPs may comprise a first TRP and a second TRP.

A first TRP may receive an uplink transmission and/or signal (e.g., PUSCH, PUCCH, SRS, UCI, PRACH) via a first uplink resource, of the plurality of uplink resources, having and/or being associated with the first coreset pool index. The first TRP may not receive an uplink transmission and/or signal (e.g., PUSCH, PUCCH, SRS, UCI, PRACH) via a second uplink resource, of the plurality of uplink resources, having and/or being associated with the second coreset pool index.

A second TRP may receive an uplink transmission and/or signal (e.g., PUSCH, PUCCH, SRS, UCI, PRACH) via a second uplink resource, of the plurality of uplink resources, having and/or being associated with the second coreset pool index. The second TRP may not receive an uplink transmission and/or signal (e.g., PUSCH, PUCCH, SRS, UCI, PRACH) via a first uplink resource, of the plurality of uplink resources, having and/or being associated with the first coreset pool index.

One or more configuration parameters may indicate one or more coreset pool indexes (e.g., provided by a higher layer parameter CoresetPoolIndex) for one or more uplink resource sets and/or groups. Each uplink resource set and/or group of the one or more uplink resource sets and/or groups may comprise, be configured by, and/or be indicated by the one or more configuration parameters by a respective coreset pool index of the one or more coreset pool indexes (e.g., 0, 1). The one or more configuration parameters may indicate, for each uplink resource set and/or group of the one or more uplink resource sets and/or groups, a respective coreset pool index of the one or more coreset pool indexes. One or more configuration parameters may indicate, for a first uplink resource set and/or group of the one or more uplink resource sets and/or groups, for example, a first coreset pool index 1925 (CoresetPoolIndex=0). The one or more configuration parameters may indicate, for a second uplink resource set and/or group of the one or more uplink resource sets and/or groups, for example, a second coreset pool index 1945 (CoresetPoolIndex=1). The one or more coreset pool indexes may comprise the first coreset pool index and the second coreset pool index.

One or more configuration parameters may not indicate, for an uplink resource set and/or group of the one or more uplink resource sets and/or groups, a coreset pool index. A higher layer parameter CoresetPoolIndex may be absent in configuration parameters of the uplink resource set and/or group. A wireless device 1905 may determine a value (e.g., a default value) of a coreset pool index of the uplink resource set and/or group as the first coreset pool index 1925 (CoresetPoolIndex=0). The wireless device may determine the value (e.g., the default value) of the coreset pool index of the uplink resource set and/or group as the first coreset pool index, for example, based on the one or more configuration parameters not indicating, for the uplink resource set and/or group, a coreset pool index. The first coreset pool index 1925 (CoresetPoolIndex=0) may be the coreset pool index of the uplink resource set and/or group, for example, based on the one or more configuration parameters not indicating, for the uplink resource set and/or group, a coreset pool index.

One or more configuration parameters may indicate at least two coreset pool indexes (e.g., 0 and 1) for a higher layer parameter CORESETPoolIndex. The one or more configuration parameters may comprise the higher layer parameter CORESETPoolIndex with and/or set to the at least two coreset pool indexes. The at least two coreset pool indexes may comprise a first coreset pool index (e.g., 0) for one or more first uplink resource sets and/or groups of the one or more uplink resource sets and/or groups. The at least two coreset pool indexes may comprise a second coreset pool index (e.g., 1), different from the first coreset pool index, for one or more second uplink resource sets and/or groups of the one or more uplink resource sets and/or groups. The one or more first uplink resource sets and/or groups may comprise one or more third uplink resource sets and/or groups, of the one or more uplink resource sets and/or groups, without a value for a higher layer parameter CORESETPoolIndex. The one or more configuration parameters may not comprise the higher layer parameter CORESETPoolIndex for one or more third uplink resource sets and/or groups.

A cell may comprise a plurality of transmission and reception points (TRPs). The plurality of TRPs may serve the cell and/or a wireless device in/via/of the cell. At least one TRP of the plurality of TRPs may serve the cell and/or the wireless device in, via, and/or of the cell. The plurality of TRPs may comprise a first TRP and a second TRP.

A first TRP may receive an uplink transmission and/or signal (e.g., PUSCH, PUCCH, SRS, UCI, PRACH) via an uplink resource of a first uplink resource set and/or group, of the one or more uplink resource sets and/or groups, having and/or being associated with the first coreset pool index. The first TRP may not receive an uplink transmission and/or signal (e.g., PUSCH, PUCCH, SRS, UCI, PRACH) via an uplink resource in a second uplink resource set and/or group, of the one or more uplink resource sets and/or groups, having and/or being associated with the second coreset pool index.

A second TRP may receive an uplink transmission and/or signal (e.g., PUSCH, PUCCH, SRS, UCI, PRACH) via an uplink resource in a second uplink resource set and/or group, of the one or more uplink resource sets and/or groups, having and/or being associated with the second coreset pool index. The second TRP may not receive an uplink transmission and/or signal (e.g., PUSCH, PUCCH, SRS, UCI, PRACH) via an uplink resource in a first uplink resource set and/or group, of the one or more uplink resource sets and/or groups, having and/or being associated with the first coreset pool index.

A wireless device may send (e.g., transmit), via an uplink resource, an uplink transmission and/or signal (e.g., PUSCH/PUCCH/SRS transmission). A plurality of uplink resources may comprise the uplink resource. An uplink resource set and/or group of the one or more uplink resource sets and/or groups may comprise the uplink resource.

A wireless device 1905 may receive, via a coreset of the plurality of coresets, downlink control information (DCI) 1930 scheduling, triggering, and/or indicating transmission of the uplink transmission and/or signal. The DCI 1930 may schedule, trigger, and/or indicate transmission of the uplink transmission and/or signal via the uplink resource. The DCI may indicate the uplink resource. The DCI may comprise a field indicating the uplink resource.

An uplink transmission and/or signal may be a PUSCH transmission (e.g., transport block). An uplink resource may be a PUSCH resource. DCI 1930 may schedule transmission of the PUSCH transmission. An uplink transmission and/or signal may be a PUCCH transmission (e.g., HARQ-ACK information feedback). The uplink resource may be a PUCCH resource. The DCI 1930 may schedule reception of a transport block (e.g., a PDSCH reception). The uplink transmission and/or signal may be a HARQ-ACK information feedback of the transport block. An uplink transmission and/or signal may be a SRS. The uplink resource may be a SRS resource. The DCI 1930 may schedule transmission of the SRS. The SRS may be, for example, an aperiodic SRS.

A coreset that a wireless device 1905 receives the DCI from may be associated with a coreset pool index. One or more coreset pool indexes may comprise the coreset pool index. The one or more configuration parameters may indicate, for the coreset, the coreset pool index. The one or more configuration parameters may not indicate, for the coreset, the coreset pool index (CoresetPoolIndex=0 or CoresetPoolIndex=1). A value (e.g., a default value) of the coreset pool index of the coreset may be equal to the first coreset pool index (CoresetPoolIndex=0), for example, based on the one or more configuration parameters not indicating, for the coreset, a coreset pool index.

An uplink resource may be associated with the coreset pool index. The uplink resource may be associated with the coreset pool index, for example, based on receiving, via the coreset associated with the coreset pool index, the DCI scheduling, triggering, and/or indicating transmission of the uplink transmission and/or signal via the uplink resource.

An uplink resource set and/or group comprising an uplink resource may be associated with a coreset pool index. The uplink resource set and/or group may be associated with the coreset pool index, for example, based on receiving, via the coreset associated with the coreset pool index, DCI scheduling, triggering, and/or indicating transmission of the uplink transmission and/or signal via the uplink resource in (that belongs to) the uplink resource set and/or group. The uplink resource set and/or group may comprise one or more uplink resources that comprise the uplink resource. The one or more uplink resources may be associated with the coreset pool index, for example, based on the uplink resource set and/or group comprising the one or more uplink resources being associated with the coreset pool index. Each uplink resource of the one or more uplink resources may be associated with the coreset pool index, for example, based on the uplink resource set and/or group being associated with the coreset pool index.

An uplink transmission and/or signal may be associated with a coreset pool index. The uplink transmission and/or signal may be associated with the coreset pool index, for example, based on receiving, via the coreset associated with the coreset pool index, DCI 1930 scheduling, triggering, and/or indicating transmission of the uplink transmission and/or signal.

One or more configuration parameters may indicate a plurality of TCI states (e.g., DL-orJoint-TCIState). The one or more configuration parameters 1820 may comprise one or more PDSCH configuration parameters, for example, indicating the plurality of TCI states 1870 (e.g., a plurality of TCI states that are TCI state 1, TCI state 2, . . . , and TCI state M, as described herein in FIG. 18). One or more configuration parameters 1820 may indicate a plurality of TCI states 1870 that indicate a unified TCI state for a cell. The one or more configuration parameters 1820 may comprise the one or more PDSCH configuration parameters, for example, for the downlink BWP of the cell. The one or more configuration parameters 1820 may indicate the plurality of TCI states 1870 for a downlink BWP of the cell.

One or more configuration parameters 1820 may comprise one or more PDSCH configuration parameters, for example, for a second downlink BWP of a second cell. The one or more configuration 1820 parameters may indicate a plurality of TCI states 1870 for the second downlink BWP of the second cell. The one or more cells may comprise the second cell. The one or more configuration parameters may comprise, for the downlink BWP of the cell, a reference unified TCI state list parameter (e.g., unifiedTCI-StateRef) indicating the second downlink BWP of the second cell. The reference unified TCI state list parameter may comprise a BWP index (e.g., BWP-Id) identifying (e.g., indicating) the second downlink BWP. The reference unified TCI state list parameter may comprise a cell index (e.g., ServCellIndex) identifying (e.g., indicating) the second cell.

One or more configuration parameters 1820 may comprise a unified-TCI-state-type parameter (e.g., unifiedTCI-StateType as described herein in FIG. 17). The one or more configuration parameters may comprise one or more serving cell parameters (e.g., ServingCellConfig) comprising the unified-TCI-state-type parameter. The unified-TCI-state-type parameter may indicate the unified TCI state type of the cell.

A unified-TCI-state-type parameter may be set to "Joint." A wireless device 1905 may use (e.g., apply) the plurality of TCI states 1870 (e.g., provided and/or indicated by dl-orJoint-TCI-ToAddModList) for both uplink transmissions (e.g., PUSCH/PUCCH/SRS transmissions) of the cell and downlink receptions (e.g., PDCCH/PDSCH/CSI-RS receptions) of the cell, for example, based on the one or more configuration parameters comprising the unified-TCI-state-type parameter set to "Joint."

A unified-TCI-state-type parameter may be set to "Separate." A wireless device 1905 may use (e.g., apply) the plurality of TCI states (e.g., provided and/or indicated by a higher layer parameter dl-orJoint-TCI-ToAddModList) for downlink receptions (e.g., PDCCH/PDSCH/CSI-RS receptions) of the cell, for example, based on the one or more configuration parameters comprising the unified-TCI-state-type parameter set to "Separate." The wireless device may not use (e.g., apply) the plurality of TCI states for uplink transmissions (e.g., PUSCH/PUCCH/SRS transmissions) of the cell, for example, based on the one or more configuration parameters comprising the unified-TCI-state-type parameter set to "Separate."

One or more configuration parameters 1820 may indicate a second plurality of TCI states 1870 (e.g., UL-TCIState, provided and/or indicated by a higher layer parameter ul-TCI-ToAddModList). The one or more configuration parameters 1820 may comprise one or more uplink BWP configuration parameters, for example, indicating the second plurality of TCI states 1870 (e.g., a second plurality of TCI states may be TCI state 1, TCI state 2, . . . , and TCI state M as described herein in FIG. 18).

One or more configuration parameters 1820 may comprise one or more uplink BWP configuration parameters, for example, for an uplink BWP of a cell. The one or more configuration parameters 1820 may indicate a second plurality of TCI states 1870 for the uplink BWP of the cell.

One or more configuration parameters 1820 may comprise one or more uplink BWP configuration parameters, for example, for a second uplink BWP of a second cell. The one or more configuration parameters 1820 may indicate a second plurality of TCI states 1870 for the second uplink BWP of the second cell. One or more cells may comprise the second cell. The one or more configuration parameters 1820 may comprise, for the uplink BWP of the cell, a reference unified TCI state list parameter (e.g., unifiedtci-StateType) indicating the second uplink BWP of the second cell. The reference unified TCI state list parameter may comprise a BWP index (e.g., BWP-Id) identifying (e.g., indicating) the second uplink BWP. The reference unified TCI state list parameter may comprise a cell index (e.g., ServCellIndex) identifying (e.g., indicating) the second cell.

A wireless device 1905 may use (e.g., apply) a second plurality of TCI states 1870 for uplink transmissions (e.g., PUSCH/PUCCH/SRS transmissions) of a cell, for example, based on one or more configuration parameters comprising a unified-TCI-state-type parameter set to "Separate." The wireless device 1905 may not use (e.g., apply) the second plurality of TCI states 1870 for downlink receptions (e.g., PDCCH/PDSCH/CSI-RS receptions) of the cell, for example, based on the one or more configuration parameters comprising the unified-TCI-state-type parameter set to "Separate."

A wireless device 1805 may use, for downlink receptions via a downlink BWP of the cell, a plurality of TCI states 1870, for example, based on one or more configuration parameters 1820 indicating the plurality of TCI states 1870 for the downlink BWP of the cell.

A wireless device 1805 may use, for uplink transmissions receptions via an uplink BWP of a cell, a plurality of TCI states 1870, for example, based on one or more configuration parameters 1820 indicating the plurality of TCI states 1870 for the downlink BWP of the cell.

A wireless device 1805 may use, for downlink receptions via a downlink BWP of the cell, a plurality of TCI states 1870 of a second downlink BWP of a second cell, for example, based on a reference unified TCI state list parameter indicating, for the downlink BWP of the cell, the second downlink BWP of the second cell. The wireless device 1805 may use, for uplink transmissions receptions via an uplink BWP of the cell, the plurality of TCI states 1870 of the second downlink BWP of the second cell, for example, based on the reference unified TCI state list parameter indicating, for the downlink BWP of the cell, the second downlink BWP of the second cell.

A wireless device 1805 may use, for uplink transmissions receptions via an uplink BWP of the cell, a second plurality of TCI states 1870, for example based on one or more configuration parameters 1820 indicating the second plurality of TCI states 1870 for the uplink BWP of the cell. The wireless device 1805 may use, for uplink transmissions receptions via the uplink BWP of the cell, the second plurality 1870 of TCI states of the second uplink BWP of the second cell, for example, based on the reference unified TCI state list parameter indicating, for the uplink BWP of the cell, the second uplink BWP of the second cell.

One or more configuration parameters 1820 may indicate, for a cell, a physical cell identifier (PCI). The one or more configuration parameters 1820 may indicate, for one or more cells, one or more PCIs. The one or more PCIs may comprise the PCI of the cell. The one or more configuration parameters 1820 may comprise a higher layer (e.g., RRC) parameter physCellId indicating the one or more PCIs for the one or more cells. The one or more configuration parameters may indicate, for each cell of the one or more cells, a respective PCI of the one or more PCIs. The one or more configuration parameters may comprise the higher layer (e.g., RRC) parameter physCellId indicating a respective PCI of the one or more PCIs for each cell of the one or more cells. The one or more configuration parameters may indicate, for a first cell of the one or more cells, a first PCI of the one or more PCIs. The first PCI may identify a physical cell identity of the first cell. The one or more configuration parameters may indicate, for a second cell of the one or more cells, a second PCI of the one or more PCIs. The second PCI may identify a physical cell identity of the second cell.

One or more configuration parameters may indicate a list of PCI sets (e.g., indicated by a RRC parameter additionalPCI-ToAddModList as described herein in FIG. 17). The one or more configuration parameters may comprise one or more serving cell parameters (e.g., ServingCellConfig as described herein in FIG. 17) indicating the list of PCI sets. The one or more serving cell parameters may comprise MIMO parameters (e.g., MIMOParam as described herein in FIG. 17) comprising and/or indicating the list of PCI sets. The list of PCI sets may comprise at least one PCI set (e.g., provided and/or indicated by a higher layer parameter SSB-MTC-AdditionalPCI in FIG. 17). The list of PCI sets may be associated with SSB s with different PCI than PCI of the cell.

A list of PCI sets may comprise and/or indicate at least one PCI (e.g., additionalPCI or PhysCellId as described herein in FIG. 17) of one or more PCIs. Each PCI set (e.g., SSB-MTC-AdditionalPCI) of the list of PCI sets may comprise and/or indicate a respective PCI of the at least one PCI. One or more configuration parameters may indicate, for each PCI set of the list of PCI sets, a respective PCI of the at least one PCI. The at least one PCI may not comprise the PCI of the cell. Each PCI of the at least one PCI may be different from the PCI of the cell. The one or more PCIs may comprise the at least one PCI and the PCI of the cell. The at least one PCI may indicate (e.g., identify, etc.) at least one cell of the one or more cells. Each PCI of the at least one PCI may indicate (e.g., identify, etc.) a respective cell of the at least one cell. A first PCI set of the list of PCI sets may comprise a first PCI of the at least one PCI. The first PCI may indicate (e.g., identify, etc.) a first cell of the at least one cell. A second PCI set of the list of PCI sets may comprise a second PCI of the at least one PCI. The second PCI may indicate (e.g., identify, etc.) a second cell of the at least one cell. The at least one cell may not comprise the cell. Each cell of the at least one cell may be different from the cell. The one or more cells may comprise the at least one cell and the cell.

At least one cell may comprise, for example, at least one non-serving cell. The at least one cell may comprise, for example, at least one neighboring cell. The at least one cell may comprise, for example, at least one candidate and/or assisting cell.

A maximum size and/or length (e.g., maxNrofAdditionalPCI) of a list of PCI sets may be equal to a value (e.g., 7). A maximum quantity of PCI sets in the list of PCI sets may be equal to a value (e.g., 7).

A list of at least one PCI set may comprise and/or indicate at least one additional PCI index (e.g., additionalPCIIndex in FIG. 17). Each PCI set (e.g., SSB-MTC-AdditionalPCI) of the list of PCI sets may comprise and/or indicate a respective additional PCI index of the at least one additional PCI index. One or more configuration parameters may indicate the at least one additional PCI index for the list of PCI sets. The one or more configuration parameters may indicate, for each PCI set of the list of PCI sets, a respective additional PCI index of the at least one additional PCI index. Each PCI set of the list of PCI sets may be identified and/or indicated by a respective additional PCI index of the at least one additional PCI index. a first PCI set of the list of PCI sets may be identified and/or indicated by a first additional PCI index of the at least one additional PCI index. A second PCI set of the list of PCI sets may be identified and/or indicated by a second additional PCI index of the at least one additional PCI index.

One or more configuration parameters may indicate a list of PCI sets, for example, for inter-cell beam management. The one or more configuration parameters may indicate the list of PCI sets, for example, for inter-cell multi-TRP operation/mode.

A list of PCI sets, for example, may be equal to [{1, PCI 5}, {2, PCI 2}, {3, PCI 4}, {4, PCI 10}, {5, PCI 21}]. The PCI of a cell may be different from PCI 5, PCI 2, PCI 4, PCI 10, and PCI 21. The following conditions may apply:

- {1, PCI 5) may be a first PCI set of a list of PCI sets. '1' may be a first additional PCI index of a first PCI set. PCI 5 may be a first PCI indicating, identifying, and/or of a first cell.
- {2, PCI 2) may be a second PCI set of a list of PCI sets. '2' may be a second additional PCI index of a second PCI set. PCI 2 indicating, identifying, and/or of a second PCI indicating, identifying, and/or of a second cell.
- {3, PCI 4) may be a third PCI set of a list of PCI sets. '3' may be a third additional PCI index of a third PCI set. PCI 4 may be a third PCI indicating, identifying, and/or of a third cell.

{4, PCI 10) may be a fourth PCI set of a list of PCI sets. '4' may be a fourth additional PCI index of a fourth PCI set. PCI 10 may be a fourth PCI indicating, identifying, and/or of a fourth cell.

{5, PCI 21) may be a fifth PCI set of a list of PCI sets. '5' may be a fifth additional PCI index of the fifth PCI set. PCI 21 may be a fifth PCI indicating, identifying, and/or of a fifth cell.

At least one additional PCI index may comprise a first additional PCI index (1), a second additional PCI index (2), a third additional PCI index (3), a fourth additional PCI index (4), a fifth additional PCI index (5).

At least one PCI may comprise PCI 5, PCI 2, PCI 4, PCI 10, and/or PCI 21.

At least one cell may comprise a first cell, a second cell, a third cell, a fourth cell and/or a fifth cell.

One or more cells may comprise the at least one cell and the cell.

One or more configuration parameters may indicate, for one or more TCI states of a plurality of TCI states and/or a second plurality of TCI states, at least one additional PCI index. The one or more configuration parameters may indicate, for each TCI state of the one or more TCI states, a respective additional PCI index (e.g., additionalPCI, AdditionalPCIIndex) of the at least one additional PCI index. The one or more configuration parameters may indicate, for a first TCI state of the one or more TCI states, a first additional PCI index (e.g., 1) of the at least one additional PCI index. The first additional PCI index may indicate (e.g., identify, etc.) a first PCI set of the list of PCI sets. The one or more configuration parameters may indicate, for a second TCI state of the one or more TCI states, a second additional PCI index (e.g., 2) of the at least one additional PCI index. The second additional PCI index may indicate (e.g., identify, etc.) a second PCI set of the list of PCI sets. The one or more configuration parameters may indicate, for a third TCI state of the one or more TCI states, a third additional PCI index (e.g., 3) of the at least one additional PCI index, and so on. The third additional PCI index may indicate (e.g., identify, etc.) a third PCI set of the list of PCI sets.

A TCI state of the one or more TCI states may be associated with an additional PCI index of at least one additional PCI index, for example, based on one or more configuration parameters indicating, for a TCI state, the additional PCI index. The TCI state may comprise the additional PCI index. The additional PCI index may indicate (e.g., identify, etc.) a PCI set of a list of at least one PCI set. The PCI set may comprise and/or indicate a second PCI of the at least one PCI. The second PCI may indicate (e.g., identify, etc.) a second cell of the at least one cell. The TCI state may be associated with the second PCI and/or the second cell, for example, based on the one or more configuration parameters indicating, for the TCI state, the additional PCI index indicating the second PCI and/or the second cell. The second PCI of the second cell may be, for example, different from the PCI of the cell.

One or more configuration parameters 1820 may not indicate, for one or more TCI states of a plurality of TCI states 1870, an additional PCI index of at least one additional PCI index. An additional PCI index may be absent (e.g., not present) in configuration parameters of the one or more TCI states. The one or more configuration parameters 1820 may comprise the configuration parameters of the one or more TCI states. The one or more TCI states of the plurality of TCI states may not be associated with an additional PCI index. The one or more TCI states may not comprise an additional PCI index. Each TCI state of the one or more TCI states may not comprise an additional PCI index. The one or more TCI states may be associated with the cell and/or the PCI of the cell, for example, based on the one or more configuration parameters not indicating, for the one or more TCI states of the plurality of TCI states, an additional PCI index. The one or more TCI states may be associated with the cell and/or the PCI of the cell, for example, based on the one or more configuration parameters not indicating, for each TCI state of the one or more TCI states, an additional PCI index. The one or more TCI states may be associated with the cell and/or the PCI of the cell, for example, based on the one or more configuration parameters not indicating, for each TCI state of the one or more TCI states, an additional PCI index of the at least one additional PCI index.

A wireless device 1805 may receive a control command 1830 (e.g., MAC-CE, DCI, downlink control command/message, Unified TCI States Activation/Deactivation MAC CE, Activation command at time T1 as described herein in FIG. 18 etc.). The control command 1830 may indicate activation of a subset of TCI states 1880*a* of a plurality of TCI states (e.g., DLorJoint-TCIState). The control command may indicate activation of a subset of TCI states 1880 of a second plurality of TCI states (e.g., UL-TCIState).

A wireless device may map a subset of TCI states 1880*a* to one or more TCI codepoints 1880*b*. The wireless device may map respective TCI states of the subset of TCI states 1880*a* to a respective TCI codepoint of the one or more TCI codepoints 1880*b*. The one or more TCI codepoints 1880*b* may indicate and/or comprise the subset of TCI states 1880*a*. Each TCI codepoint of the one or more TCI codepoints 1880*b* may indicate and/or be mapped to respective TCI states of the subset of TCI states 1880*a*. Each TCI codepoint of the one or more TCI codepoints 1880*b* may indicate, comprise, and/or be mapped to one or more TCI states.

In FIG. 18, for example, a subset of TCI states 1880*a* may be TCI state 4, TCI state 5, TCI state 8, TCI state 26, TCI state 61, and TCI state 42. One or more TCI codepoints 1880*b* may comprise a first TCI codepoint (e.g., TCI codepoint 000), a second TCI codepoint (e.g., TCI codepoint 001), a third TCI codepoint (e.g., TCI codepoint 110), and a fourth TCI codepoint (e.g., TCI codepoint 111). The first TCI codepoint (e.g., TCI codepoint 000) may comprise and/or indicate the TCI state 4. The second TCI codepoint (e.g., TCI codepoint 001) may comprise and/or indicate the TCI state 5 and the TCI state 8. The third TCI codepoint (e.g., TCI codepoint 110) may comprise and/or indicate the TCI state 26 and TCI state 61. The fourth TCI codepoint (e.g., TCI codepoint 111) may comprise and/or indicate the TCI state 42. The first TCI codepoint (e.g., TCI codepoint 000) and the fourth TCI codepoint (e.g., TCI codepoint 111) indicate a single TCI state. The second TCI codepoint (e.g., TCI codepoint 001) and the third TCI codepoint (e.g., TCI codepoint 110) indicate two TCI states (e.g., two joint TCI states, two uplink TCI states, two downlink TCI states, etc.).

A quantity of the one or more TCI codepoints 1880*b* may be equal to one. The one or more TCI codepoints 1880*b* may be a single TCI codepoint. The single TCI codepoint may indicate, comprise, and/or be mapped to at least two TCI states of the plurality of TCI states 1870. The subset of TCI states 1880*a* may be the at least two TCI states. The wireless device 1805 may not receive DCI 1840 indicating activation of one or more TCI states among the subset of TCI states 1880*a*, for example, based on the quantity of the one or more TCI codepoints 1880*b* being equal to one. A control command 1830 may indicate activation of the at least two TCI states. The wireless device 1805 may not receive DCI 1840 indicating activation of one or more TCI states among the subset of TCI states 1880*a*, for example, based on the control command 1830 indicating activation of the at least two TCI states. The at least two TCI states may comprise a first TCI state (e.g., TCI state 26 as described herein in FIG. 18) and a second TCI state (e.g., TCI state 61 as described herein in FIG. 18).

A quantity of one or more TCI codepoints 1880*b* may be greater than one. A wireless device 1805 may receive DCI 1840 (e.g., DCI at time T2 as described herein in FIG. 18). The DCI 1840 may comprise a TCI field 1845. The TCI field 1845 may indicate a TCI codepoint of the one or more TCI codepoints 1880*b*. A value of the TCI field 1845 (e.g., TCI field=110 as described herein in FIG. 18) may indicate and/or be equal to the TCI codepoint.

A TCI codepoint may comprise, indicate, and/or be mapped to at least two TCI states (e.g., TCI state 26 and TCI state 61 as described herein in FIG. 18). The subset of TCI states 1880*a* may comprise the at least two TCI states of the TCI codepoint. The DCI 1840 may indicate activation of the at least two TCI states. The at least two TCI states may comprise a first TCI state (e.g., TCI state 26 as described herein in FIG. 18) and a second TCI state (e.g., TCI state 61 as described herein in FIG. 18).

FIG. 19 shows an example of TCI state activation. A wireless device 1905 may receive a first control command 1920 (e.g., MAC-CE, DCI, downlink control command/message, Unified TCI States Activation/Deactivation MAC CE, Activation command 1 at time T1 as described herein in FIG. 19 etc.). The first control command 1920 may activate, select, indicate, update and/or indicate activation of a first subset of TCI states 1970*a* of the plurality of TCI states 1870 (e.g., DLorJoint-TCIState). The first control command 1920 may activate, select, indicate, update and/or indicate activation of a first subset of TCI states 1970*a* of the second plurality of TCI states 1870 (e.g., UL-TCIState).

A first control command 1920 may comprise a field (e.g., CoresetPoolID) with a first coreset pool index 1925 (e.g., Coreset pool index 0). A value in the field may be equal to the first coreset pool index 1925. The first coreset pool index 1925 may be, for example, equal to zero. The first subset of TCI states 1970*a* may be associated with the first coreset pool index 1925. The first subset of TCI states 1970*a* may be associated with the first coreset pool index 1925, for example, based on the first control command 1920, indicating activation of the first subset of TCI states 1970*a*, comprising the field with the first coreset pool index 1925. The wireless device may activate the first subset of TCI states 1970*a* for the first coreset pool index 1925.

A wireless device 1905 may map a first subset of TCI states 1970*a* to one or more first TCI codepoints 1970*b*. The wireless device 1905 may map respective TCI states of the first subset of TCI states 1970*a* to a respective TCI codepoint of the one or more first TCI codepoints 1970*b*. The one or more first TCI codepoints 1970*b* may indicate and/or comprise the first subset of TCI states 1970*a*. Each TCI codepoint of the one or more first TCI codepoints 1970*b* may comprise, indicate, and/or be mapped to respective TCI states of the first subset of TCI states 1970*a*. Each TCI codepoint of the one or more first TCI codepoints 1970*b* may comprise, indicate, and/or be mapped to one or more TCI states. The one or more first TCI codepoints 1970*b* may be associated with the first coreset pool index 1925.

in FIG. 19, for example, a first subset of TCI states 1970*a* may comprise TCI state 4, TCI state 5, TCI state 26, and/or TCI state 42. One or more first TCI codepoints 1970*b* may comprise a first TCI codepoint (e.g., TCI codepoint 000), a second TCI codepoint (e.g., TCI codepoint 001), a third TCI codepoint (e.g., TCI codepoint 110), and a fourth TCI codepoint (e.g., TCI codepoint 111). The first TCI codepoint (e.g., TCI codepoint 000) may comprise and/or indicate the TCI state 4. The second TCI codepoint (e.g., TCI codepoint 001) may comprise and/or indicate the TCI state 5. The third TCI codepoint (e.g., TCI codepoint 110) may comprise and/or indicate the TCI state 26. The fourth TCI codepoint (e.g., TCI codepoint 111) may comprise and/or indicate the TCI state 42. The first TCI codepoint (e.g., TCI codepoint 000), the second TCI codepoint (e.g., TCI codepoint 001), the third TCI codepoint (e.g., TCI codepoint 110) and the fourth TCI codepoint (e.g., TCI codepoint 111) indicate a single TCI state (e.g., a single joint TCI state, a single uplink TCI state, a single downlink TCI state, etc.).

A quantity of one or more first TCI codepoints 1970*b* may be equal to one. The one or more first TCI codepoints 1970*b* may be a single TCI codepoint. The single TCI codepoint may indicate a first TCI state of a plurality of TCI states. The first subset of TCI states 1970*a* may be the first TCI state. The wireless device may not receive DCI indicating activation of one or more TCI states among the first subset of TCI states 1970*a*, for example, based on the quantity of the one or more first TCI codepoints 1970*b* being equal to one. The wireless device 1905 may not receive DCI indicating activation of one or more TCI states among the first subset of TCI states 1970*a*, for example, based on the first control command 1920 indicating activation of the first TCI state.

A quantity of one or more first TCI codepoints 1970*b* may be greater than one. A wireless 1905 device may receive, via a first coreset 1938 (e.g., Coreset 1 in FIG. 19) with the first coreset 1938 pool index 1925 (e.g., Coreset pool index 0), first DCI 1930 (e.g., DCI 1 at time T2 in FIG. 19). The plurality of coresets may comprise the first coreset 1938. The one or more configuration parameters may indicate, for the first coreset 1938, the first coreset pool index 1925. The one or more configuration parameters may not indicate, for the first coreset 1938, a coreset pool index. The first coreset 1938 may be associated with the first coreset pool index 1925 (e.g., Coreset pool index 0), for example, based on the one or more configuration parameters not indicating, for the first coreset 1938, a coreset pool index. A default value for coreset pool index of the first coreset 1938 may be equal to the first coreset pool index 1925 (e.g., Coreset pool index 0), for example, based on the one or more configuration parameters not indicating, for the first coreset 1938, a coreset pool index.

First DCI 1930 (e.g., DCI 1 as described herein in FIG. 19) may be, for example, DCI format 1_1. The first DCI 1930 may be, for example, DCI format 1_2. The first DCI 1930 may be, for example, DCI format 1_x, if x=0, 1, 2 . . . . The first DCI 1930 may be, for example, DCI format 0_x, if x=0, 1, 2 . . . .

First DCI 1930 may comprise a first TCI field 1935. The first TCI field 1935 may indicate a first TCI codepoint in the one or more first TCI codepoints 1970*b*. The first TCI field 1935 may indicate the first TCI codepoint of the one or more first TCI codepoints 1970*b* associated with the first coreset pool index 1925, for example, based on the receiving the first DCI 1930 via the first coreset 1938 with the first coreset pool index 1925. A value of the first TCI field 1935 (e.g., 110 in FIG. 19) may be, for example, equal to the first TCI codepoint. The value of the first TCI field 1935 may be, for example, indicate the first TCI codepoint. The first TCI codepoint (e.g., 110) may indicate, comprise, and/or be mapped to a first TCI state (e.g., TCI state 26 in FIG. 19).

The first subset of TCI states 1970*a* may comprise the first TCI state. The first DCI 1930 may activate and/or indicate activation of the first TCI state. The first DCI 1930 may indicate activation of the first TCI state. The first TCI field 1935 in the first DCI 1930 may indicate the first TCI state in the first subset of TCI states 1970*a*, for example, based on the receiving the first DCI 1930 via the first coreset 1938 with the first coreset pool index 1925. The first TCI field 1935 in the first DCI 1930 may indicate the first TCI state in the first subset of TCI states 1970*a*, for example, based on the first control command 1920, indicating activation of the first subset of TCI states 1970*a*, comprising the field with the first coreset pool index 1925 that may be the same as that of the first coreset 1938.

A first TCI state may be associated with and/or activated for a first coreset pool index 1925. The first TCI state may be associated with downlink and/or uplink receptions and/or transmissions associated with the first coreset pool index 1925. The first TCI state may be associated with the downlink and/or uplink receptions and/or transmissions associated with the first coreset pool index 1925, for example, based on receiving, via the first coreset 1938 with the first coreset pool index 1925, the first DCI 1930 indicating activation of the first TCI state.

The wireless device may apply the first TCI state to downlink receptions (e.g., PDSCH receptions, transport block, PDCCH receptions, CSI-RS, DM-RS, etc.) associated with the first coreset pool index 1925. The one or more configuration parameters may indicate, for a coreset of the plurality of coresets, the first coreset pool index 1925. The wireless device may monitor downlink control channels in the core set based on the first TCI state, for example, based on (e.g., in response to) the one or more configuration parameters indicating, for the coreset, the first coreset pool index 1925. The wireless device may receive, via a coreset with the first coreset pool index 1925, DCI scheduling a downlink signal (e.g., PDSCH transmission, transport block, DM-RS, CSI-RS, aperiodic CSI-RS). The plurality of coresets may comprise the coreset. The downlink signal may be associated with the first coreset pool index 1925, for example, based on the receiving the DCI via the coreset with the first coreset pool index 1925. The wireless device may receive the downlink signal based on the first TCI state, for example, based on (e.g., in response to) the downlink signal being associated with the first coreset pool index 1925. The wireless device may receive a downlink signal (e.g., PDSCH transmission, transport block, DM-RS, CSI-RS, aperiodic CSI-RS) based on the first TCI state, for example, based on (e.g., in response to) the one or more configuration parameters indicating, for the downlink signal and/or a resource set comprising the downlink signal, the first coreset pool index 1925.

A wireless device may apply the first TCI state to uplink transmissions (e.g., PUSCH transmissions, transport block, PUCCH transmissions, SRS, etc.) associated with the first coreset pool index 1925.

One or more configuration parameters may indicate, for an uplink resource and/or an uplink resource set and/or group comprising an uplink resource, a first coreset pool index 1925. A wireless device 1905 may send (e.g., transmit), via the uplink resource, an uplink signal (e.g., UCI, HARQ-ACK, SR, CSI report, SRS) based on a first TCI state, for example, based on (e.g., in response to) the one or more configuration parameters indicating, for the uplink resource and/or the uplink resource set and/or group comprising the uplink resource, the first coreset pool index 1925. The uplink BWP (e.g., active uplink BWP) of a cell may comprise the uplink resource. The uplink resource may be, for example, a PUCCH resource. The uplink signal may be a UCI (e.g., UCI, HARQ-ACK, SR, CSI report). The uplink resource may be, for example, a SRS resource. The uplink signal may be a SRS. The uplink resource may be, for example, a PUSCH resource. The uplink signal may be a PUSCH transmission (e.g., transport block) of a configured uplink grant (e.g., Type 1 configured uplink grant). Transmission of the uplink signal via the uplink resource may be associated with the first coreset pool index 1925, for example, based on the one or more configuration parameters indicating, for the uplink resource and/or the uplink resource set and/or group comprising the uplink resource, the first coreset pool index 1925.

A wireless device 1905 may receive, via a coreset 1938 with a first coreset pool index 1925, DCI 1930 triggering and/or scheduling transmission of an uplink signal (e.g., PUSCH transmission, transport block, SRS, HARQ-ACK). A plurality of coresets may comprise the coreset. The uplink signal may be associated with the first coreset pool index 1925, for example, based on the receiving the DCI 1930 via the coreset 1938 with the first coreset pool index 1925. The wireless device may send (e.g., transmit) the uplink signal based on the first TCI state, for example, based on (e.g., in response to) the uplink signal being associated with the first coreset pool index 1925.

A wireless device 1905 may receive a second control command 1940 1940 (e.g., MAC-CE, DCI, downlink control command/message, Unified TCI States Activation/Deactivation MAC CE, Activation command 2 at time T3 as described herein in FIG. 19 etc.). The second control command 1940 may activate, select, indicate, update and/or indicate activation of a second subset of TCI states 1980*a* of the plurality of TCI states (e.g., DLorJoint-TCIState). The second control command 1940 may activate, select, indicate, update and/or indicate activation of a second subset of TCI states 1980*a* of the second plurality of TCI states (e.g., UL-TCIState).

A second control command 1940 may comprise a field (e.g., CoresetPoolID) with a second coreset pool index 1945 (e.g., Coreset pool index 1 in FIG. 19). A value in the field may be equal to the second coreset pool index 1945. The second coreset pool index 1945 may be, for example, equal to one. A second subset of TCI states 1980*a* may be associated with the second coreset pool index 1945. The second subset of TCI states 1980*a* may be associated with the second coreset pool index 1945, for example, based on the second control command 1940, indicating activation of the second subset of TCI states 1980*a*, comprising the field with the second coreset pool index 1945. The wireless device may activate the second subset of TCI states 1980*a* for the second coreset pool index 1945.

A wireless device 1905 may map the second subset of TCI states 1980*a* to one or more second TCI codepoints 1980*b*. The wireless device 1905 may map respective TCI states of the second subset of TCI states 1980*a* to a respective TCI codepoint of the one or more second TCI codepoints 1980*b*. The one or more second TCI codepoints 1980*b* may indicate, comprise, and/or be mapped to the second subset of TCI states 1980*a*. Each TCI codepoint of the one or more second TCI codepoints 1980*b* may comprise, indicate, and/or be mapped to respective TCI states of the second subset of TCI states 1980*a*. Each TCI codepoint of the one or more second TCI codepoints 1980*b* may comprise, indicate, and/or be mapped to one or more TCI states. The one or more second TCI codepoints 1980*b* may be associated with the second coreset pool index 1945.

In FIG. 19, for example, a second subset of TCI states 1980*a* may be TCI state 8, TCI state 61, and TCI state 21. One or more second TCI codepoints 1980*b* may comprise a first TCI codepoint (e.g., TCI codepoint 000), a second TCI codepoint (e.g., TCI codepoint 001), and a third TCI codepoint (e.g., TCI codepoint 110). The first TCI codepoint (e.g., TCI codepoint 000) may comprise and/or indicate the TCI state 8. The second TCI codepoint (e.g., TCI codepoint 001) may comprise and/or indicate the TCI state 61. The third TCI codepoint (e.g., TCI codepoint 110) may comprise and/or indicate the TCI state 21. The first TCI codepoint (e.g., TCI codepoint 000), the second TCI codepoint (e.g., TCI codepoint 001), and the third TCI codepoint (e.g., TCI codepoint 110) may comprise and/or indicate a single TCI state (e.g., a single joint TCI state, a single uplink TCI state, a single downlink TCI state, etc.).

A quantity of one or more second TCI codepoints 1980*b* may be equal to one. One or more second TCI codepoints 1980*b* may be a single TCI codepoint. The single TCI codepoint may indicate a second TCI state of a plurality of TCI states. The second subset of TCI states 1980*a* may be the second TCI state. A wireless device 1905 may not receive DCI 1950 indicating activation of one or more TCI states among the second subset of TCI states 1980*a*, for example, based on the quantity of the one or more second TCI codepoints 1980*b* being equal to one. The wireless device 1905 may not receive DCI 1950 indicating activation of one or more TCI states among the second subset of TCI states 1980*a*, for example, based on the second control command 1940 indicating activation of the second TCI state.

A quantity of one or more second TCI codepoints 1980*b* may be greater than one. A wireless device 1905 may receive, via a second coreset 1958 (e.g., Coreset 2 in FIG. 19) with a second coreset 1958 pool index 1945 (e.g., Coreset pool index 1), second DCI 1950 (e.g., DCI 2 at time T4 in FIG. 19). One or more configuration parameters may indicate, for the second coreset 1958, the second coreset pool index 1945. The plurality of coresets may comprise the second coreset 1958.

Second DCI 1950 may be, for example, DCI format 1_1. The second DCI 1950 may be, for example, DCI format 1_2. The second DCI 1950 may be, for example, DCI format 1_x, if x=0, 1, 2 . . . . The second DCI 1950 may be, for example, DCI format 0_x, if x=0, 1, 2 . . . . The second DCI 1950 may comprise a second TCI field 1955. The second TCI field 1955 may indicate a second TCI codepoint in the one or more second TCI codepoints 1980*b*. The second TCI field 1955 may indicate the second TCI codepoint of the one or more second TCI codepoints 1980*b* associated with the second coreset pool index 1945, for example, based on the receiving the second DCI 1950 via the second coreset 1958 with the second coreset pool index 1945. A value of the second TCI field 1955 (e.g., 001 in FIG. 19) may be, for example, equal to the second TCI codepoint. The value of the second TCI field 1955 may be, for example, indicate the second TCI codepoint. The second TCI codepoint (e.g., 001) may indicate, comprise, and/or be mapped to a second TCI state (e.g., TCI state 61 in FIG. 19). The second subset of TCI states 1980*a* may comprise the second TCI state. The second DCI 1950 may activate and/or indicate activation of the second TCI state. The second DCI 1950 may indicate activation of the second TCI state. The second TCI field 1955 in the second DCI 1950 may indicate the second TCI state in the second subset of TCI states 1980*a*, for example, based on the receiving the second DCI 1950 via the second coreset 1958 with the second coreset pool index 1945. The second TCI field 1955 in the second DCI 1950 may indicate the second TCI state in the second subset of TCI states 1980*a*, for example, based on the second control command 1940, that indicates activation of the second subset of TCI states 1980*a*, comprising the field with the second coreset pool index 1945 that may be the same as that of the second coreset 1958.

A second TCI state may be associated with and/or activated for a second coreset pool index 1945. The second TCI state may be associated with downlink and/or uplink receptions and/or transmissions associated with the second coreset pool index 1945. The second TCI state may be associated with the downlink and/or uplink receptions and/or transmissions associated with the second coreset pool index 1945, for example, based on the receiving, via the second coreset 1958 with the second coreset pool index 1945, second DCI 1950 indicating activation of the second TCI state.

A wireless device 1905 may apply a second TCI state to downlink receptions (e.g., PDSCH receptions, transport block, PDCCH receptions, CSI-RS, DM-RS, etc.) associated with a second coreset pool index 1945. One or more configuration parameters may indicate, for a coreset of a plurality of coresets, the second coreset pool index 1945. The wireless device 1905 may monitor downlink control channels in the coreset based on the second TCI state, for example, based on (e.g., in response to) the one or more configuration parameters indicating, for the coreset, the second coreset pool index 1945. The wireless device 1905 may receive, via a coreset with the second coreset pool index 1945, DCI scheduling a downlink signal (e.g., PDSCH transmission, transport block, DM-RS, CSI-RS, aperiodic CSI-RS). The plurality of coresets may comprise the coreset. The downlink signal may be associated with the second coreset pool index 1945, for example, based on the receiving the DCI via the coreset with the second coreset pool index 1945. The wireless device 1905 may receive the downlink signal based on the second TCI state, for example, based on (e.g., in response to) the downlink signal being associated with the second coreset pool index 1945. The wireless device 1905 may receive a downlink signal (e.g., PDSCH transmission, transport block, DM-RS, CSI-RS, aperiodic CSI-RS) based on the second TCI state, for example, based on (e.g., in response to) the one or more configuration parameters indicating, for the downlink signal and/or a resource set comprising the downlink signal, the second coreset pool index 1945.

A wireless device 1905 may apply a second TCI state to uplink transmissions (e.g., PUSCH transmissions, transport block, PUCCH transmissions, SRS, etc.) associated with a second coreset pool index 1945. One or more configuration parameters may indicate, for an uplink resource and/or an uplink resource set and/or group comprising an uplink resource, the second coreset pool index 1945. The wireless device 1905 may send (e.g., transmit), via the uplink resource, an uplink signal (e.g., UCI, HARQ-ACK, SR, CSI report, SRS) based on the second TCI state, for example, based on (e.g., in response to) the one or more configuration parameters indicating, for the uplink resource and/or the uplink resource set and/or group comprising the uplink resource, the second coreset pool index 1945. An uplink BWP (e.g., an active uplink BWP) of a cell may comprise the uplink resource. The uplink resource may be, for example, a PUCCH resource. The uplink signal may be a UCI (e.g., UCI, HARQ-ACK, SR, CSI report). The uplink resource may be, for example, a SRS resource. The uplink signal may be a SRS. The uplink resource may be, for example, a PUSCH resource. The uplink signal may be a PUSCH transmission (e.g., transport block) of a configured uplink grant (e.g., Type 1 configured uplink grant). Sending (e.g., transmitting) the uplink signal via the uplink resource may be associated with the second coreset pool index 1945, for example, based on the one or more configuration parameters indicating, for the uplink resource and/or the uplink resource set and/or group comprising the uplink resource, the second coreset pool index 1945.

A wireless device 1905 may receive, via a coreset with the second coreset pool index 1945, DCI triggering and/or scheduling transmission of an uplink signal (e.g., PUSCH transmission, transport block, SRS, HARQ-ACK). A plurality of coresets may comprise the coreset. The uplink signal may be associated with the second coreset pool index 1945, for example, based on receiving the DCI via the coreset with the second coreset pool index 1945. The wireless device may send (e.g., transmit) the uplink signal based on the second TCI state, for example, based on (e.g., in response to) the uplink signal being associated with the second coreset pool index 1945.

A first TCI state may comprise and/or indicate a first reference signal (e.g., CSI-RS, SSB/PBCH block, DM-RS, SRS, etc.). The first TCI state may comprise and/or indicate a first quasi co-location type (e.g., QCL TypeA, QCL TypeB, QCL TypeC, QCL TypeD).

A first TCI state may be associated with a PCI of a cell. The first TCI state may not comprise an additional PCI index of at least one additional PCI index. An additional PCI index may be absent in configuration parameters of the first TCI state. One or more configuration parameters may comprise a configuration parameters of the first TCI state. The first TCI state may be associated with the PCI of the cell, for example, based on the first TCI state not comprising an additional PCI index of the at least one additional PCI index. A first reference signal may be quasi co-located with a first SS/PBCH block. The first reference signal may be a first SS/PBCH block. The first reference signal may be quasi co-located with a first CSI-RS that may be quasi co-located with a first SS/PBCH block. The first SS/PBCH block may be associated with the cell. The first SS/PBCH block may be associated with the PCI of the cell. The one or more configuration parameters may indicate, for the cell, the first SS/PBCH block.

A first TCI state may be associated with a second PCI of a second cell. At least one cell of one or more cells may comprise the second cell. At least one PCI in and/or indicated by the list of PCI sets may comprise the second PCI. The second PCI may indicate (e.g., identify, etc.) the second cell. The first TCI state may comprise an additional PCI index of the at least one additional PCI index. The one or more configuration parameters may indicate, for the first TCI state, an additional PCI index. The additional PCI index may indicate a PCI set of the list of PCI sets. The PCI set may comprise and/or indicate the second PCI of the second cell. The first TCI state may be associated with the second PCI of the second cell, for example, based on the first TCI state comprising the additional PCI index indicating the second PCI of the second cell. The first TCI state may be associated with the second PCI of the second cell, for example, based on the one or more configuration parameters indicating, for the first TCI state, the additional PCI index that indicates the second PCI of the second cell. The first reference signal may be quasi co-located with a first SS/PBCH block. A first reference signal may be a first SS/PBCH block. The first reference signal may be quasi co-located with a first CSI-RS that may be quasi co-located with a first SS/PBCH block. The first SS/PBCH block may be associated with the second cell. The first SS/PBCH block may be associated with the second PCI of the second cell. The one or more configuration parameters may indicate, for the second cell, the first SS/PBCH block.

A second TCI state may comprise and/or indicate a second reference signal (e.g., CSI-RS, SSB/PBCH block, DM-RS, SRS, etc.). The second TCI state may comprise and/or indicate a second quasi co-location type (e.g., QCL TypeA, QCL TypeB, QCL TypeC, QCL TypeD). The second TCI state may be associated with a PCI of the cell. The second TCI state may not comprise an additional PCI index of the at least one additional PCI index. An additional PCI index may be absent in configuration parameters of the second TCI state. One or more configuration parameters may comprise a configuration parameters of the second TCI state. The second TCI state may be associated with the PCI of the cell, for example, based on the second TCI state not comprising an additional PCI index of the at least one additional PCI index. The second reference signal may be quasi co-located with a second SS/PBCH block. The second reference signal may be a second SS/PBCH block. The second reference signal may be quasi co-located with a second CSI-RS that may be quasi co-located with a second SS/PBCH block. The second SS/PBCH block may be associated with the cell. The second SS/PBCH block may be associated with the PCI of the cell. The one or more configuration parameters may indicate, for the cell, the second SS/PBCH block.

A second TCI state may be associated with a second PCI of a second cell. At least one cell of one or more cells may comprise the second cell. At least one PCI in and/or indicated by a list of PCI sets may comprise the second PCI. The second PCI may indicate (e.g., identify, etc.) the second cell. The second TCI state may comprise an additional PCI index of at least one additional PCI index. One or more configuration parameters may indicate, for the second TCI state, the additional PCI index. The additional PCI index may indicate a PCI set of the list of PCI sets. The PCI set may comprise and/or indicate the second PCI of the second cell. The second TCI state may be associated with the second PCI of the second cell, for example, based on the second TCI state comprising the additional PCI index indicating the second PCI of the second cell. The second TCI state may be associated with the second PCI of the second cell, for example, based on the one or more configuration parameters indicating, for the second TCI state, the additional PCI index that may indicate the second PCI of the second cell. A second reference signal may be quasi co-located with a second SS/PBCH block. The second reference signal may be a second SS/PBCH block. The second reference signal may be quasi co-located with a second CSI-RS that may be quasi co-located with a second SS/PBCH block. The second SS/PBCH block may be associated with the second cell. The second SS/PBCH block may be associated with the second PCI of the second cell. The one or more configuration parameters may indicate, for the second cell, the second SS/PBCH block.

A second cell identified and/or indicated by a second PCI may be a non-serving cell. The second cell identified and/or indicated by the second PCI may be a neighboring cell. The second cell identified and/or indicated by the second PCI may be a candidate and/or assisting cell.

One or more configuration parameters may indicate, for a first TCI state, a first TCI state index (e.g., tci-StateId). The one or more configuration parameters may indicate, for the second TCI state, a second TCI state index. The first TCI state index may be lower (e.g., less) than the second TCI state index.

A control command indicating activation of a subset of TCI states may comprise a plurality of fields. A first field of the plurality of fields may indicate a first TCI state. The first field may comprise the first TCI state index identifying and/or indicating the first TCI state. The first field may be located in a first octet of the control command. A second field of the plurality of fields may indicate the second TCI state. The second field may comprise the second TCI state index identifying and/or indicating the second TCI state. The second field may be located in a second octet of the control command. The first octet may be lower (e.g., less) than the second octet. The first octet may be Octet 5, and the second octet may be Octet 6. The first octet may be Octet 1, and the second octet may be Octet 2. The first octet may be Octet 9, and the second octet may be Octet 10. A base station may order the first TCI state index and the second TCI state index based on an ordinal position in the control command. Octet n of the control command may comprise the first TCI state index identifying (e.g., indicating) the first TCI state, and Octet m of the control command may comprise the second TCI state index identifying (e.g., indicating) the second TCI state, for example, if n<m.

A control command may indicate, map, and/or activate a set, list, and/or vector of at least two TCI states to a TCI codepoint. The control command may indicate a mapping, an association, and/or an activation of the set, list, and/or vector of the at least two TCI states to the TCI codepoint. The at least two TCI states may comprise a first TCI state and a second TCI state. The first TCI state may occur first in the set, list, and/or vector of the at least two TCI states. The first TCI state may be a first (e.g., starting, earliest, initial etc.) TCI state in the set, list, and/or vector of the at least two TCI states. The second TCI state may occur second in the set, list, and/or vector of the at least two TCI states. The second TCI state may be a last (e.g., latest, ending, etc.) TCI state in the set, list, and/or vector of the at least two TCI states. The first TCI state may be TCI state 5 and the second TCI state may be TCI state 8, for example, if the set, list, and/or vector of the at least two TCI states=[TCI state 5, TCI state 8]. The first TCI state may be TCI state 26 and the second TCI state may be TCI state 61, for example, if the set, list, and/or vector of the at least two TCI states=[TCI state 26, TCI state 61].

A wireless device may apply a first TCI state to one or more first uplink channels and/or resources of the cell. The wireless device may send (e.g., transmit), via the one or more first uplink channels and/or resources, uplink signals based on the first TCI state. The wireless device may send (e.g., transmit), via each uplink channel and/or resource of the one or more first uplink channels and/or resources, a respective uplink signal of the uplink signals based on the first TCI state.

A wireless device may send (e.g., transmit), via one or more first uplink channels and/or resources, uplink signals with transmission powers determined based on a first TCI state. The wireless device may send (e.g., transmit), via each uplink channel and/or resource of the one or more first uplink channels and/or resources, an uplink signal with a respective transmission power determined based on the first TCI state. The wireless device may send (e.g., transmit), via a first uplink channel and/or resource of the one or more first uplink channels and/or resources, a first uplink signal with a first transmission power determined based on the first TCI state. The wireless device may determine the first transmission power based on one or more first power control parameters (e.g., target received power, pathloss compensation factor, closed-loop index, pathloss reference signal, etc.) associated with, mapped to, indicated by, and/or included in the first TCI state. The wireless device may send (e.g., transmit), via a second uplink channel and/or resource of the one or more first uplink channels and/or resources, a second uplink signal with a second transmission power determined based on the first TCI state. The wireless device may determine the second transmission power based on one or more first power control parameters (e.g., target received power, pathloss compensation factor, closed-loop index, pathloss reference signal) associated with, mapped to, indicated by, and/or included in the first TCI state.

A wireless device may send (e.g., transmit), via one or more first uplink channels and/or resources, uplink signals with a first spatial domain transmission filter and/or beam determined based on a first TCI state. The wireless device may send (e.g., transmit), via each uplink channel and/or resource of the one or more first uplink channels and/or resources, a respective uplink signal with the first spatial domain transmission filter and/or beam determined based on the first TCI state. The wireless device may send (e.g., transmit), via a first uplink channel and/or resource of the one or more first uplink channels and/or resources, a first uplink signal with the first spatial domain transmission filter and/or beam determined based on the first TCI state. At least one DMRS antenna port of the first uplink signal may be quasi co-located with the first reference signal indicated by the first TCI state. The wireless device may send (e.g., transmit), via a second uplink channel and/or resource of the one or more first uplink channels and/or resources, a second uplink signal with the first spatial domain transmission filter and/or beam determined based on the first TCI state. At least one DMRS antenna port of the second uplink signal may be quasi co-located with the first reference signal indicated by the first TCI state One or more first uplink channels and/or resources may comprise PUSCH. The one or more first uplink channels and/or resources may comprise one or more first PUSCH resources. The one or more first uplink channels and/or resources may comprise one or more first PUSCH transmissions.

A wireless device 1905 may receive, via a first coreset 1938, first DCI 1930 scheduling a first PUSCH transmission. A plurality of coresets may comprise the first coreset 1938. The first DCI 1930 may comprise, for example, a field (e.g., SRS resource set indicator field, TRP field, coreset pool index field, additional PCI index, BFD set index, unified TCI state indicator field, joint TCI state indicator field, uplink TCI state indicator field, panel index, capability set index, etc.) with a first value (e.g., 0, 00, 10, 11) indicating a first TCI state. The wireless device may send (e.g., transmit), based on the first TCI state, the first PUSCH transmission based on (e.g., in response to) the first DCI 1930 comprising a field with a first value indicating the first TCI state. One or more first uplink channels and/or resources may comprise PUSCH transmissions scheduled by DCIs comprising the field with the first value. Each DCI of the DCIs may schedule one or more PUSCH transmissions of the PUSCH transmissions.

A first coreset 1938 may be associated with a first coreset pool index 1925 (e.g., CoresetPoolIndex=0). One or more configuration parameters may indicate, for the first coreset 1938, the first coreset pool index 1925. The one or more configuration parameters may not indicate, for the first coreset 1938, a coreset pool index. A wireless device may send (e.g., transmit), based on a first TCI state, a first PUSCH transmission, for example, based on (e.g., in response to) receiving first DCI 1930 scheduling the first PUSCH transmission via the first coreset 1938 with the first coreset pool index 1925. One or more first uplink channels and/or resources may comprise the first PUSCH transmission. The one or more first uplink channels and/or resources may comprise PUSCH transmissions scheduled by DCIs received via one or more first coresets with the first coreset pool index 1925. The plurality of coresets may comprise the one or more first coresets.

One or more configuration parameters may indicate, for a configured uplink grant, a field (e.g., SRS resource set indicator field, TRP field, coreset pool index field, additional PCI index, BFD set index, unified TCI state indicator field, joint TCI state indicator field, uplink TCI state indicator field, panel index, capability set index, etc.) with a first value (e.g., 0, 00, 10, 11) indicating a first TCI state. A wireless device may send (e.g., transmit), based on the first TCI state, PUSCH transmissions of a configured uplink grant, for example, based on (e.g., in response to) the one or more configuration parameters indicating, for the configured uplink grant, the field with the first value that indicates the first TCI state. The configured uplink grant may be, for example, a Type 1 configured uplink grant. The one or more first uplink channels and/or resources may comprise the PUSCH transmissions of the configured uplink grant.

One or more first uplink channels and/or resources may comprise PUCCH. The one or more first uplink channels and/or resources may comprise one or more first PUCCH resources. The one or more first uplink channels and/or resources may comprise one or more first PUCCH resource sets and/or groups. The one or more first uplink channels and/or resources may comprise one or more first PUCCH transmissions.

One or more configuration parameters may indicate, for a first PUCCH resource, a field (e.g., SRS resource set indicator field, TRP field, coreset pool index field, additional PCI index, BFD set index, unified TCI state indicator field, joint TCI state indicator field, uplink TCI state indicator field, panel index, capability set index, etc.) with a first value (e.g., 0, 00, 10, 11) indicating a first TCI state. A wireless device may send (e.g., transmit), based on the first TCI state, an uplink signal (e.g., SR, HARQ-ACK, CSI report, uplink control information) via a first PUCCH resource, for example, based on (e.g., in response to) the one or more configuration parameters indicating, for the first PUCCH resource, a field with a first value that indicates the first TCI state. The one or more first uplink channels and/or resources may comprise PUCCH transmissions via the first PUCCH resource.

One or more configuration parameters may indicate, for a first PUCCH resource set and/or group, a field (e.g., SRS resource set indicator field, TRP field, coreset pool index field, additional PCI index, BFD set index, unified TCI state indicator field, joint TCI state indicator field, uplink TCI state indicator field, panel index, capability set index, etc.) with a first value (e.g., 0, 00, 10, 11) indicating the first TCI state. The wireless device may send (e.g., transmit), based on the first TCI state, an uplink signal (e.g., SR, HARQ-ACK, CSI report, uplink control information) via a PUCCH resource in the first PUCCH resource set and/or group, for example, based on (e.g., in response to) the one or more configuration parameters indicating, for the first PUCCH resource set and/or group, the field with the first value that indicates the first TCI state. The wireless device may send (e.g., transmit), based on the first TCI state, a respective uplink signal (e.g., SR, HARQ-ACK, CSI report, uplink control information) via each PUCCH resource in the first PUCCH resource set and/or group, for example, based on (e.g., in response to) the one or more configuration parameters indicating, for the first PUCCH resource set and/or group, the field with the first value that indicates the first TCI state. The one or more first uplink channels and/or resources may comprise PUCCH transmissions via each PUCCH resource in the first PUCCH resource set and/or group.

A wireless device may receive, via a first coreset 1938, first DCI 1930 triggering and/or scheduling transmission of a first PUCCH transmission (e.g., HARQ-ACK feedback transmission). The first DCI 1930 may, for example, schedule a PDSCH reception. The first DCI 1930 may, for example, indicate SCell dormancy. The first DCI 1930 may, for example, indicate SPS PDSCH release. The first DCI 1930 may, for example, indicate activation of a unified TCI state. The plurality of coresets may comprise the first coreset 1938. The first DCI 1930 may comprise, for example, a field (e.g., SRS resource set indicator field, TRP field, coreset pool index field, additional PCI index, BFD set index, unified TCI state indicator field, joint TCI state indicator field, uplink TCI state indicator field, panel index, capability set index, etc.) with a first value (e.g., 0, 00, 10, 11) indicating the first TCI state. The wireless device may send (e.g., transmit), based on the first TCI state, the first PUCCH transmission, for example, based on (e.g., in response to) the first DCI 1930 comprising a field with a first value indicating the first TCI state. The one or more first uplink channels and/or resources may comprise PUCCH transmissions triggered and/or scheduled by DCIs comprising the field with the first value.

A first coreset 1938 may be associated with a first coreset pool index 1925 (e.g., CoresetPoolIndex=0). One or more configuration parameters may indicate, for the first coreset 1938, the first coreset pool index 1925. The one or more configuration parameters may not indicate, for the first coreset 1938, a coreset pool index. The wireless device may send (e.g., transmit), based on the first TCI state, a first PUCCH transmission, for example, based on (e.g., in response to) receiving first DCI 1930 triggering and/or scheduling the first PUCCH transmission via the first coreset 1938 with the first coreset pool index 1925. The one or more first uplink channels and/or resources may comprise PUCCH transmissions triggered and/or scheduled by DCIs received via one or more first coresets with the first coreset pool index 1925. A plurality of coresets may comprise one or more first coresets.

One or more first uplink channels and/or resources may comprise SRS. The one or more first uplink channels and/or resources may comprise one or more first SRS resources. The one or more first uplink channels and/or resources may comprise one or more first SRS resource sets and/or groups. The one or more first uplink channels and/or resources may comprise one or more first SRS transmissions.

One or more configuration parameters may indicate, for a first SRS resource, a field (e.g., SRS resource set indicator field, TRP field, coreset pool index field, additional PCI index, BFD set index, unified TCI state indicator field, joint TCI state indicator field, uplink TCI state indicator field, panel index, capability set index, etc.) with a first value (e.g., 0) indicating a first TCI state. A wireless device may send (e.g., transmit), based on the first TCI state, a SRS via the first SRS resource, for example, based on (e.g., in response to) the one or more configuration parameters indicating, for the first SRS resource, a field with a first value that may indicate the first TCI state. One or more first uplink channels and/or resources may comprise SRS transmissions via the first SRS resource.

One or more configuration parameters may indicate, for a first SRS resource set and/or group, a field (e.g., SRS resource set indicator field, TRP field, coreset pool index field, additional PCI index, BFD set index, unified TCI state indicator field, joint TCI state indicator field, uplink TCI state indicator field, panel index, capability set index, etc.) with a first value (e.g., 0, 00, 10, 11) indicating a first TCI state. A wireless device may send (e.g., transmit), based on the first TCI state, a SRS via a SRS resource in the first SRS resource set and/or group, for example, based on (e.g., in response to) the one or more configuration parameters indicating, for the first SRS resource set and/or group, a field with a first value that may indicate the first TCI state. The wireless device may send (e.g., transmit), based on the first TCI state, a respective SRS via each SRS resource in the first SRS resource set and/or group, for example, based on (e.g., in response to) the one or more configuration parameters indicating, for the first SRS resource set and/or group, the field with the first value that may indicate the first TCI state. One or more first uplink channels and/or resources may comprise SRS transmissions via each SRS resource in the first SRS resource set and/or group.

A wireless device 1905 may receive, via a first coreset 1938, first DCI 1930 triggering and/or scheduling transmission of a SRS. The SRS may be, for example, an aperiodic SRS. The SRS may be, for example, a semi-persistent SRS. The plurality of coresets may comprise a first coreset 1938. The first DCI 1930 may comprise, for example, a field (e.g., SRS resource set indicator field, TRP field, coreset pool index field, additional PCI index, BFD set index, unified TCI state indicator field, joint TCI state indicator field, uplink TCI state indicator field, panel index, capability set index, etc.) with a first value (e.g., 0, 00, 10, 11) indicating a first TCI state. The wireless device 1905 may send (e.g., transmit), based on the first TCI state, the SRS, for example, based on (e.g., in response to) the first DCI 1930 comprising the field with the first value indicating the first TCI state. One or more first uplink channels and/or resources may comprise SRS transmissions triggered and/or scheduled by DCIs comprising the field with the first value.

A first coreset 1938 may be associated with a first coreset pool index 1925 (e.g., CoresetPoolIndex=0). One or more configuration parameters may indicate, for the first coreset 1938, the first coreset pool index 1925. The one or more configuration parameters may not indicate, for the first coreset 1938, a coreset pool index. The wireless device may send (e.g., transmit), based on the first TCI state, the SRS, for example, based on (e.g., in response to) receiving the first DCI 1930 triggering and/or scheduling the transmission of the SRS via the first coreset 1938 with the first coreset pool index 1925. One or more first uplink channels and/or resources may comprise SRS transmissions triggered and/or scheduled by DCIs received via one or more first coresets with the first coreset pool index 1925. A plurality of coresets may comprise one or more first coresets.

A wireless device may apply a second TCI state to one or more second uplink channels and/or resources of the cell. The wireless device may send (e.g., transmit), via the one or more second uplink channels and/or resources, uplink signals based on the second TCI state. The wireless device may send (e.g., transmit), via each uplink channel and/or resource of the one or more second uplink channels and/or resources, a respective uplink signal of the uplink signals based on the second TCI state.

A wireless device may send (e.g., transmit), via one or more second uplink channels and/or resources, uplink signals with transmission powers determined based on a second TCI state. The wireless device may send (e.g., transmit), via each uplink channel and/or resource of the one or more second uplink channels and/or resources, an uplink signal with a respective transmission power determined based on the second TCI state. The wireless device may send (e.g., transmit), via a first uplink channel and/or resource of the one or more second uplink channels and/or resources, a first uplink signal with a first transmission power determined based on the second TCI state. The wireless device may determine the first transmission power based on one or more second power control parameters (e.g., target received power, pathloss compensation factor, closed-loop index, pathloss reference signal) associated with, mapped to, indicated by, and/or included in the second TCI state. The wireless device may send (e.g., transmit), via a second uplink channel and/or resource of the one or more second uplink channels and/or resources, a second uplink signal with a second transmission power determined based on the second TCI state. The wireless device may determine the second transmission power based on one or more second power control parameters (e.g., target received power, pathloss compensation factor, closed-loop index, pathloss reference signal) associated with, mapped to, indicated by, and/or included in the second TCI state.

A wireless device may send (e.g., transmit), via one or more second uplink channels and/or resources, uplink signals with a second spatial domain transmission filter and/or beam determined based on a second TCI state. The wireless device may send (e.g., transmit), via each uplink channel and/or resource of the one or more second uplink channels and/or resources, a respective uplink signal with the second spatial domain transmission filter and/or beam determined based on the second TCI state. The wireless device may send (e.g., transmit), via a first uplink channel and/or resource of the one or more second uplink channels and/or resources, a first uplink signal with the second spatial domain transmission filter and/or beam determined based on the second TCI state. At least one DMRS antenna port of the first uplink signal may be quasi co-located with the second reference signal indicated by the second TCI state. The wireless device may send (e.g., transmit), via a second uplink channel and/or resource of the one or more second uplink channels and/or resources, a second uplink signal with the second spatial domain transmission filter and/or beam determined based on the second TCI state. At least one DMRS antenna port of the second uplink signal may be quasi co-located with the second reference signal indicated by the second TCI state.

One or more second uplink channels and/or resources may comprise PUSCH. The one or more second uplink channels and/or resources may comprise one or more second PUSCH resources. The one or more second uplink channels and/or resources may comprise one or more second PUSCH transmissions.

A wireless device may receive, via a second coreset 1958, second DCI 1950 scheduling a second PUSCH transmission. A plurality of coresets may comprise the second coreset 1958. The second DCI 1950 may comprise, for example, a field (e.g., SRS resource set indicator field, TRP field, coreset pool index field, additional PCI index, BFD set index, unified TCI state indicator field, joint TCI state indicator field, uplink TCI state indicator field, panel index, capability set index, etc.) with a second value (e.g., 1, 01, 10, 11) indicating a second TCI state. The wireless device may send (e.g., transmit), based on the second TCI state, the second PUSCH transmission based on (e.g., in response to) the second DCI 1950 comprising a field with a second value indicating the second TCI state. One or more second uplink channels and/or resources may comprise PUSCH transmissions scheduled by DCIs comprising the field with the second value. Each DCI of the DCIs may schedule one or more PUSCH transmissions of the PUSCH transmissions.

A second coreset 1958 may be associated with a second coreset pool index 1945 (e.g., CoresetPoolIndex=1). One or more configuration parameters may indicate, for the second coreset 1958, the second coreset pool index 1945. A wireless device 1905 may send (e.g., transmit), based on the second TCI state, the second PUSCH transmission, for example, based on (e.g., in response to) receiving the second DCI 1950 scheduling the second PUSCH transmission via the second coreset 1958 with the second coreset pool index 1945. One or more second uplink channels and/or resources may comprise PUSCH transmissions scheduled by DCIs received via one or more second coresets with the second coreset pool index 1945. A plurality of coresets may comprise the one or more second coresets.

One or more configuration parameters may indicate, for a configured uplink grant, a field (e.g., SRS resource set indicator field, TRP field, coreset pool index field, additional PCI index, BFD set index, unified TCI state indicator field, joint TCI state indicator field, uplink TCI state indicator field, panel index, capability set index, etc.) with a second value (e.g., 1, 01, 10, 11) indicating a second TCI state. A wireless device may send (e.g., transmit), based on the second TCI state, PUSCH transmissions of the configured uplink grant, for example, based on (e.g., in response to) the one or more configuration parameters indicating, for the configured uplink grant, the field with the second value that indicates the second TCI state. The configured uplink grant may be, for example, a Type 1 configured uplink grant. One or more second uplink channels and/or resources may comprise the PUSCH transmissions of the configured uplink grant.

One or more second uplink channels and/or resources may comprise PUCCH. The one or more second uplink channels and/or resources may comprise one or more second PUCCH resources. The one or more second uplink channels and/or resources may comprise one or more second PUCCH resource sets and/or groups. The one or more second uplink channels and/or resources may comprise one or more second PUCCH transmissions.

One or more configuration parameters may indicate, for a second PUCCH resource, a field (e.g., SRS resource set indicator field, TRP field, coreset pool index field, additional PCI index, BFD set index, unified TCI state indicator field, joint TCI state indicator field, uplink TCI state indicator field, panel index, capability set index, etc.) with a second value (e.g., 1, 01, 10, 11) indicating a second TCI state. A wireless device may send (e.g., transmit), based on the second TCI state, an uplink signal (e.g., SR, HARQ-ACK, CSI report, uplink control information) via the second PUCCH resource, for example, based on (e.g., in response to) the one or more configuration parameters indicating, for the second PUCCH resource, a field with a second value that may indicate the second TCI state. One or more second uplink channels and/or resources may comprise PUCCH transmissions via the second PUCCH resource.

One or more configuration parameters may indicate, for a second PUCCH resource set and/or group, a field (e.g., SRS resource set indicator field, TRP field, coreset pool index field, additional PCI index, BFD set index, unified TCI state indicator field, joint TCI state indicator field, uplink TCI state indicator field, panel index, capability set index, etc.) with a second value (e.g., 1, 01, 10, 11) indicating a second TCI state. A wireless device may send (e.g., transmit), based on the second TCI state, an uplink signal (e.g., SR, HARQ-ACK, CSI report, uplink control information) via a PUCCH resource in the second PUCCH resource set and/or group, for example, based on (e.g., in response to) the one or more configuration parameters indicating, for the second PUCCH resource set and/or group, a field with a second value that indicates the second TCI state. The wireless device may send (e.g., transmit), based on the second TCI state, a respective uplink signal (e.g., SR, HARQ-ACK, CSI report, uplink control information) via each PUCCH resource in the second PUCCH resource set and/or group, for example, based on (e.g., in response to) the one or more configuration parameters indicating, for the second PUCCH resource set and/or group, the field with the second value that indicates the second TCI state. One or more second uplink channels and/or resources may comprise PUCCH transmissions via each PUCCH resource in the second PUCCH resource set and/or group.

A wireless device 1905 may receive, via a second coreset 1958, second DCI 1950 triggering and/or scheduling transmission of a second PUCCH transmission (e.g., HARQ-ACK feedback transmission). The second DCI 1950 may, for example, schedule a PDSCH reception. The second DCI 1950 may, for example, indicate SCell dormancy. The second DCI 1950 may, for example, indicate SPS PDSCH release. The second DCI 1950 may, for example, indicate activation of a unified TCI state. A plurality of coresets may comprise the second coreset 1958. The second DCI 1950 may comprise, for example, a field (e.g., SRS resource set indicator field, TRP field, coreset pool index field, additional PCI index, BFD set index, unified TCI state indicator field, joint TCI state indicator field, uplink TCI state indicator field, panel index, capability set index, etc.) with a second value (e.g., 1, 01, 10, 11) that may indicate the second TCI state. The wireless device may send (e.g., transmit), based on the second TCI state, the second PUCCH transmission, for example, based on (e.g., in response to) the second DCI 1950 comprising a field with a second value that indicates the second TCI state. One or more second uplink channels and/or resources may comprise PUCCH transmissions triggered and/or scheduled by DCIs comprising the field with the second value.

A second coreset 1958 may be associated with a second coreset pool index 1945 (e.g., CoresetPoolIndex=1). One or more configuration parameters may indicate, for the second coreset 1958, the second coreset pool index 1945. A wireless device 1905 may send (e.g., transmit), based on a second TCI state, a second PUCCH transmission, for example, based on (e.g., in response to) receiving the second DCI 1950 triggering and/or scheduling the second PUCCH transmission via the second coreset 1958 with the second coreset pool index 1945. One or more second uplink channels and/or resources may comprise PUCCH transmissions triggered and/or scheduled by DCIs received via one or more second coresets with the second coreset pool index 1945. A plurality of coresets may comprise one or more second coresets.

One or more second uplink channels and/or resources may comprise SRS. The one or more second uplink channels and/or resources may comprise one or more second SRS resources. The one or more second uplink channels and/or resources may comprise one or more second SRS resource sets and/or groups. The one or more second uplink channels and/or resources may comprise one or more second SRS transmissions.

One or more configuration parameters may indicate, for a second SRS resource, a field (e.g., SRS resource set indicator field, TRP field, coreset pool index field, additional PCI index, BFD set index, unified TCI state indicator field, joint TCI state indicator field, uplink TCI state indicator field, panel index, capability set index, etc.) with a second value (e.g., 1) indicating a second TCI state. A wireless device may send (e.g., transmit), based on the second TCI state, a SRS via the second SRS resource, for example, based on (e.g., in response to) the one or more configuration parameters indicating, for the second SRS resource, a field with a second value that indicates the second TCI state. One or more second uplink channels and/or resources may comprise SRS transmissions via the second SRS resource.

One or more configuration parameters may indicate, for a second SRS resource set and/or group, a field (e.g., SRS resource set indicator field, TRP field, coreset pool index field, additional PCI index, BFD set index, unified TCI state indicator field, joint TCI state indicator field, uplink TCI state indicator field, panel index, capability set index, etc.) with a second value (e.g., 1) indicating a second TCI state. The wireless device may send (e.g., transmit), based on the second TCI state, a SRS via a SRS resource in the second SRS resource set and/or group, for example, based on (e.g., in response to) the one or more configuration parameters indicating, for the second SRS resource set and/or group, the field with the second value that indicates the second TCI state. A wireless device may send (e.g., transmit), based on the second TCI state, a respective SRS via each SRS resource in the second SRS resource set and/or group, for example, based on (e.g., in response to) the one or more configuration parameters indicating, for the second SRS resource set and/or group, the field with the second value that indicates the second TCI state. One or more second uplink channels and/or resources may comprise SRS transmissions via each SRS resource in the second SRS resource set and/or group.

A wireless device 1905 may receive, via a second coreset 1958, second DCI 1950 triggering and/or scheduling transmission of a SRS. The SRS may be, for example, an aperiodic SRS. The SRS may be, for example, a semi-persistent SRS. A plurality of coresets may comprise the second coreset 1958. The second DCI 1950 may comprise, for example, a field (e.g., SRS resource set indicator field, TRP field, coreset pool index field, additional PCI index, BFD set index, unified TCI state indicator field, joint TCI state indicator field, uplink TCI state indicator field, panel index, capability set index, etc.) with a second value (e.g., 1, 01, 10, 11) that may indicate a second TCI state. A wireless device 1905 may send (e.g., transmit), based on the second TCI state, the SRS, for example, based on (e.g., in response to) the second DCI 1950 comprising a field with a second value indicating the second TCI state. One or more second uplink channels and/or resources may comprise SRS transmissions triggered and/or scheduled by DCIs comprising the field with the second value.

A second coreset 1958 may be associated with a second coreset pool index 1945 (e.g., CoresetPoolIndex=1). One or more configuration parameters may indicate, for the second coreset 1958, the second coreset pool index 1945. A wireless device may send (e.g., transmit), based on the second TCI state, the SRS, for example, based on (e.g., in response to) receiving the second DCI 1950 triggering and/or scheduling the transmission of the SRS via the second coreset 1958 with the second coreset pool index 1945. One or more second uplink channels and/or resources may comprise SRS transmissions triggered and/or scheduled by DCIs received via one or more second coresets with the second coreset pool index 1945. A plurality of coresets may comprise the one or more second coresets.

One or more configuration parameters may indicate a plurality of uplink power control sets (e.g., Uplink-power-Control in FIG. 17). The one or more configuration parameters may comprise one or more serving cell parameters (e.g., ServingCellConfig in FIG. 17) indicating, for example, a plurality of uplink power control sets. The plurality of uplink power control sets may be used to configure power control parameters for uplink transmissions (e.g., PUSCH, PUCCH and SRS transmissions).

One or more configuration parameters may indicate, for a plurality of uplink power control sets, a plurality of uplink power control set indexes and/or identifiers (e.g., Uplink-powerControlId as described herein in FIG. 17). The one or more configuration parameters may indicate, for each uplink power control set of the plurality of uplink power control sets, a respective uplink power control set index of the plurality of uplink power control set indexes and/or identifiers. The plurality of uplink power control sets may comprise a first uplink power control set and a second uplink power control set. The first uplink power control set may be indicated and/or identified by a first uplink power control set index of the plurality of uplink power control set indexes and/or identifiers. The second uplink power control set may be indicated and/or identified by a second uplink power control set index of the plurality of uplink power control set indexes and/or identifiers.

Each uplink power control set of a plurality of uplink power control sets may comprise and/or indicate respective power control parameters (e.g., target received power (p0 in FIG. 17), closed-loop index (e.g., a ClosedLoopIndex as described herein in FIG. 17), pathloss compensation factor (alpha in FIG. 17), pathloss reference signal, etc.). Each uplink power control set of the plurality of uplink power control sets may comprise and/or indicate respective power control parameters for an uplink channel and/or signal (e.g., PUSCH, PUCCH, SRS).

A first uplink power control set may comprise and/or indicate one or more first power control parameters (e.g., target received power, closed-loop index, pathloss compensation factor, alpha, pathloss reference signal, etc.) for PUSCH transmissions (e.g., p0AlphaSetforPUSCH, P0AlphaSet in FIG. 17). The first uplink power control set may comprise and/or indicate one or more second power control parameters (e.g., target received power, closed-loop index, pathloss compensation factor, alpha, pathloss reference signal, etc.) for PUCCH transmissions (e.g., p0AlphaSetforPUCCH, P0AlphaSet as described herein in FIG. 17). The first uplink power control set may comprise and/or indicate one or more third power control parameters (e.g., target received power, closed-loop index, pathloss compensation factor, alpha, pathloss reference signal, etc.) for SRS transmissions (e.g., p0AlphaSetforSRS, P0AlphaSet as described herein in FIG. 17).

A second uplink power control set may comprise and/or indicate one or more first power control parameters (e.g., target received power, closed-loop index, pathloss compensation factor, alpha, pathloss reference signal, etc.) for PUSCH transmissions (e.g., p0AlphaSetforPUSCH, P0AlphaSet in FIG. 17). The second uplink power control set may comprise and/or indicate one or more second power control parameters (e.g., target received power, closed-loop index, pathloss compensation factor, alpha, pathloss reference signal, etc.) for PUCCH transmissions (e.g., p0AlphaSetforPUCCH, P0AlphaSet in FIG. 17). The second uplink power control set may comprise and/or indicate one or more third power control parameters (e.g., target received power, closed-loop index, pathloss compensation factor, alpha, pathloss reference signal, etc.) for SRS transmissions (e.g., p0AlphaSetforSRS, P0AlphaSet as described herein in FIG. 17).

In at least some wireless communications, a wireless device may be configured to provide two power headroom values, for example, if the wireless device is configured for multi-TRP PUSCH repetition and is configured for two-PHR-mode. The wireless device may calculate two power headroom values and send (e.g., transmit) a power headroom report comprising the two power headroom values. The wireless device may calculate the two power headroom values based on two unified transmission configuration indicator (TCI) states activated for multiple transmission and reception points (multi-TRP). Calculating the power headroom values may be complex and use resources of the wireless device.

A base station may switch a wireless device to a single TRP mode. The base station may switch the wireless device to a single TRP mode, for example, based on service needs. The base station may switch the wireless device to a single TRP mode by sending (e.g., transmitting) downlink control information (DCI) activating a single TCI state.

A wireless device configured with multi-TRP physical uplink shared channel (PUSCH) repetition and two-PHR-mode may still report two power headroom values, for example, regardless of whether multi-TRP mode or alternatively single-TRP mode is enabled. One power headroom value may be sufficient, for example, if the wireless device is in a single TRP mode and the other TRP is not active.

As described herein, a wireless device may determine a quantity of power headroom values send, for example, based on a quantity of activated TCI states. TCI states may be associated with power control parameters. A wireless device may be configured to provide two power headroom values, for example, if a parameter (e.g., twoPHRMode) is configured, if multi-TRP repetition is configured, and if two unified TCI states are activated. The wireless device may provide a single power headroom value, for example, if only two unified states are activated, multi-TRP repetition is not configured, and a parameter (e.g., twoPHRMode) is not configured.

A wireless device may calculate a single power headroom value, for example, based on a TCI state with a lowest or highest TCI state index of two or more TCI states. A wireless device may calculate a single power headroom value, for example, based on a first TCI state. A wireless device may calculate a single power headroom value, for example, based on a TCI state with a lowest or highest power headroom value Alternatively, TCI states may not be associated with power control parameters. A wireless device may determine multiple power headroom values based on two uplink power control sets (e.g., Uplink-powerControlId) configured for an active uplink bandwidth part (BWP). The wireless device may determine a power headroom value, for example, based on a first and/or second uplink power control set (e.g., Uplink-powerControlID) configured for an active uplink BWP. A TCI may be associated with a PCI of a cell. The wireless device may determine a power headroom value, for example, based on uplink power control set configured for the active uplink BWP and associated with the PCI of the unified TCI state.

Figure 20A:
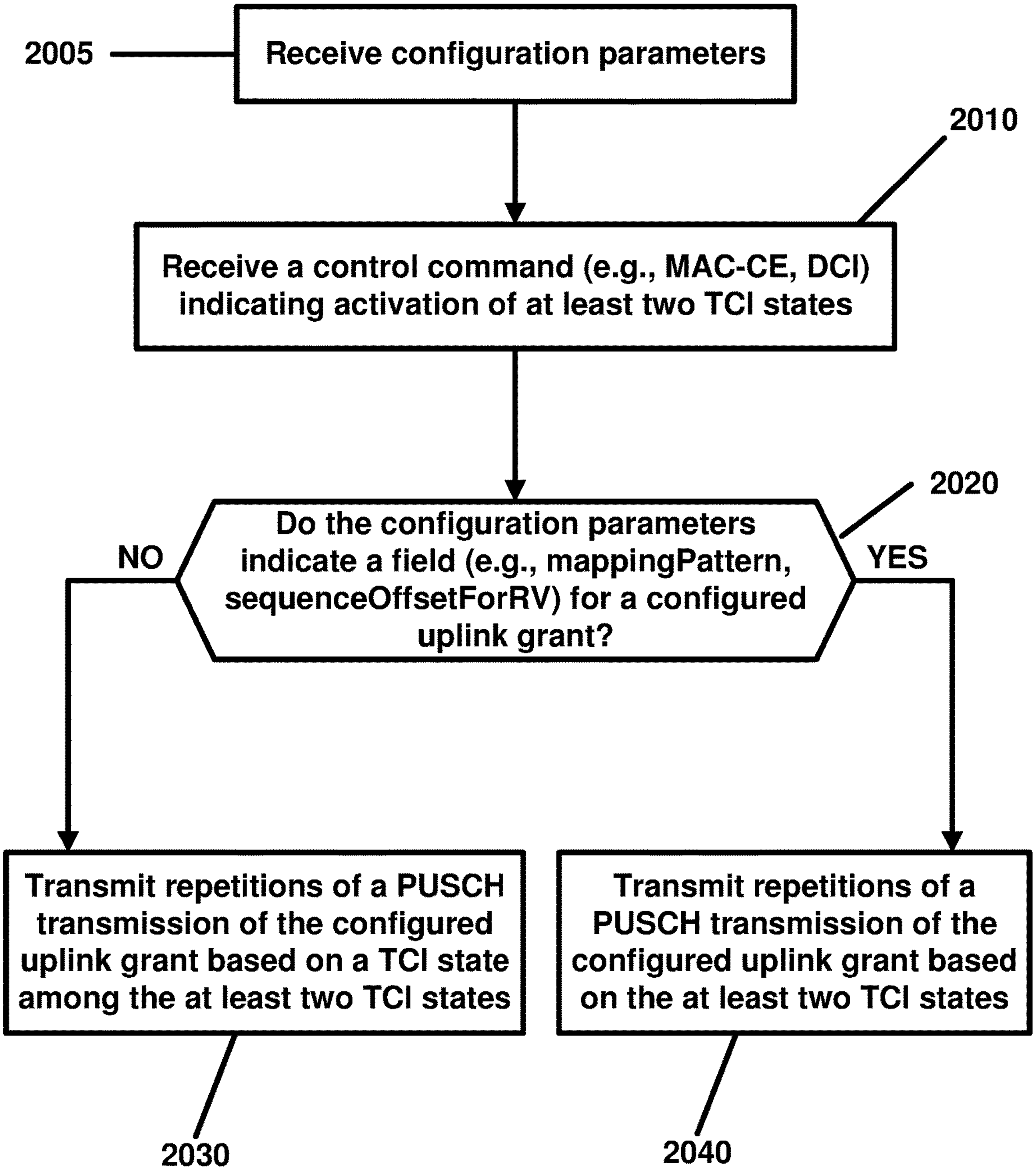
FIG. 20A and FIG. 20B show example flow charts of repetitions of a configured uplink grant.
Figure 20B:
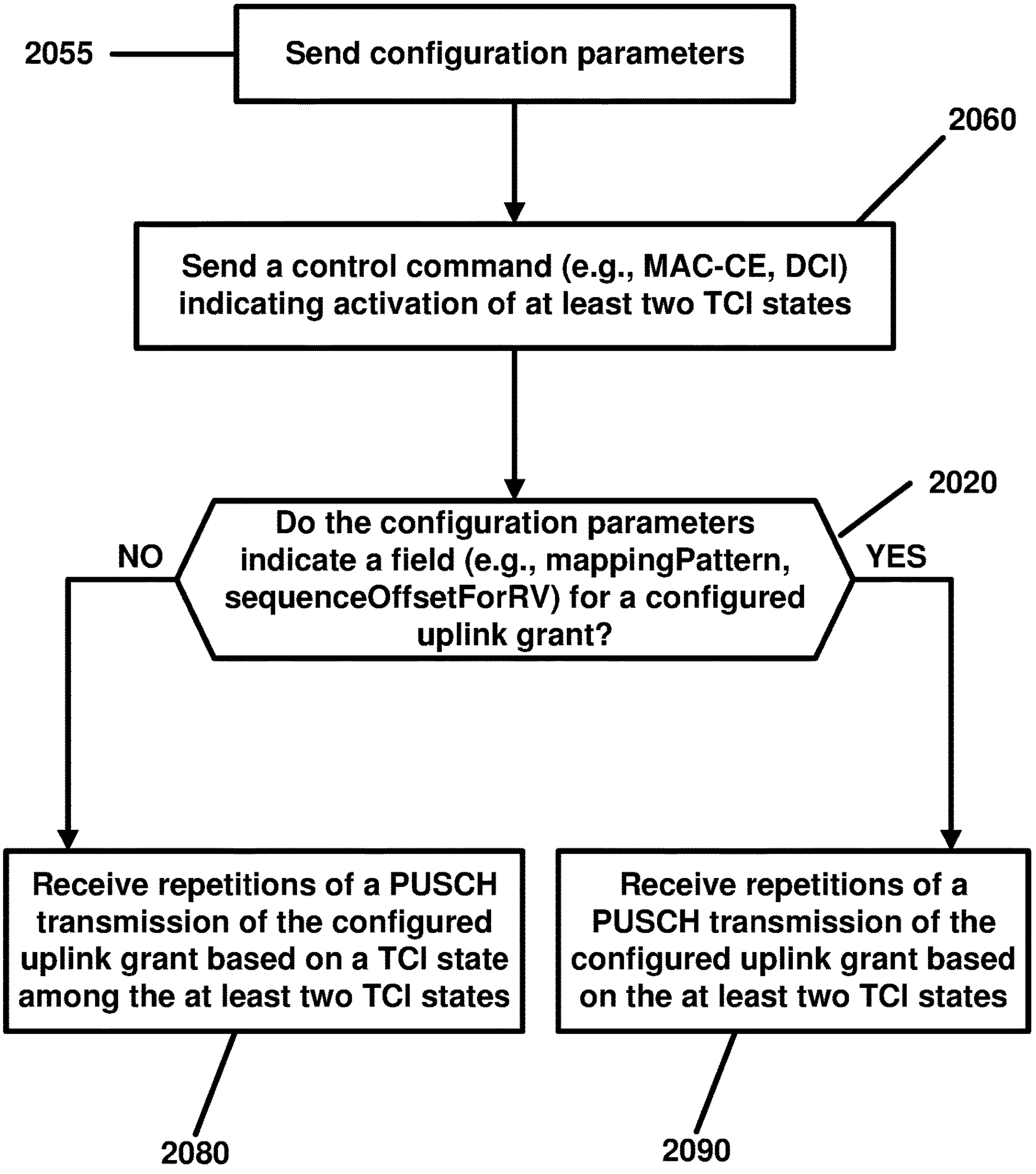

FIG. 20A and FIG. 20B show example flow charts of repetitions of a configured uplink grant. In FIG. 20B step 2055, a base station may send one or more configuration parameters. In FIG. 20A step 2005, a wireless device may receive one or more configuration parameters. One or more configuration parameters may indicate at least two SRS resource sets (e.g., indicated/provided by RRC parameter srs-ResourceSetToAddModList or srs-ResourceSetToAddModListDCI-0-2). The at least two SRS resource sets may comprise a first SRS resource set and a second SRS resource set. The one or more configuration parameters may comprise, for each SRS resource set of the at least two SRS resource sets, a respective usage parameter. The usage parameter may be set to codebook. The usage parameter of each SRS resource set of the at least two SRS resource sets may be set to codebook. The one or more configuration parameters may indicate codebook, for example, for each SRS resource set of the at least two SRS resource sets. The one or more configuration parameters may indicate, for the first SRS resource set, codebook and/or a usage parameter set to codebook. The one or more configuration parameters may indicate, for the second SRS resource set, codebook and/or a usage parameter set to codebook.

A usage parameter may be set to non-codebook. The usage parameter of each SRS resource set of at least two SRS resource sets may be set to non-codebook. One or more configuration parameters may indicate non-codebook, for example, for each SRS resource set of the at least two SRS resource sets. The one or more configuration parameters may indicate, for a first SRS resource set, non-codebook and/or a usage parameter set to non-codebook. The one or more configuration parameters may indicate, for a second SRS resource set, non-codebook and/or a usage parameter set to non-codebook.

One or more configuration parameters may indicate, for at least two SRS resource sets, at least two SRS resource set indexes. The one or more configuration parameters may indicate, for each SRS resource set of the at least two SRS resource sets, a respective SRS resource set index of the at least two SRS resource set indexes. Each SRS resource set of the at least two SRS resource sets may be identified and/or indicated by a respective SRS resource set index of the at least two SRS resource set indexes. The first SRS resource set of the at least two SRS resource sets may be identified and/or indicated by a first SRS resource set index of the at least two SRS resource set indexes. The second SRS resource set of the at least two SRS resource sets may be identified and/or indicated by a second SRS resource set index of the at least two SRS resource set indexes. The first SRS resource set index of the first SRS resource set may be lower (e.g., less) than the second SRS resource set index of the second SRS resource set.

One or more configuration parameters may indicate a configured uplink grant (e.g., Configured uplink grant as described herein in FIG. 18). The configured uplink grant may be, for example, a Type 1 configured uplink grant. The configured uplink grant may be, for example, a Type 2 configured uplink grant. In step 2020, of FIG. 20 a configuration parameter may indicate a field. The one or more configuration parameters may indicate, for the configured uplink grant, a field. The field may be, for example, a mapping pattern field (e.g., mappingPattern as described herein in FIG. 18). The mapping pattern field may indicate whether the wireless device sends (e.g., transmits) and/or performs repetitions of a PUSCH transmission of the configured uplink based on a cyclical mapping pattern (e.g., cyclicMapping) or a sequential mapping pattern (e.g., sequentialMapping). The one or more configuration parameters may indicate the mapping pattern field, for example, based on the one or more configuration parameters indicating the at least two SRS resource sets.

A wireless device may send (e.g., transmit), in even transmission occasions (e.g., PUSCH transmission occasions, actual PUSCH transmission occasions, nominal PUSCH transmission occasions, slots, etc.), first repetitions of a repetitions of a PUSCH transmission, for example, based on a first spatial domain transmission filter and/or beam, if the mapping pattern is set to "cyclical mapping pattern" (e.g., cyclicMapping). The wireless device may send (e.g., transmit), in odd transmission occasions (e.g., PUSCH transmission occasions, actual PUSCH transmission occasions, nominal PUSCH transmission occasions, slots, etc.), second repetitions of the repetitions of the PUSCH transmission, for example, based on a second spatial domain transmission filter and/or beam, if the mapping pattern is set to "cyclical mapping pattern" (e.g., cyclicMapping). The wireless device may send (e.g., transmit) the four repetitions, sequentially, with the first spatial domain transmission filter and/or beam, the second spatial domain transmission filter and/or beam, the first spatial domain transmission filter and/or beam, and the second spatial domain transmission filter and/or beam, switching a spatial domain transmission filter among the first spatial domain transmission filter and/or beam and the second spatial domain transmission filter and/or beam at every repetition, for example, if there are four repetitions of the PUSCH transmission.

A wireless device may send (e.g., transmit), in even transmission occasions (e.g., PUSCH transmission occasions, actual PUSCH transmission occasions, nominal PUSCH transmission occasions, slots, etc.), first repetitions of repetitions of a PUSCH transmission, for example, based on a first transmission power, if the mapping pattern is set to "cyclical mapping pattern." The wireless device may send (e.g., transmit), in odd transmission occasions (e.g., PUSCH transmission occasions, actual PUSCH transmission occasions, nominal PUSCH transmission occasions, slots, etc.), second repetitions of the repetitions of the PUSCH transmission, for example, based on a second transmission power, if the mapping pattern is set to "cyclical mapping patter." The wireless device may send (e.g., transmit) the four repetitions, sequentially, with the first transmission power, the second transmission power, the first transmission power, and the second transmission power, switching the transmission power among the first transmission power and the second transmission power at every repetition, for example, if there are four repetitions of the PUSCH transmission.

A wireless device may send (e.g., transmit), in even transmission occasions (e.g., PUSCH transmission occasions, actual PUSCH transmission occasions, nominal PUSCH transmission occasions, slots, etc.), first repetitions of repetitions of the PUSCH transmission, for example, based on a first SRS resource set, if a mapping pattern is set to "cyclical mapping pattern." The wireless device may send (e.g., transmit), in odd transmission occasions (e.g., PUSCH transmission occasions, actual PUSCH transmission occasions, nominal PUSCH transmission occasions, slots, etc.), second repetitions of the repetitions of the PUSCH transmission, for example, based on the second SRS resource set. The wireless device may send (e.g., transmit) the four repetitions, sequentially, based on the first SRS resource set, the second SRS resource set, the first SRS resource set, and the second SRS resource set, switching the SRS resource set among the first SRS resource set and the second SRS resource set at every repetition, if there are four repetitions of the PUSCH transmission.

A wireless device may send (e.g., transmit), in a first two transmission occasions (e.g., PUSCH transmission occasions, actual PUSCH transmission occasions, nominal PUSCH transmission occasions, slots, etc.), first repetitions of repetitions of a PUSCH transmission, for example, based on a first spatial domain transmission filter and/or beam, if a mapping pattern is set to "sequential mapping pattern" (e.g., sequentialMapping). The wireless device may send (e.g., transmit), in the next two transmission occasions (e.g., PUSCH transmission occasions, actual PUSCH transmission occasions, nominal PUSCH transmission occasions, slots, etc.), second repetitions of the repetitions of the PUSCH transmission based on a second spatial domain transmission filter and/or beam. This pattern may continue. The wireless device may transmit eight repetitions, sequentially, with the first spatial domain transmission filter and/or beam, the first spatial domain transmission filter and/or beam, the second spatial domain transmission filter and/or beam, the second spatial domain transmission filter and/or beam, the first spatial domain transmission filter and/or beam, the first spatial domain transmission filter and/or beam, the second spatial domain transmission filter and/or beam, and the second spatial domain transmission filter and/or beam, switching the spatial domain transmission filter among the first spatial domain transmission filter and/or beam and the second spatial domain transmission filter and/or beam at every two repetitions, for example, if there are eight repetitions of the PUSCH transmission.

A wireless device may send (e.g., transmit), in first two transmission occasions (e.g., PUSCH transmission occasions, actual PUSCH transmission occasions, nominal PUSCH transmission occasions, slots, etc.), first repetitions of repetitions of a PUSCH transmission, for example, based on a first transmission power, if a mapping pattern is set to "sequential mapping pattern" (e.g., sequentialMapping). The wireless device may send (e.g., transmit), in the next two transmission occasions (e.g., PUSCH transmission occasions, actual PUSCH transmission occasions, nominal PUSCH transmission occasions, slots, etc.), second repetitions of the repetitions of the PUSCH transmission based on a second transmission power. This pattern may continue. The wireless device may transmit eight repetitions, sequentially, with the first transmission power, the first transmission power, the second transmission power, the second transmission power, the first transmission power, the first transmission power, the second transmission power, and the second transmission power, switching the transmission power among the first transmission power and the second transmission power at every two repetitions, for example, if there are eight repetitions of the PUSCH transmission.

A wireless device may send (e.g., transmit), in first two transmission occasions (e.g., PUSCH transmission occasions, actual PUSCH transmission occasions, nominal PUSCH transmission occasions, slots, etc.), first repetitions of repetitions of a PUSCH transmission, for example, based on a first SRS resource set, if a mapping pattern is set to "sequential mapping pattern" (e.g., sequentialMapping). The wireless device may send (e.g., transmit), in the next two transmission occasions (e.g., PUSCH transmission occasions, actual PUSCH transmission occasions, nominal PUSCH transmission occasions, slots, etc.), second repetitions of the repetitions of the PUSCH transmission based on a second SRS resource set. This pattern continues. The wireless device may transmit eight repetitions, sequentially, based on the first SRS resource set, the first SRS resource set, the second SRS resource set, the second SRS resource set, the first SRS resource set, the first SRS resource set, the second SRS resource set, and the second SRS resource set, switching the SRS resource set among the first SRS resource set and the second SRS resource set at every two repetitions, for example, if there are eight repetitions of the PUSCH transmission.

A field may be, for example, a sequence-offset-for-RV field (e.g., sequenceOffsetForRV as described herein in FIG. 18). The sequence-offset-for-RV field may indicate an RV offset for a starting RV for the first repetition towards the second SRS resource set.

A wireless device may apply, to a nth transmission occasion, $(\mathrm{mod}(n-1,4)+1)^{th}$ value in a RV sequence, for example, if a plurality of transmission occasions are associated with a first SRS resource set and a second SRS resource set, for the nth transmission occasion, among a plurality of transmission occasions that are associated with the first SRS resource set of a first (e.g., starting, earliest, etc.) transmission occasion of the plurality of transmission occasions. One or more configuration parameters may indicate, for a configured uplink grant, the RV sequence. The wireless device may apply, to the nth transmission occasion, $(\mathrm{mod}(n-1,4)+1)^{th}$ value in an adjusted RV sequence, for example, if a plurality of transmission occasions are associated with the first SRS resource set and the second SRS resource set, for the nth transmission occasion, among the plurality of transmission occasions, that are associated with the second SRS resource set. The wireless device may determine the adjusted RV sequence based on an additional shifting operation on the RV sequence. The additional shifting operation may be defined as $(rv_i+rv_s)\mathrm{mod}\ 4$, for example, if $rv_i$ is the $i^{th}$ RV value (i=1, 2, 3, 4) in the RV sequence, and $rv_s$ is configured and/or indicated by a sequence-offset-for-RV field (e.g., the higher layer parameter sequenceOffsetforRV in configuredGrantConfig).

A wireless device may apply [RV=1, RV=(1+2)mod 4, RV=2, RV=(2+2)mod 4, RV=3, RV=(3+2)mod 4, RV=0, RV=(4+2)mod 4] to the 8 repetitions, respectively, for example, if there are 8 repetitions of a PUSCH transmission, if the RV sequence is [1, 2, 3, 4], and $rv_s$, configured and/or indicated by the sequence-offset-for-RV field, is 2. One or more configuration parameters may indicate, for example, the cyclical mapping pattern.

A wireless device may apply [RV=0, RV=2, RV=(0+1) mod 4, RV=(2+1)mod 4, RV=3, RV=1, RV=(3+1)mod 4, RV=(1+1)mod 4] to the 8 repetitions, respectively, for example, if there are 8 repetitions of a PUSCH transmission, if the RV sequence is [0, 2, 3, 1] and $rv_s$, configured and/or indicated by the sequence-offset-for-RV field, is 1. The one or more configuration parameters may indicate, for example, the sequential mapping pattern.

A wireless device may send (e.g., transmit) repetitions of a PUSCH transmission for a configured uplink grant. The wireless device may send (e.g., transmit), in a plurality of transmission occasions (e.g., PUSCH transmission occasions), repetitions of the PUSCH transmission. The wireless device may send (e.g., transmit), in each transmission occasion of the plurality of transmission occasions, a respective repetition of the repetitions of the PUSCH transmission. The wireless device may send (e.g., transmit), in a first transmission occasion of the plurality of transmission occasions, a first repetition of the repetitions of the PUSCH transmission. The wireless device may send (e.g., transmit), in a second transmission occasion of the plurality of transmission occasions, a second repetition of the repetitions of the PUSCH transmission.

In step 2030 of FIG. 20A, a wireless device may send (e.g., transmit) one or more first repetitions of repetitions of a PUSCH transmission of a configured uplink grant based on a first TCI state (e.g., TCI state 26) of at least two TCI states. In step 2080 of FIG. 20B a base station may receive one or more first repetitions of the PUSCH transmission. The wireless device may send (e.g., transmit) one or more second repetitions of the repetitions of the PUSCH transmission of the configured uplink grant based on a second TCI state (e.g., TCI state 61) of the at least two TCI states.

In step 2040 of FIG. 20A, a wireless device may send (e.g., transmit) one or more first repetitions, for example, based on a first TCI state and one or more second repetitions based on a second TCI state, and based on (e.g., in response to) one or more configuration parameters indicating, for a configured uplink grant, a mapping pattern field (e.g., mappingPattern). In step 2090 of FIG. 20B, a base station may receive the one or more first repetitions.

A wireless device may send (e.g., transmit) one or more first repetitions of repetitions of a PUSCH transmission of a configured uplink grant based on a first TCI state and one or more second repetitions of the repetitions of the PUSCH transmission of the configured uplink grant, for example, based on the second TCI state, and based on (e.g., in response to) one or more configuration parameters indicating, for a configured uplink grant, a mapping pattern field (e.g., mappingPattern).

A wireless device may send (e.g., transmit) one or more first repetitions based on a first TCI state and one or more second repetitions based on a second TCI state, for example, based on (e.g., in response to) the one or more configuration parameters indicating, for the configured uplink grant, the sequence-offset-for-RV field (e.g., sequenceOffsetforRV). The wireless device may send (e.g., transmit) the one or more first repetitions of the repetitions of a PUSCH transmission of a configured uplink grant based on the first TCI state and the one or more second repetitions of the repetitions of the PUSCH transmission of the configured uplink grant based on the second TCI state, for example, based on (e.g., in response to) the one or more configuration parameters indicating, for the configured uplink grant, the sequence-offset-for-RV field (e.g., sequenceOffsetforRV).

A wireless device may send (e.g., transmit) one or more first repetitions of repetitions of a PUSCH transmission of a configured uplink grant based on a first TCI state and one or more second repetitions of the repetitions of the PUSCH transmission of the configured uplink grant based on a second TCI state, for example, based on (e.g., in response to) DCI and/or a control command indicating activation of at least two TCI states comprising the first TCI state and the second TCI state (e.g., as described herein in FIG. 18).

A wireless device may send (e.g., transmit) one or more first repetitions with a first transmission power determined based on one or more first power control parameters (e.g., target received power, pathloss compensation factor, closed-loop index, pathloss reference signal) associated with, mapped to, indicated by, and/or included in a first TCI state. The wireless device may send (e.g., transmit) each repetition of the one or more first repetitions with the first transmission power determined based on the one or more first power control parameters associated with, mapped to, indicated by, and/or included in the first TCI state.

A wireless device may send (e.g., transmit) one or more second repetitions with a second transmission power determined based on one or more second power control parameters (e.g., target received power, pathloss compensation factor, closed-loop index, pathloss reference signal) associated with, mapped to, indicated by, and/or included in a second TCI state. The wireless device may send (e.g., transmit) each repetition of the one or more second repetitions with the second transmission power determined based on the one or more second power control parameters associated with, mapped to, indicated by, and/or included in the second TCI state.

A wireless device may send (e.g., transmit) one or more first repetitions with a first spatial domain transmission filter and/or beam determined based on a first TCI state. The wireless device may send (e.g., transmit) each repetition of the one or more first repetitions with a first spatial domain transmission filter and/or beam determined based on the first TCI state. The wireless device may determine the first spatial domain transmission filter and/or beam based on a spatial domain reception and/or receiving filter and/or beam used to receive a first reference signal indicated by the first TCI state. The first spatial domain transmission filter and/or beam and the spatial domain reception and/or receiving filter and/or beam used to receive the first reference signal may be substantially equivalent (e.g., 1 degree apart, 5 degrees apart, 10 degrees apart, etc.).

A wireless device may send (e.g., transmit) one or more second repetitions with a second spatial domain transmission filter and/or beam determined based on a second TCI state. The wireless device may send (e.g., transmit) each repetition of the one or more second repetitions with the second spatial domain transmission filter and/or beam determined based on the second TCI state. The wireless device may determine the second spatial domain transmission filter and/or beam based on a spatial domain reception and/or receiving filter and/or beam used to receive a second reference signal indicated by the second TCI state. The second spatial domain transmission filter and/or beam and the spatial domain reception and/or receiving filter and/or beam used to receive the second reference signal may substantially equivalent (e.g., 1 degree apart, 5 degrees apart, 10 degrees apart, etc.).

At least one first DMRS antenna port of one or more first repetitions of a PUSCH transmission may be quasi co-located with a first reference signal indicated by a first TCI state. The at least one first DMRS antenna port of each repetition of the one or more first repetitions of the PUSCH transmission may be quasi co-located with the first reference signal indicated by the first TCI state. At least one second DMRS antenna port of one or more second repetitions of the PUSCH transmission may be quasi co-located with a second reference signal indicated by a second TCI state. The at least one second DMRS antenna port of each repetition of the one or more second repetitions of the PUSCH transmission may be quasi co-located with the second reference signal indicated by the second TCI state. At least one first DMRS antenna port and the at least one first DMRS antenna port may be the same. The at least one first DMRS antenna port and the at least one first DMRS antenna port may be different.

A wireless device may send (e.g., transmit) one or more first repetitions of repetitions of a PUSCH transmission of a configured uplink grant based on a first SRS resource set. The wireless device may send (e.g., transmit) one or more second repetitions of the repetitions of the PUSCH transmission of a configured uplink grant based on a second SRS resource set. The wireless device may send (e.g., transmit) the one or more first repetitions based on a first SRS resource set and the one or more second repetitions based on a second SRS resource set, for example, based on (e.g., in response to) one or more configuration parameters indicating, for the configured uplink grant, a mapping pattern field (e.g., mappingPattern). A wireless device may send (e.g., transmit) one or more first repetitions of repetitions of a PUSCH transmission of a configured uplink grant based on a first SRS resource set and one or more second repetitions of the repetitions of a PUSCH transmission of the configured uplink grant based on a second SRS resource set, for example, based on (e.g., in response to) one or more configuration parameters indicating, for the configured uplink grant, a mapping pattern field (e.g., mappingPattern).

A wireless device may send (e.g., transmit) the one or more first repetitions based on the first SRS resource set and the one or more second repetitions based on the second SRS resource set, for example, based on (e.g., in response to) one or more configuration parameters indicating, for the configured uplink grant, a sequence-offset-for-RV field (e.g., sequenceOffsetForRV). A wireless device may send (e.g., transmit) one or more first repetitions of repetitions of a PUSCH transmission of a configured uplink grant based on a first SRS resource set and a one or more second repetitions of the repetitions of the PUSCH transmission of the configured uplink grant based on a second SRS resource set, for example, based on (e.g., in response to) one or more configuration parameters indicating, for the configured uplink grant, a sequence-offset-for-RV field (e.g., sequenceOffsetForRV).

A wireless device may send (e.g., transmit) one or more first repetitions of repetitions of a PUSCH transmission of a configured uplink grant based on a first SRS resource set and one or more second repetitions of the repetitions of the PUSCH transmission of the configured uplink grant based on a second SRS resource set, for example, based on (e.g., in response to) one or more configuration parameters indicating at least two SRS resource sets comprising the first SRS resource set and the second SRS resource set.

A wireless device may send (e.g., transmit) one or more first repetitions based on a first SRS resource in a first SRS resource set. The wireless device may send (e.g., transmit) each repetition of the one or more first repetitions based on the first SRS resource in the first SRS resource set. One or more configuration parameters may indicate, for the first SRS resource, a first quantity of SRS ports (e.g., nrofSRS-Ports). The wireless device may send (e.g., transmit) the one or more first repetitions, for example, based on the first quantity of SRS ports of the first SRS resource in the first SRS resource set. The wireless device may send (e.g., transmit) the one or more first repetitions using a first transmission precoder that is determined based on the first quantity of SRS ports. The wireless device may send (e.g., transmit) each repetition of the one or more first repetitions using the first transmission precoder that may be determined based on the first quantity of SRS ports.

A wireless device may send (e.g., transmit) one or more second repetitions based on a second SRS resource in a second SRS resource set. The wireless device may send (e.g., transmit) each repetition of the one or more second repetitions based on the second SRS resource in the second SRS resource set. The one or more configuration parameters may indicate, for the second SRS resource, a second quantity of SRS ports (e.g., nrofSRS-Ports). The wireless device may send (e.g., transmit) the one or more second repetitions, for example, based on the second quantity of SRS ports of the second SRS resource in the second SRS resource set. The wireless device may send (e.g., transmit) the one or more second repetitions using a second transmission precoder that is determined based on the second quantity of SRS ports. The wireless device may send (e.g., transmit) each repetition of the one or more second repetitions using the second transmission precoder that may be determined based on the second quantity of SRS ports.

A wireless device may send (e.g., transmit) one or more first repetitions in one or more first transmission occasions of a plurality of transmission occasions. The wireless device may send (e.g., transmit) each repetition of the one or more first repetitions in a respective transmission occasion of the one or more first transmission occasions of the plurality of transmission occasions. The wireless device may send (e.g., transmit) the one or more second repetitions in one or more second transmission occasions of the plurality of transmission occasions. The wireless device may send (e.g., transmit) each repetition of the one or more second repetitions in a respective transmission occasion of the one or more second transmission occasions of the plurality of transmission occasions.

One or more configuration parameters may not indicate, for a configured uplink grant, a field. The field may be, for example, a mapping pattern field (e.g., mappingPattern as described herein in FIG. 18). The one or more configuration parameters may not indicate, for the configured uplink grant, the mapping pattern field. The field may be, for example, a sequence-offset-for-RV field (e.g., sequenceOffsetForRV as described herein in FIG. 18). The one or more configuration parameters may not indicate, for the configured uplink grant, the sequence-offset-for-RV field.

A wireless device may send (e.g., transmit) repetitions of a PUSCH transmission of a configured uplink grant, for example, based on a TCI state among a first TCI state and a second TCI state. The wireless device may send (e.g., transmit) each repetition of the repetitions of the PUSCH transmission of the configured uplink grant based on the TCI state. The wireless device may send (e.g., transmit) the repetitions of the PUSCH transmission of the configured uplink grant based on the TCI state, for example, based on (e.g., in response to) one or more configuration parameters not indicating, for the configured uplink grant, the field (e.g., the mapping pattern field, the sequence-offset-for-RV field, etc.).

A wireless device may send (e.g., transmit) repetitions of a PUSCH transmission of a configured uplink grant with a transmission power determined, for example, based on one or more power control parameters (e.g., target received power, pathloss compensation factor, closed-loop index, pathloss reference signal) associated with, mapped to, indicated by, and/or included in a TCI state. The wireless device may send (e.g., transmit) each repetition of the repetitions of the PUSCH transmission of the configured uplink grant with the transmission power.

A wireless device may send (e.g., transmit) repetitions of a PUSCH transmission of a configured uplink grant with a spatial domain transmission filter and/or beam determined, for example, based on a reference signal indicated by a TCI state. The wireless device may send (e.g., transmit) each repetition of the repetitions of the PUSCH transmission of the configured uplink grant with the spatial domain transmission filter and/or beam.

One or more configuration parameters may indicate, for a configured uplink grant, a field (e.g., SRS resource set indicator field, TRP field, coreset pool index, Unified TCI state indicator field, etc.). A value of the field may indicate a TCI state. The TCI state may be a first TCI state, for example, if the value of the field is equal to a first value (e.g., 0). The TCI state may be a second TCI state, for example, if the value of the field is equal to a second value (e.g., 1). The wireless device may send (e.g., transmit) the repetitions of the PUSCH transmission of the configured uplink grant based on the TCI state, for example, based on (e.g., in response to) the value of the field indicating the TCI state.

A TCI state may be identified and/or indicated by a TCI state index that may be lowest among a first TCI state index of a first TCI state and a second TCI state index of a second TCI state. The TCI state may be the first TCI state, for example, based on the first TCI state index of the first TCI state being lower (e.g., less) than the second TCI state index of the second TCI state. The wireless device may send (e.g., transmit) the repetitions of a PUSCH transmission of a configured uplink grant based on the TCI state, for example, based on (e.g., in response to) the first TCI state index of the first TCI state being lower (e.g., less) than the second TCI state index of the second TCI state. The first TCI state index of the first TCI state and the second TCI state index of the second TCI state may comprise the TCI state index of the TCI state.

A TCI state may be a first TCI state, for example, based on a first octet comprising a first TCI state index of the first TCI state being lower (e.g., less) than a second octet comprising a second TCI state index of a second TCI state. A wireless device may send (e.g., transmit) repetitions of a PUSCH transmission of a configured uplink grant based on the TCI state, for example, based on (e.g., in response to) the first octet comprising the first TCI state index of the first TCI state being lower (e.g., less) than the second octet comprising the second TCI state index of the second TCI state. The wireless device may send (e.g., transmit) the repetitions of the PUSCH transmission of the configured uplink grant based on the TCI state, for example, based on (e.g., in response to) the first TCI state index of the first TCI state having a higher ordinal position (e.g., lower octet in the control command) than the second TCI state index of the second TCI state. The wireless device may send (e.g., transmit) the repetitions of the PUSCH transmission of the configured uplink grant based on the TCI state, for example, based on (e.g., in response to) the first TCI state occurring first in the set, list, and/or vector of the at least two TCI states in the control command.

A TCI state may be a first TCI state, for example, based on the first TCI state being associated with a first coreset pool index (e.g., CoresetPoolIndex=0). A wireless device may send (e.g., transmit) repetitions of a PUSCH transmission of a configured uplink grant based on the first TCI state, for example, based on (e.g., in response to) the first TCI state being associated with the first coreset pool index. The wireless device may send (e.g., transmit) the repetitions of the PUSCH transmission of the configured uplink grant based on the first TCI state, for example, based on (e.g., in response to) the first TCI state being activated for the downlink receptions and/or uplink transmissions associated with the first coreset pool index. The wireless device may send (e.g., transmit) the repetitions of the PUSCH transmission of the configured uplink grant based on the first TCI state, for example, based on (e.g., in response to) the first TCI state being activated for the first coreset pool index. The wireless device may send (e.g., transmit) the repetitions of the PUSCH transmission of the configured uplink grant based on the first TCI state, for example, based on (e.g., in response to) the first coreset pool index associated with the first TCI state being lower (e.g., less) than a second coreset pool index associated with a second TCI state.

A TCI state may be associated with a PCI of a cell. A wireless device may send (e.g., transmit) repetitions of a PUSCH transmission of a configured uplink grant based on the TCI state, for example, based on (e.g., in response to) the TCI state being associated with the PCI of the cell.

A wireless device may send (e.g., transmit) repetitions of a PUSCH transmission of a configured uplink grant based on a SRS resource set among a first SRS resource set and a second SRS resource set. The wireless device may send (e.g., transmit) each repetition of repetitions of the PUSCH transmission of the configured uplink grant based on the SRS resource set. The wireless device may send (e.g., transmit) the repetitions of the PUSCH transmission of the configured uplink grant based on the SRS resource set, for example, based on (e.g., in response to) one or more configuration parameters not indicating, for the configured uplink grant, the field (e.g., the mapping pattern field, the sequence-offset-for-RV field).

A wireless device may send (e.g., transmit) repetitions of a PUSCH transmission based on a SRS resource in the SRS resource set. The wireless device may send (e.g., transmit) each repetition of the repetitions based on the SRS resource in the SRS resource set. The one or more configuration parameters may indicate, for the SRS resource, a quantity of SRS ports (e.g., nrofSRS-Ports). The wireless device may send (e.g., transmit) the repetitions, for example, based on the quantity of SRS ports of the SRS resource in the SRS resource set. The wireless device may send (e.g., transmit) the repetitions of the PUSCH transmission using a transmission precoder that is determined based on the quantity of SRS ports. The wireless device may send (e.g., transmit) each repetition of the repetitions using the transmission precoder that is determined based on the quantity of SRS ports.

One or more configuration parameters may indicate, for a configured uplink grant, a field (e.g., SRS resource set indicator field, TRP field, coreset pool index, Unified TCI state indicator field, etc.). A value of the field may indicate a SRS resource set. The SRS resource set may be a first SRS resource set, for example, if the value of the field is equal to a first value (e.g., 0). The SRS resource set may be a second SRS resource set, for example, if the value of the field is equal to a second value (e.g., 1). A wireless device may send (e.g., transmit) repetitions of a PUSCH transmission of a configured uplink grant based on the SRS resource set, for example, based on (e.g., in response to) the value of the field indicating the SRS resource set.

A SRS resource set may be a first SRS resource set, for example, based on a first SRS resource set index of the first SRS resource set being lower (e.g., less) than a second SRS resource set index of a second SRS resource set. A wireless device may send (e.g., transmit) repetitions of a PUSCH transmission of a configured uplink grant based on the SRS resource set, for example, based on (e.g., in response to) the first SRS resource set index of the first SRS resource set being lower (e.g., less) than the second SRS resource set index of the second SRS resource set.

A SRS resource set may be a first SRS resource set, for example, based on the first SRS resource set being associated with a first coreset pool index (e.g., CoresetPoolIndex=0). A wireless device may send (e.g., transmit) repetitions of a PUSCH transmission of a configured uplink grant based on the first SRS resource set, for example, based on (e.g., in response to) the first SRS resource set being associated with the first coreset pool index. The wireless device may send (e.g., transmit) the repetitions of the PUSCH transmission of the configured uplink grant based on the first SRS resource set, for example, based on (e.g., in response to) the first SRS resource set being activated for the downlink receptions and/or uplink transmissions associated with the first coreset pool index. The wireless device may send (e.g., transmit) the repetitions of the PUSCH transmission of the configured uplink grant based on the first SRS resource set, for example, based on (e.g., in response to) the first SRS resource set being activated for the first coreset pool index. The wireless device may send (e.g., transmit) the repetitions of the PUSCH transmission of the configured uplink grant based on the first SRS resource set, for example, based on (e.g., in response to) the first coreset pool index associated with the first SRS resource set being less (e.g., lower) than a second coreset pool index associated with the second SRS resource set.

Figure 21A:
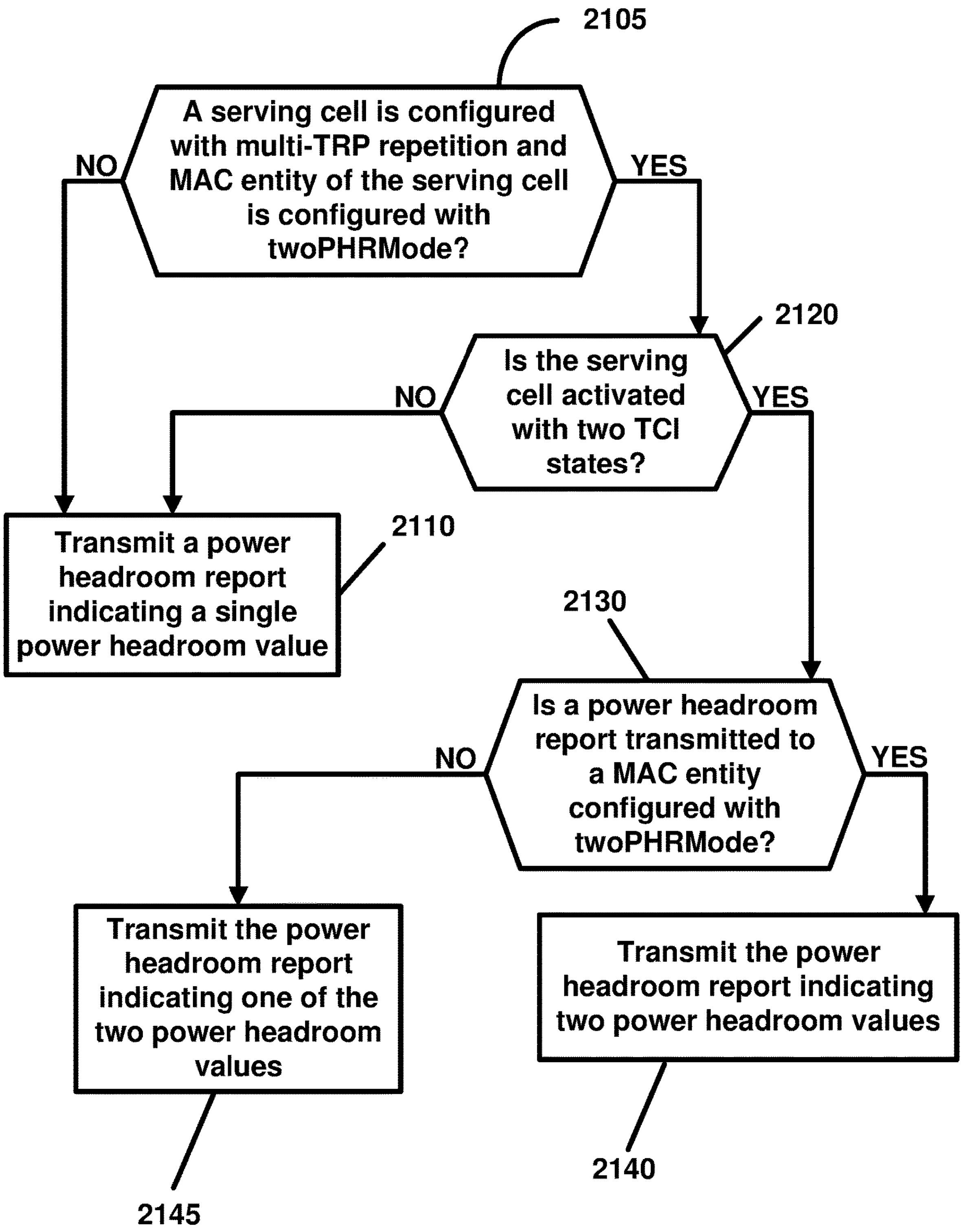
FIG. 21A and FIG. 21B show example flow charts of a power headroom report.
Figure 21B:
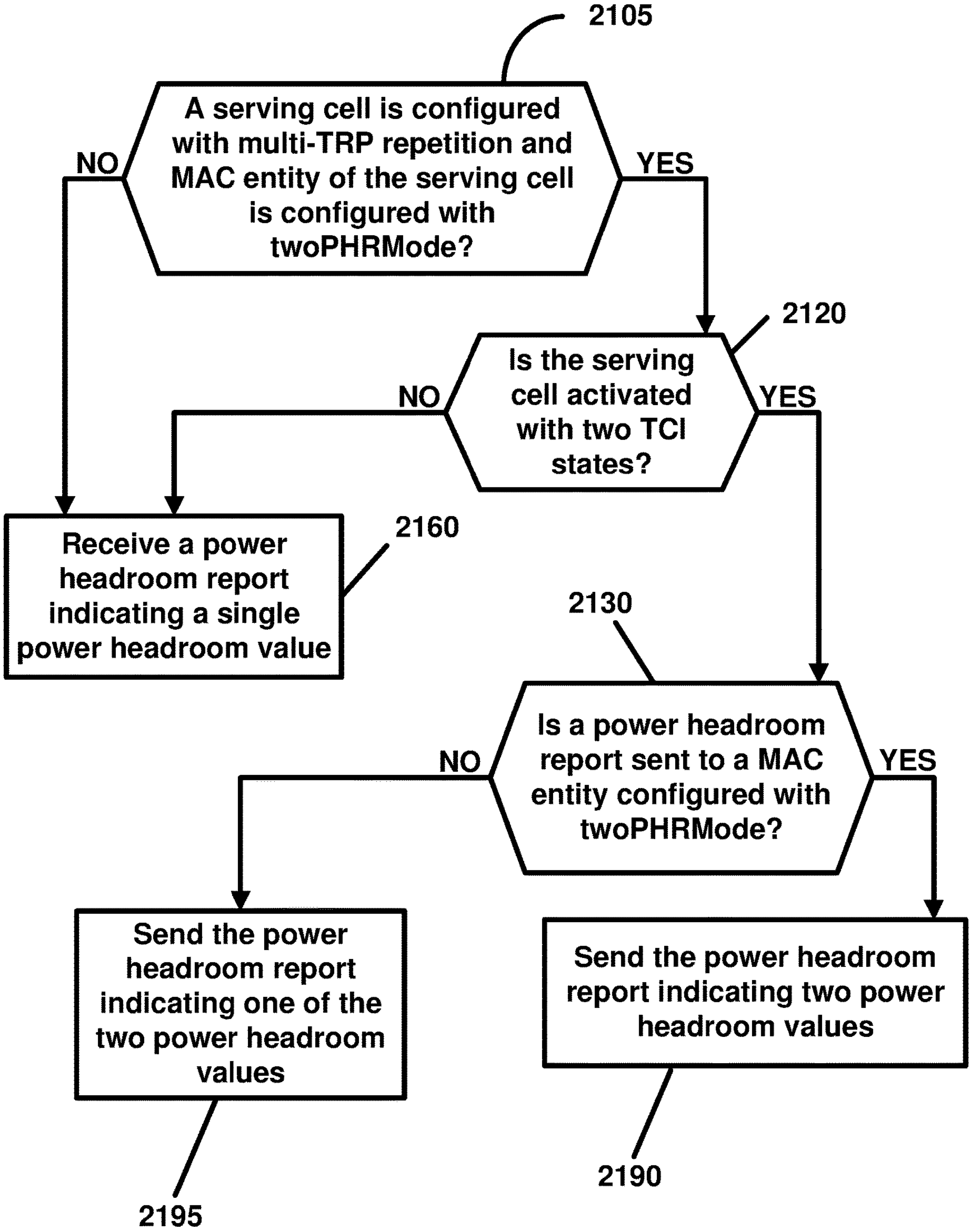

FIG. 21A and FIG. 21B show example flow charts of a power headroom report. In FIG. 21A A wireless device may send (e.g., transmit), via a second cell, a power headroom report. One or more cells may comprise the second cell. The second cell may be an active cell. The one or more configuration parameters may indicate an uplink for the second cell. The second cell may comprise an uplink channel (e.g., PUCCH, PUSCH, SRS), for example, based on the one or more configuration parameters indicating the uplink for the second cell. The wireless device may send (e.g., transmit) the power headroom report in a time slot. A power headroom report may be, for example, a PHR MAC-CE. The PHR MAC-CE may be, for example, Single Entry PHR for multiple TRP MAC CE. The PHR MAC-CE may be, for example, Multiple Entry PHR for multiple TRP MAC CE. The second cell may be associated with a second MAC entity. The second MAC entity may be, for example, E-UTRA MAC entity.

In step 2105 of FIG. 21A, a device may determine, for example, if a cell is configured with multi-TRP repetition. One or more configuration parameters may comprise, for a second MAC entity of a second cell, a two-PHR-mode parameter (e.g., twoPHRMode in PHR-Config). The second MAC entity that the second cell belongs to may be configured, by the one or more configuration parameters, with the two-PHR-mode parameter. The one or more configuration parameters may comprise, for the second MAC entity of the second cell, the two-PHR-mode parameter that is enabled.

A two-PHR-mode parameter may indicate that a wireless device may report two power headroom values, levels, and/or quantities associated with two SRS resource sets. Each power headroom value of the two power headroom values may be associated with a respective SRS resource set of the two SRS resource sets. The wireless device may report the two power headroom values, levels, and/or quantities associated with the two SRS resource sets, for example, if the two-PHR-mode parameter is enabled.

In step 2105 of FIG. 21, a device may determine, for example, if a cell is configured with multi-TRP repetition. A cell may be configured, by one or more configuration parameters, with a multi-TRP PUSCH repetition. An active uplink BWP of the cell may be configured, by the one or more configuration parameters, with the multi-TRP PUSCH repetition. The one or more configuration parameters may indicate, for the cell (e.g., an active uplink BWP of the cell), at least two SRS resource sets for the multi-TRP PUSCH repetition.

For a multi-TRP PUSCH repetition, according to indications of single DCI and/or in a semi-static configured grant share in one or more configuration parameters (e.g., RRC), a wireless device may send (e.g., transmit) a PUSCH transmission of identical contents toward two TRPs with corresponding beam directions associated with different spatial relations.

A cell may be associated with a MAC entity. One or more configuration parameters may indicate, for the MAC entity, a two-PHR-mode parameter (e.g., twoPHRMode in PHR- Config). The MAC entity that the cell may belong to may be configured, by the one or more configuration parameters, with the two-PHR-mode parameter. The one or more configuration parameters may comprise, for the MAC entity of the cell, the two-PHR-mode parameter that may be enabled. The MAC entity and a second MAC entity may be identical. The MAC entity and the second MAC entity may be different.

A wireless device may calculate, obtain, and/or determine at least two Type 1 power headroom values, levels, and/or quantities for an uplink carrier of the cell. The at least two Type 1 power headroom values, levels, and/or quantities may comprise a first Type 1 power headroom value and a second Type 1 power headroom value.

A wireless device may calculate, obtain, and/or determine a first Type 1 power headroom value, for example, for a first TRP. The wireless device may calculate, obtain, and/or determine the first Type 1 power headroom value, for example, for a second TRP. A first Type 1 power headroom value may be, for example, associated with a first SRS resource set. A second Type 1 power headroom value may be, for example, associated with a second SRS resource set. An uplink carrier of a cell may be SUL. An uplink carrier of the cell may be NUL.

A wireless device may calculate, obtain, and/or determine at least two Type 1 power headroom values, levels, and/or quantities for an uplink carrier of a cell, for example, based on the cell being configured, by one or more configuration parameters, with a multi-TRP PUSCH repetition. The wireless device may calculate, obtain, and/or determine the at least two Type 1 power headroom values, levels, and/or quantities for the uplink carrier of the cell, for example, based on the one or more configuration parameters indicating, for the cell (e.g., for an active uplink BWP of the cell), at least two SRS resource sets for the multi-TRP PUSCH repetition.

A wireless device may calculate, obtain, and/or determine at least two Type 1 power headroom values, levels, and/or quantities for an uplink carrier of a cell, for example, based on one or more configuration parameters indicating, for a MAC entity of the cell, a two-PHR-mode parameter. The wireless device may calculate, obtain, and/or determine the at least two Type 1 power headroom values, levels, and/or quantities for the uplink carrier of the cell, for example, based on the MAC entity that the cell may belong to being configured, by the one or more configuration parameters, with the two-PHR-mode parameter.

A wireless device may calculate, obtain, and/or determine at least two Type 1 power headroom values, levels, and/or quantities for an uplink carrier of a cell, for example, based on one or more configuration parameters indicating, for a second MAC entity of a second cell, a two-PHR-mode parameter. The wireless device may calculate, obtain, and/or determine the at least two Type 1 power headroom values, levels, and/or quantities for the uplink carrier of the cell, for example, based on the second MAC entity that the second cell belongs to being configured, by the one or more configuration parameters, with the two-PHR-mode parameter.

In step 2120 of FIG. 21A, a device may determine, for example, if two TCI states are activated for a cell. A wireless device may calculate, obtain, and/or determine at least two Type 1 power headroom values, levels, and/or quantities for an uplink carrier of a cell, for example, based on the at least two TCI states (e.g., TCI state 26 and TCI state 61 as described herein in FIGS. 18 and 19) being activated for the cell. A wireless device may calculate, obtain, and/or determine the at least two Type 1 power headroom values, levels, and/or quantities for the uplink carrier of the cell, for example, based on receiving DCI and/or a control command (e.g., as described herein in FIG. 18) that may indicated activation of the at least two TCI states for the cell.

At least two TCI states may be, for example, at least two joint TCI states. The at least two TCI states may be, for example, at least two uplink TCI states. The at least two TCI states may be, for example, at least two joint and/or downlink TCI states.

A wireless device may calculate, obtain, and/or determine the first Type 1 power headroom value of the at least two Type 1 power headroom values, for example, based on the one or more first power control parameters (e.g., target received power, pathloss compensation factor, closed-loop index, pathloss reference signal) associated with, mapped to, indicated by, and/or included in the first TCI state of the at least two TCI states. The wireless device may calculate, obtain, and/or determine the second Type 1 power headroom value of the at least two Type 1 power headroom values, for example, based on the one or more second power control parameters (e.g., target received power, pathloss compensation factor, closed-loop index, pathloss reference signal) associated with, mapped to, indicated by, and/or included in the second TCI state of the at least two TCI states.

A first TCI state may not be associated with an uplink power control set of the plurality of uplink power control sets. One or more configuration parameters may not indicate, for the first TCI state, an uplink power control set index of the plurality of uplink power control set indexes. Based on the first TCI state not being associated with an uplink power control set of the plurality of uplink power control sets, the wireless device may calculate, obtain, and/or determine the first Type 1 power headroom value of the at least two Type 1 power headroom values, for example, based on one or more first power control parameters (e.g., target received power, pathloss compensation factor, closed-loop index, pathloss reference signal) indicated by a first uplink power control set of the plurality of uplink power control sets.

A second TCI state may not be associated with an uplink power control set of the plurality of uplink power control sets. One or more configuration parameters may not indicate, for the second TCI state, an uplink power control set index of the plurality of uplink power control set indexes. Based on the second TCI state not being associated with an uplink power control set of the plurality of uplink power control sets, the wireless device may calculate, obtain, and/or determine the second Type 1 power headroom value of the at least two Type 1 power headroom values, for example, based on one or more second power control parameters (e.g., target received power, pathloss compensation factor, closed-loop index, pathloss reference signal) indicated by a second uplink power control set of the plurality of uplink power control sets.

A first uplink power control set may be indicated and/or identified by a first uplink power control set index of a plurality of uplink power control set indexes and/or identifiers. The second uplink power control set may be indicated and/or identified by a second uplink power control set index of the plurality of uplink power control set indexes and/or identifiers. A first uplink power control set index may be, for example, equal to a first value (e.g., 0). The second uplink power control set index may be, for example, equal to a second value (e.g., 1).

A first uplink power control set index may be lowest (e.g., smallest, etc.) among a plurality of uplink power control set indexes. The second uplink power control set index may be second lowest (e.g., smallest, etc.) among the plurality of uplink power control set indexes. A first uplink power control set index may be lowest (e.g., smallest, etc.) among one or more first uplink power control set indexes of one or more first uplink power control sets associated with the same PCI as the first TCI state. A plurality of uplink power control set indexes may comprise the one or more first uplink power control set indexes. The plurality of uplink power control sets may comprise the one or more first uplink power control sets. Each uplink power control set of one or more first uplink power control sets may be identified and/or indicated by a respective uplink power control set index of the one or more first uplink power control set indexes.

A second uplink power control set index may be lowest (e.g., smallest, etc.) among one or more second uplink power control set indexes of one or more second uplink power control sets associated with the same PCI as the second TCI state. A plurality of uplink power control set indexes may comprise the one or more second uplink power control set indexes. The plurality of uplink power control sets may comprise the one or more second uplink power control sets. Each uplink power control set of one or more second uplink power control sets may be identified and/or indicated by a respective uplink power control set index of the one or more second uplink power control set indexes.

In step 2140 of FIG. 21A, a device may send (e.g., transmit) a power headroom report indicating two power headroom values. In step 2190 of FIG. 21B a base station may receive the power headroom report. A wireless device may send (e.g., transmit), via a second cell, a power headroom report comprising and/or indicating at least two Type 1 power headroom values, levels, and/or quantities. A wireless device may send (e.g., transmit), via the second cell, the power headroom report comprising and/or indicating the at least two Type 1 power headroom values, levels, and/or quantities, for example, based on calculating/obtaining/determining the at least two Type 1 power headroom values, levels, and/or quantities for the uplink carrier of the cell.

A wireless device may send (e.g., transmit), via a second cell, a power headroom report comprising and/or indicating at least two Type 1 power headroom values, levels, and/or quantities, for example, based on the cell being configured, by the one or more configuration parameters, with the multi-TRP PUSCH repetition. The wireless device may send (e.g., transmit), via the second cell, the power headroom report comprising and/or indicating the at least two Type 1 power headroom values, levels, and/or quantities, for example, based on the one or more configuration parameters indicating, for the cell (or for the active uplink BWP of the cell), the at least two SRS resource sets for the multi-TRP PUSCH repetition.

A wireless device may send (e.g., transmit), via a second cell, a power headroom report comprising and/or indicating at least two Type 1 power headroom values, levels, and/or quantities, for example, based on the one or more configuration parameters indicating, for the MAC entity of the cell, the two-PHR-mode parameter. The wireless device may send (e.g., transmit), via the second cell, the power headroom report comprising and/or indicating the at least two Type 1 power headroom values, levels, and/or quantities, for example, based on the MAC entity that the cell may belong to being configured, by the one or more configuration parameters, with the two-PHR-mode parameter.

A wireless device may send (e.g., transmit), via a second cell, a power headroom report comprising and/or indicating at least two Type 1 power headroom values, levels, and/or quantities, for example, based on the one or more configuration parameters indicating, for the second MAC entity of the second cell, the two-PHR-mode parameter. The wireless device may send (e.g., transmit), via the second cell, the power headroom report comprising and/or indicating the at least two Type 1 power headroom values, levels, and/or quantities, for example, based on the second MAC entity that the second cell belongs to being configured, by the one or more configuration parameters, with the two-PHR-mode parameter.

A wireless device may send (e.g., transmit), via a second cell, a power headroom report comprising and/or indicating at least two Type 1 power headroom values, levels, and/or quantities, for example, based on at least two TCI states (e.g., TCI state 26 and TCI state 61 discussed as described herein in FIG. 18 and FIG. 19) being activated for the cell. The wireless device may send (e.g., transmit), via the second cell, the power headroom report comprising and/or indicating the at least two Type 1 power headroom values, levels, and/or quantities, for example, based on receiving the DCI (or the control command discussed as described herein in FIG. 18) indicating activation of the at least two TCI states for the cell.

At least two TCI states may be, for example, at least two joint TCI states. The at least two TCI states may be, for example, at least two uplink TCI states. The at least two TCI states may be, for example, at least two joint and/or downlink TCI states.

In step 2105, for example, a device may determine if a cell may be configured with multi-TRP repetition. A serving cell, for example, may not be configured for multi-TRP repetition. A cell may be an NR serving cell. A single TCI state (e.g., a single uplink TCI state, a single joint TCI state, a single joint/downlink TCI state, etc.) may be activated for the cell. A control command (e.g., as described herein in FIG. 18) may indicate activation of a TCI state for the cell. The TCI state may be a single TCI state (e.g., a single uplink TCI state, a single joint TCI state, a single joint/downlink TCI state). The control command may indicate activation of the single TCI state for the cell. The quantity of one or more TCI codepoints may be equal to one. The one or more TCI codepoints may be a single TCI codepoint. The single TCI codepoint may indicate and/or comprise a TCI state of a plurality of TCI states. A subset of TCI states may be the TCI state.

A quantity of one or more TCI codepoints may be greater than one. A wireless device may receive second DCI with a second TCI field. The second TCI field may indicate a second TCI codepoint of the one or more TCI codepoints (e.g., as described herein in FIG. 18). A value of the second TCI field may indicate and/or be equal to the second TCI codepoint. The second TCI codepoint may comprise, indicate, and/or be mapped to a TCI state. The second TCI codepoint may comprise, indicate, and/or be mapped to the single TCI state (e.g., a single uplink TCI state, a single joint TCI state, a single joint/downlink TCI state). The subset of TCI states may comprise the TCI state of the second TCI codepoint. The second DCI may indicate activation of the TCI state. A TCI state may be TCI state 42, for example, if the second TCI field is equal to 111 (e.g., as described herein in FIG. 18). The TCI state may be TCI state 4, for example, if the second TCI field 1955 is equal to 000.

A wireless device may calculate, obtain, and/or determine a Type 1 power headroom value, level, and/or quantity for an uplink carrier of a cell, for example, based on a single TCI state being activated for the cell. The wireless device may calculate, obtain, and/or determine the Type 1 power headroom value, level, and/or quantity for the uplink carrier of the cell, for example, based on receiving second DCI and/or a control command that may indicate activation of a TCI state (e.g., a single TCI state) for the cell.

A wireless device may calculate, obtain, and/or determine a Type 1 power headroom value, for example, based on one or more power control parameters (e.g., target received power, pathloss compensation factor, closed-loop index, pathloss reference signal) associated with, mapped to, indicated by, and/or included in a TCI state.

In step 2110 of FIG. 21A, a wireless device may calculate, obtain, and/or determine a Type 1 power headroom value, level, and/or quantity for an uplink carrier of a cell, for example, regardless of the cell being configured, by one or more configuration parameters, with a multi-TRP PUSCH repetition. The wireless device may send (e.g., transmit) the Type 1 power headroom value, level, and/or quantity, for example, based on (e.g., in response to) a single TCI state being activated for the cell, even if the one or more configuration parameters indicate, for the cell and/or for an active uplink BWP of the cell, at least two SRS resource sets for the multi-TRP PUSCH repetition. In step 2160 of FIG. 21B, a base station may receive the type 1 power headroom value.

A wireless device may calculate, obtain, and/or determine a Type 1 power headroom value, level, and/or quantity for an uplink carrier of a cell, for example, regardless of a MAC entity that the cell may belong to being configured, by one or more configuration parameters, with a two-PHR-mode parameter. The wireless device may send (e.g., transmit) the Type 1 power headroom value, level, and/or quantity, for example, based on (e.g., in response to) a single TCI state being activated for the cell, even if the one or more configuration parameters indicate, for the MAC entity of the cell, the two-PHR-mode parameter.

A wireless device may calculate, obtain, and/or determine a Type 1 power headroom value, level, and/or quantity for an uplink carrier of the cell, for example, regardless of a second MAC entity that the second cell belongs to being configured, by one or more configuration parameters, with the two-PHR-mode parameter. The wireless device may send (e.g., transmit) the Type 1 power headroom value, level, and/or quantity, for example, based on (e.g., in response to) a single TCI state being activated for the cell, even if the one or more configuration parameters indicate, for the second MAC entity of the second cell, the two-PHR-mode parameter.

A wireless device may calculate, obtain, and/or determine a single Type 1 power headroom value, level, and/or quantity for an uplink carrier of a cell, for example, based on a single TCI state being activated for the cell. The wireless device may calculate, obtain, and/or determine the single Type 1 power headroom value, level, and/or quantity for the uplink carrier of the cell, for example, based on receiving second DCI and/or a control command that may indicate activation of a TCI state and/or the single TCI state for the cell.

A wireless device may calculate, obtain, and/or determine a single Type 1 power headroom value, level, and/or quantity for an uplink carrier of a cell, for example, regardless of the cell being configured, by one or more configuration parameters, with a multi-TRP PUSCH repetition. The wireless device may send (e.g., transmit) the single Type 1 power headroom value, level, and/or quantity, for example, based on (e.g., in response to) the single TCI state being activated for the cell, even if the one or more configuration parameters indicate, for the cell and/or for an active uplink BWP of the cell, at least two SRS resource sets for the multi-TRP PUSCH repetition.

A wireless device may calculate, obtain, and/or determine a single Type 1 power headroom value, level, and/or quantity for an uplink carrier of the cell, for example, regardless of a MAC entity that the cell may belong to being configured, by one or more configuration parameters, with a two-PHR-mode parameter. The wireless device may send (e.g., transmit) the single Type 1 power headroom value, level, and/or quantity, for example, based on (e.g., in response to) a single TCI state being activated for the cell, even if the one or more configuration parameters indicate, for the MAC entity of the cell, the two-PHR-mode parameter.

A wireless device may calculate, obtain, and/or determine a single Type 1 power headroom value, level, and/or quantity for an uplink carrier of a cell, for example, regardless of a second MAC entity that a second cell may belong to being configured, by one or more configuration parameters, with a two-PHR-mode parameter. The wireless device may send (e.g., transmit) the single Type 1 power headroom value, level, and/or quantity, for example, based on (e.g., in response to) a single TCI state being activated for the cell, even if the one or more configuration parameters indicate, for the second MAC entity of the second cell, the two-PHR-mode parameter. One or more configuration parameters may or may not indicate, for the second MAC entity of the second cell, the two-PHR-mode parameter.

A cell may be an NR Serving Cell. The cell may be an E-UTRA Serving Cell. One or more configuration parameters may not comprise, for a second MAC entity of a second cell, a two-PHR-mode parameter (e.g., twoPHRMode in PHR-Config). The second MAC entity that the second cell may belong to may not be configured, by the one or more configuration parameters, with the two-PHR-mode parameter. One or more configuration parameters may not comprise, for the second MAC entity of the second cell, the two-PHR-mode parameter that is enabled.

A wireless device may select, obtain, and/or determine a Type 1 power headroom value among at least two Type 1 power headroom values, levels, and/or quantities for an uplink carrier of a cell. A wireless device may select, obtain, and/or determine the Type 1 power headroom value among the at least two Type 1 power headroom values, levels, and/or quantities for the uplink carrier of the cell, for example, based on one or more configuration parameters not comprising, for a second MAC entity of a second cell, a two-PHR-mode parameter. The wireless device may select, obtain, and/or determine the Type 1 power headroom value among the at least two Type 1 power headroom values, levels, and/or quantities for the uplink carrier of the cell, for example, based on the second MAC entity that the second cell belongs to not being configured, by the one or more configuration parameters, with the two-PHR-mode parameter.

A wireless device may select, obtain, and/or determine a Type 1 power headroom value among at least two Type 1 power headroom values, for example, based on a cell being configured, by one or more configuration parameters, with a multi-TRP PUSCH repetition. The wireless device may select, obtain, and/or determine the Type 1 power headroom value among the at least two Type 1 power headroom values, for example, based on the one or more configuration parameters indicating, for the cell and/or for an active uplink BWP of the cell, at least two SRS resource sets for the multi-TRP PUSCH repetition.

A wireless device may select, obtain, and/or determine a Type 1 power headroom value among at least two Type 1 power headroom values, for example, based on one or more configuration parameters indicating, for a MAC entity of a cell, a two-PHR-mode parameter. The wireless device may select, obtain, and/or determine the Type 1 power headroom value among the at least two Type 1 power headroom values, for example, based on the MAC entity that the cell may belong to being configured, by the one or more configuration parameters, with the two-PHR-mode parameter.

A wireless device may select, obtain, and/or determine the Type 1 power headroom value among at least two Type 1 power headroom values, for example, based on at least two TCI states (e.g., TCI state 26 and TCI state 61 as described herein in FIGS. 18 and 19) being activated for a cell. The wireless device may select, obtain, and/or determine the Type 1 power headroom value among the at least two Type 1 power headroom values, for example, based on receiving DCI and/or a control command (e.g., as described herein in FIG. 18) that may indicate activation of the at least two TCI states for the cell.

In step 2145 of FIG. 21A, a device may send (e.g., transmit) a power headroom report indicating one of two power headroom values. A Type 1 power headroom value may be one of a first Type 1 power headroom value and a second Type 1 power headroom value. A wireless device may send (e.g., transmit), via a second cell, a power headroom report comprising and/or indicating a Type 1 power headroom value of at least two Type 1 power headroom values. The wireless device may send (e.g., transmit), via the second cell, the power headroom report comprising and/or indicating the first Type 1 power headroom value, for example, if the Type 1 power headroom value is the first Type 1 power headroom value. The power headroom report may not comprise and/or indicate the second Type 1 power headroom value. The wireless device may send (e.g., transmit), via the second cell, the power headroom report comprising and/or indicating the second Type 1 power headroom value, for example, if the Type 1 power headroom value is the second Type 1 power headroom value. The power headroom report may not comprise and/or indicate a first Type 1 power headroom value. In step 2195 of FIG. 21B a base station may receive the power headroom report.

In step 2110 of FIG. 21, a wireless device may send (e.g., transmit), via a second cell, a power headroom report comprising and/or indicating a Type 1 power headroom value of at least two Type 1 power headroom values, for example, based on selecting, obtaining, and/or determining a Type 1 power headroom value among the at least two Type 1 power headroom values.

A wireless device may send (e.g., transmit), via a second cell, a power headroom report comprising and/or indicating a Type 1 power headroom value of at least two Type 1 power headroom values, for example, based on one or more configuration parameters not comprising, for a second MAC entity of a second cell, a two-PHR-mode parameter. The wireless device may send (e.g., transmit), via the second cell, the power headroom report comprising and/or indicating the Type 1 power headroom value of the at least two Type 1 power headroom values, for example, based on the second MAC entity that the second cell may belong to not being configured, decision 2104*b*, by the one or more configuration parameters, with the two-PHR-mode parameter.

A wireless device may send (e.g., transmit), via a second cell, a power headroom report comprising and/or indicating a Type 1 power headroom value of at least two Type 1 power headroom values, for example, based on a cell being configured, by one or more configuration parameters, with a multi-TRP PUSCH repetition. The wireless device may send (e.g., transmit), via the second cell, the power headroom report comprising and/or indicating the Type 1 power headroom value of the at least two Type 1 power headroom values, for example, based on the one or more configuration parameters indicating, for the cell and/or for an active uplink BWP of the cell, at least two SRS resource sets for the multi-TRP PUSCH repetition.

In step 2130, a device may determine if a power headroom report may be transmitted to a MAC entity configured with twoPHRMode. A wireless device may send (e.g., transmit), via the second cell, a power headroom report comprising and/or indicating a Type 1 power headroom value of at least two Type 1 power headroom values, for example, based on one or more configuration parameters indicating, for a MAC entity of the cell, a two-PHR-mode parameter, if the cell is configured with twoPHRMode. The wireless device may send (e.g., transmit), via the second cell, the power headroom report comprising and/or indicating the Type 1 power headroom value of the at least two Type 1 power headroom values, for example, based on the MAC entity that the cell may belong to being configured, by the one or more configuration parameters, with the two-PHR-mode parameter.

A wireless device may send (e.g., transmit), via a second cell, a power headroom report comprising and/or indicating a Type 1 power headroom value of at least two Type 1 power headroom values, for example, based on the at least two TCI states (e.g., TCI state 26 and TCI state 61 as described herein in FIGS. 18 and 19) being activated for the cell. The wireless device may send (e.g., transmit), via the second cell, the power headroom report comprising and/or indicating the Type 1 power headroom value of the at least two Type 1 power headroom values, for example, based on receiving DCI and/or a control command (e.g., as described herein in FIG. 18) that may indicate activation of the at least two TCI states for the cell.

A Type 1 power headroom value may be a Type 1 power headroom value, among a first Type 1 power headroom value and a second Type 1 power headroom value, with the lowest (e.g., smallest, etc.) value. The Type 1 power headroom value may be the first Type 1 power headroom value, for example, if the first Type 1 power headroom value is lower (e.g., smaller, etc.) than the second Type 1 power headroom value. The Type 1 power headroom value may be the second Type 1 power headroom value, for example, if the second Type 1 power headroom value is lower (e.g., smaller, etc.) than the first Type 1 power headroom value.

A Type 1 power headroom value may be a Type 1 power headroom value, among a first Type 1 power headroom value and a second Type 1 power headroom value, with a largest (e.g., highest, greatest, etc.) value. The Type 1 power headroom value may be the first Type 1 power headroom value, for example, if the first Type 1 power headroom value is larger (e.g., higher, greater, etc.) than the second Type 1 power headroom value. The Type 1 power headroom value may be the second Type 1 power headroom value, for example, if the second Type 1 power headroom value is larger (e.g., higher, greater, etc.) than the first Type 1 power headroom value.

A Type 1 power headroom value may be a first Type 1 power headroom value, for example, based on the first Type 1 power headroom value being associated with a first SRS resource set. The Type 1 power headroom value may be the first Type 1 power headroom value, for example, based on one or more configuration parameters indicating, for the first SRS resource set associated with the first Type 1 power headroom value, a first SRS resource set index that may be lower (e.g., less) than a second SRS resource set index of a second SRS resource set. The Type 1 power headroom value may be the first Type 1 power headroom value, for example, based on the first SRS resource set index of the first SRS resource set associated with the first Type 1 power headroom value being lower (e.g., less) than the second SRS resource set index of the second SRS resource set.

A Type 1 power headroom value may be a Type 1 power headroom value, among a first Type 1 power headroom value and a second Type 1 power headroom value, determined based on a TCI state, among a first TCI state and a second TCI state, with a lowest (e.g., smallest, etc.) TCI state index among a first TCI state index and a second TCI state index. The first TCI state index of the first TCI state may be lower (e.g., less) than the second TCI state index of the second TCI state. The Type 1 power headroom value may be the first Type 1 power headroom value calculated, obtained, and/or determined based on the first TCI state, for example, based on the first TCI state index of the first TCI state being lower (e.g., less) than the second TCI state index of the second TCI state. The second TCI state index of the second TCI state may be lower (e.g., less) than the first TCI state index of the first TCI state. The Type 1 power headroom value may be the second Type 1 power headroom value calculated, obtained, and/or determined based on the second TCI state, for example, based on the second TCI state index of the second TCI state being lower (e.g., less) than the first TCI state index of the first TCI state.

A Type 1 power headroom value may be a first Type 1 power headroom value calculated, obtained, and/or determined based on a first TCI state, for example, based on a first octet comprising a first TCI state index of a first TCI state being lower (e.g., less) than a second octet comprising a second TCI state index of a second TCI state. The Type 1 power headroom value may be the first Type 1 power headroom value calculated, obtained, and/or determined based on the first TCI state, for example, based on the first octet comprising the first TCI state index of the first TCI state being lower (e.g., less) than the second octet comprising the second TCI state index of the second TCI state. The Type 1 power headroom value may be the first Type 1 power headroom value calculated, obtained, and/or determined based on the first TCI state, for example, based on the first TCI state index of the first TCI state having a higher ordinal position (e.g., a lower octet in the control command) than the second TCI state index of the second TCI state. The Type 1 power headroom value may be the first Type 1 power headroom value calculated, obtained, and/or determined based on the first TCI state, for example, based on the first TCI state occurring first in the set, list, and/or vector of the at least two TCI states in a control command.

A Type 1 power headroom value may be a Type 1 power headroom value, among a first Type 1 power headroom value and a second Type 1 power headroom value, determined based on a TCI state, among a first TCI state and a second TCI state, associated with a PCI of a cell. The first TCI state may be associated with the PCI of the cell. The second TCI state may be associated with a second PCI different from the PCI of the cell. The Type 1 power headroom value may be the first Type 1 power headroom value calculated, obtained, and/or determined based on the first TCI state, for example, based on the first TCI state being associated with the PCI of the cell. The second TCI state may be associated with the PCI of the cell. The first TCI state may be associated with a second PCI different from the PCI of the cell. The Type 1 power headroom value may be the second Type 1 power headroom value calculated, obtained, and/or determined based on the second TCI state, for example, based on the second TCI state being associated with the PCI of the cell.

A wireless device may send (e.g., transmit), via a cell, a PUSCH transmission in a time slot. The wireless device may send (e.g., transmit) the PUSCH transmission and a power headroom report in the time slot. The PUSCH transmission may overlap in time (e.g., at least one symbol) with transmission of the power headroom report. The PUSCH transmission may be an actual PUSCH transmission, for example, based on the PUSCH transmission overlapping in time (e.g., in a same time slot) with transmission of the power headroom report. A PUSCH transmission may be, for example, a first, earliest, and/or starting repetition, of repetitions of a PUSCH transmission, that may overlap with a transmission of a power headroom report.

A Type 1 power headroom value may be a Type 1 power headroom value, among a first Type 1 power headroom value and a second Type 1 power headroom value, determined based on a TCI state, among a first TCI state and a second TCI state, used and/or applied for a PUSCH transmission.

A wireless device may send (e.g., transmit), based on a first TCI state, a PUSCH transmission that may overlap with transmission of a power headroom report. A Type 1 power headroom value may be a first Type 1 power headroom value calculated, obtained, and/or determined based on a first TCI state, for example, based on (e.g., in response to) sending (e.g., transmitting), based on the first TCI state, the PUSCH transmission that may overlap with transmission of the power headroom report.

A wireless device may send (e.g., transmit), based on a second TCI state, a PUSCH transmission that may overlap with transmission of a power headroom report. A Type 1 power headroom value may be a second Type 1 power headroom value calculated, obtained, and/or determined based on a second TCI state, for example, based on (e.g., in response to) sending (e.g., transmitting), based on the second TCI state, the PUSCH transmission that may overlap with transmission of the power headroom report.

A first Type 1 power headroom value may be a first actual Type 1 power headroom value. The first Type 1 power headroom value may be a first virtual and/or reference Type 1 power headroom value. A second Type 1 power headroom value may be a second actual Type 1 power headroom value. The second Type 1 power headroom value may be a second virtual and/or reference Type 1 power headroom value.

A base station and a wireless device may be both aligned on a TCI state used for a power headroom report calculation. The base station knows the transmission power status of the correct TRP, so that the base station can allocate a more accurate transmission power for future uplink transmissions of the corresponding TRP.

A wireless device may receive a message indicating and/or activating one or more transmission configuration indicator (TCI) states for a cell. The wireless device may send (e.g., transmit) a power headroom report (PHR) comprising one or more power headroom values for the cell. The PHR may comprise a single power headroom value based on the one or more TCI states being a single TCI state. Alternatively, the PHR may comprise two power headroom values based on the one or more TCI states comprising two TCI states. The wireless device may determine that the quantity of states of the one or more TCI states may be two.

The wireless device may send (e.g., transmit) a PHR that comprises two Type 1 power headroom values. The two Type 1 power headroom values may be determined based on the two TCI states. The wireless device may receive one or more messages comprising one or more configuration parameters. The one or more configuration parameters may indicate a multiple transmission-reception-point (TRP) physical uplink shared channel (PUSCH) repetition of a cell, and a two power headroom report mode (two-PHR-Mode) that may report two power headroom values for the cell. A first power headroom value of the one or more power headroom values may be associated with a first SRS resource set, and a second power headroom value of the one or more power headroom values that may be associated with a second SRS resource set. Sending (e.g., transmitting) may be via a second cell associated with a medium-access control (MAC) entity. Sending (e.g., transmitting) may comprise sending (e.g., transmitting), in a time slot, a PHR MAC control element (PHR MAC-CE) comprising the one or more power headroom values. The wireless device may receive one or more messages comprising one or more configuration parameters. The one or more configuration parameters may indicate a multiple transmission-reception-point (TRP) repetition for the cell, a two power headroom report mode (two-PHR-Mode) for a MAC entity associated with the cell, and a no two-PHR-Mode for the MAC entity associated with the second cell. The two-PHR-Mode may indicate reporting of two power headroom values associated with two sounding reference signal (SRS) resource sets. A first power headroom value may be determined based on a first TCI state of the one or more TCI states, and a second power headroom value may be determined based on a second TCI state of the one or more TCI states. A first TCI state of the one or more TCI states has a lowest TCI state index among one or more TCI state indexes of the one or more TCI states. The one or more TCI states may be one or more joint TCI states, or one or more uplink TCI states. The PHR may be triggered. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements, and a base station configured to communicate with the wireless device. A computer-readable medium may store instructions that, when executed, cause performance of the described method, additional operations, and/or include the additional elements.

A wireless device may receive a message that may indicate one or more transmission configuration indicator (TCI) states. A power headroom (PHR) for a cell may be triggered. The wireless device may send (e.g., transmit) one or more power headroom values based on a quantity of the one or more TCI states that may be indicated. The one or more power headroom values may comprise one power headroom value based on the one or more TCI states comprising a single TCI state. The one power headroom value may be determined based on the single TCI state. Alternatively, the one or more power headroom values may comprise two power headroom values based on the one or more TCI states comprising two TCI states. The two power headroom values may be determined based on the two TCI states. The wireless device may receive one or more messages comprising one or more configuration parameters. The wireless device may determine that the one or more TCI states may be two states. The wireless device may determine that the quantity of states of the one or more TCI states is two, wherein the one or more power headroom values comprises at least two power headroom values that may be based on the one or more configuration parameters that may indicate a multiple transmission-reception-point (TRP) repetition for the cell, a two power headroom report mode (two-PHR-Mode) for a MAC entity that may be associated with the cell, and a two-PHR-Mode for the MAC entity that may be associated with a second cell. The two-PHR-Mode may indicate reporting of two power headroom values associated with two sounding reference signal (SRS) resource sets. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements, and a base station configured to communicate with the wireless device. A computer-readable medium may store instructions that, when executed, cause performance of the described method, additional operations, and/or include the additional elements.

A wireless device may receive one of more configuration parameters that may indicate a multiple transmission-reception-point (TRP) repetition, and a two power headroom report mode (two-PHR-Mode). The wireless device may receive a message that may indicate one or more transmission configuration indicator (TCI) states. The wireless device may send, based on a quantity of states the one or more TCI states being two, a power headroom report (PHR) comprising two power headroom Type 1 values. The one or more configuration parameters may indicate a plurality of uplink power control sets comprising a first uplink power control set and a second uplink power control set. The one or more configuration parameters may indicate a plurality of uplink power control sets that may comprise a first uplink power control set and a second uplink power control set. The one or more configuration parameters may indicate, for a first TCI state of the one or more TCI states, the first uplink power control set, and for a second TCI state of the one or more TCI states, a second uplink power control set. The one or more configuration parameters may indicate a multiple transmission-reception-point (TRP) repetition for the cell, a two power headroom report mode (two-PHR-Mode) for a MAC entity that may be associated with the cell, and no two-PHR-Mode for the MAC entity that may be associated with the second cell. The two-PHR-Mode may indicate a reporting of two power headroom values associated with two sounding reference signal (SRS) resource sets. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements, and a base station configured to communicate with the wireless device. A computer-readable medium may store instructions that, when executed, cause performance of the described method, additional operations, and/or include the additional elements.

A wireless device may receive a message that may indicate one or more transmission configuration indicator (TCI) states. A power headroom report (PHR) for a cell may be triggered. The wireless device may send (e.g., transmitting), based on a quantity of states of the one or more TCI states that may indicate for the cell, for the PHR, one or more power headroom values. The wireless device may receive one or more messages that may comprise one or more configuration parameters. The one or more configuration parameters may indicate a plurality of uplink power control sets that may comprise a first uplink power control set and a second uplink power control set. The one or more configuration parameters may indicate, for a first TCI state of the one or more TCI states, a first uplink power control set. The one or more configuration parameters may indicate, for a second TCI state of the one or more TCI states, a second uplink power control set. The first uplink power control set may be an uplink power control set, among the plurality of uplink power control sets, with a first uplink power control set index that may be equal to zero based on the one or more configuration parameters that may not indicate, for a first TCI state of the one or more TCI states, an uplink power control set that may be among the plurality of uplink power control sets. The second uplink power control set may be an uplink power control set, among the plurality of uplink power control sets, with a second uplink power control set index that may be equal to one based on the one or more configuration parameters that may not indicate, for a second TCI state of the one or more TCI states, an uplink power control set that may be among the plurality of uplink power control sets. The first uplink power control set may be an uplink power control set, among the plurality of uplink power control sets, that may have a lowest uplink power control set index based on the one or more configuration parameters that may not indicate, for a first TCI state of the one or more TCI states, an uplink power control set that may be among the plurality of uplink power control sets. The second uplink power control set may be an uplink power control set, that may be among the plurality of uplink power control sets, that may have a second lowest uplink power control set index based on the one or more configuration parameters that may not indicate, for a second TCI state of the one or more TCI states, an uplink power control set that may be among the plurality of uplink power control sets. The first uplink power control set may be an uplink power control set, among one or more first uplink power control sets that may be associated with a physical cell identifier (PCI) of a first TCI state of the one or more TCI states, that may have a lowest uplink power control set index based on the one or more configuration parameters that may not indicate, for the first TCI state of the one or more TCI states, an uplink power control set that may be among the plurality of uplink power control sets. The plurality of uplink power control sets may comprise the one or more first uplink power control sets. The second uplink power control set may be an uplink power control set, among one or more second uplink power control sets that may be associated with a physical cell identifier (PCI) of a second TCI state of the one or more TCI states, that may have a lowest uplink power control set index based on the one or more configuration parameters that may not indicate, for the second TCI state of the one or more TCI states, an uplink power control set that may be among the plurality of uplink power control sets. The plurality of uplink power control sets comprise the one or more second uplink power control sets. The one or more power headroom values may be one or more Type 1 power headroom values. The one or more power headroom values may be one/single power headroom value. The quantity of the one or more TCI states may be equal to two. The wireless device may determine the one/single power headroom value that may be based on power control parameters of a physical uplink shared channel (PUSCH) transmission that may occur in the time slot of the PHR MAC-CE. The PUSCH transmission may be a real PUSCH transmission. The PUSCH transmission may be an earliest PUSCH transmission among one or more PUSCH transmissions that may be in the time slot. One/single power headroom value may be a first power headroom value that may be associated with a first sounding reference signal (SRS) resource set of two SRS resource sets of the cell. The one or more configuration parameters may indicate, for the first SRS resource set, a SRS resource set index that may be lower than an SRS resource set index of a second SRS resource set of the two SRS resource sets. The one/single power headroom value may be the first power headroom value that may be associated with the first SRS resource set based on no real PUSCH transmission that may occur in the time slot of PHR MAC-CE. The one/single power headroom value may be determined based on a first TCI state of the one or more TCI states. The first TCI state may occur first in a list of the one or more TCI states. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements, and a base station configured to communicate with the wireless device. A computer-readable medium may store instructions that, when executed, cause performance of the described method, additional operations, and/or include the additional elements.

A wireless device may receive one or more messages that may comprise one or more configuration parameters of a cell. The one or more configuration parameters may indicate a multiple transmission-reception-point (TRP) physical uplink shared channel (PUSCH) repetition, and a two power headroom report mode (two-PHR-Mode) that may indicate reporting of two power headroom values for the cell. The wireless device may receive a message that may indicate one or more transmission configuration indicator (TCI) states for the cell. A power headroom report (PHR) for the cell may be triggered. The wireless device may send, based on a quantity of the one or more TCI states that may indicate for the cell, for the PHR, one or more Type 1 power headroom values. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements, and a base station configured to communicate with the wireless device. A computer-readable medium may store instructions that, when executed, cause performance of the described method, additional operations, and/or include the additional elements.

A wireless device may receive configuration parameters that may indicate a multiple transmission-reception-point (TRP) repetition for a cell and a two power headroom report mode (two-PHR-Mode) for the cell. The wireless device may receive a message indicating one or more transmission configuration indicator (TCI) states for the cell. The wireless device may send, based on a quantity of the one or more TCI states being equal to two, a power headroom report (PHR) that may comprise two power headroom Type 1 values for the cell. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements, and a base station configured to communicate with the wireless device. A computer-readable medium may store instructions that, when executed, cause performance of the described method, additional operations, and/or include the additional elements.

A wireless device may send, based on a quantity of one or more transmission configuration indicator (TCI) states of a cell being equal to two, a power headroom report (PHR) comprising two power headroom Type 1 values for the cell. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements, and a base station configured to communicate with the wireless device. A computer-readable medium may store instructions that, when executed, cause performance of the described method, additional operations, and/or include the additional elements.

A wireless device may receive one or more configuration parameters, of a configured uplink grant. The one or more configuration parameters may indicate a mapping pattern field for repetitions of a physical uplink shared channel (PUSCH) transmission or a sequence offset field indicating a redundancy version offset for a PUSCH repetition. The wireless device may receive a message that may indicate two or more transmission configuration indicator (TCI) states. The wireless device may send, based on the one or more configuration parameters that may indicate one or more first repetitions of a PUSCH transmission of the configured uplink grant that may be based on a first TCI state of the at least two TCI states, and one or more second repetitions of the PUSCH transmission of the configured uplink grant may be based on a second TCI state of the at least two TCI states. The mapping pattern may be one of a cyclical mapping or a sequential mapping. The one or more configuration parameters may indicate at least two sounding reference signal (SRS) resource sets that may comprise a first SRS resource set and a second SRS resource set. The sequence offset field may indicate the redundancy version offset for a starting redundancy version for a starting PUSCH repetition that may be associated with a second SRS resource set. The wireless device may send based on the message that may indicate the at least two TCI states. The wireless device may send the one or more first repetitions of the PUSCH transmission with a first transmission power determined based on the first TCI state and the one or more second repetitions of the PUSCH transmission with a second transmission power determined based on the second TCI state. Sending the one or more first repetitions of the PUSCH transmission may be with a first spatial domain transmission filter that may be determined based on the first TCI state, and the one or more second repetitions of the PUSCH transmission may be with a second spatial domain transmission filter that may be determined based on the second TCI state. The one or more first repetitions may be associated with a first SRS resource set. The one or more second repetitions may be associated with a second SRS resource set. Sending the one or more first repetitions of the PUSCH transmission may be with a first transmission precoder that may be determined based on a first SRS resource in a first SRS resource set, and the one or more second repetitions of the PUSCH transmission may be with a second transmission precoder that may be determined based on a second SRS resource in a second SRS resource set. The one or more configuration parameters do not indicate, for a second configured uplink grant a mapping pattern field or a sequence offset field. The wireless device may send, based on the one or more configuration parameters that may not indicate, for a second configured uplink grant, a mapping pattern field or a sequence offset field, each repetition of a second PUSCH transmission of the second configured uplink grant may be based on a third TCI state among the at least two TCI states. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements, and a base station configured to communicate with the wireless device. A computer-readable medium may store instructions that, when executed, cause performance of the described method, additional operations, and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or cap ability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, 6G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, 6G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
- receiving, by a wireless device, a first message comprising configuration parameters that indicate a two power headroom report (PHR) mode for a first medium access control (MAC) entity of a first cell;
- receiving a second message activating two transmission configuration indicator (TCI) states for the first cell;
- obtaining, based on a second MAC entity of a second cell not being configured with the two PHR mode, a power headroom value for the first cell, wherein the power headroom value is based on power control parameters associated with one of the two TCI states; and
- sending, via the second cell, a PHR comprising the power headroom value.

2. The method of claim 1, wherein the power headroom value comprises a Type 1 power headroom value.

3. The method of claim 1, wherein the configuration parameters indicate:
- a multiple transmission-reception-point (TRP) physical uplink shared channel (PUSCH) repetition of the first cell.

4. The method of claim 1, wherein the power headroom value is associated with a sounding reference signal (SRS) resource set.

5. The method of claim 1, wherein the sending comprises sending, in a time slot, a PHR MAC control element (PHR MAC-CE) comprising the power headroom value.

6. The method of claim 1, wherein the configuration parameters do not indicate: a two PHR mode for the second MAC entity associated with the second cell.

7. The method of claim 1, wherein the one of the two TCI states has a lowest TCI state index among one or more TCI state indexes of the two TCI states.

8. The method of claim 1, further comprising triggering the PHR for the first cell.

9. A wireless device comprising:
- one or more processors; and
- memory storing instructions that, when executed by the one or more processors, cause the wireless device to:

receive a first message comprising configuration parameters that indicate a two power headroom report (PHR) mode for a first medium access control (MAC) entity of a first cell;

receive a second message activating two transmission configuration indicator (TCI) states for the first cell;

obtain, based on a second MAC entity of a second cell not being configured with the two PHR mode, a power headroom value for the first cell, wherein the power headroom value is based on power control parameters associated with one of the two TCI states; and send, via the second cell, a PHR comprising the power headroom value.

10. The wireless device of claim 9, wherein the power headroom value comprises a Type 1 power headroom value.

11. The wireless device of claim 9, wherein the configuration parameters indicate:

a multiple transmission-reception-point (TRP) physical uplink shared channel (PUSCH) repetition of the first cell.

12. The wireless device of claim 9, wherein the power headroom value is associated with a sounding reference signal (SRS) resource set.

13. The wireless device of claim 9, wherein the instructions, when executed by the one or more processors, cause the wireless device to send the PHR by sending, in a time slot, a PHR MAC control element (PHR MAC-CE) comprising the power headroom value.

14. The wireless device of claim 9, wherein the configuration parameters do not indicate a two PHR mode for the second MAC entity associated with the second cell.

15. The wireless device of claim 9, wherein the one of the two TCI states has a lowest TCI state index among one or more TCI state indexes of the two TCI states.

16. The wireless device of claim 9, wherein the instructions, when executed by the one or more processors, cause the wireless device to trigger the PHR for the first cell.

17. One or more non-transitory computer-readable media storing instructions that, when executed, cause a wireless device to:

receive a first message comprising configuration parameters that indicate a two PHR mode for a first medium access control (MAC) entity of a first cell;

receive a second message activating two transmission configuration indicator (TCI) states for the first cell;

obtain, based on a second MAC entity of a second cell not being configured with the two PHR mode, a power headroom value for the first cell, wherein the power headroom value is based on power control parameters associated with one of the two TCI states; and send, via the second cell, a PHR comprising the power headroom value.

18. The one or more non-transitory computer-readable media of claim 17, wherein the power headroom value comprises a Type 1 power headroom value.

19. The one or more non-transitory computer-readable media of claim 17, wherein the configuration parameters indicate:

a multiple transmission-reception-point (TRP) physical uplink shared channel (PUSCH) repetition of the first cell.

20. The one or more non-transitory computer-readable media of claim 17, wherein the power headroom value is associated with a sounding reference signal (SRS) resource set.

21. The one or more non-transitory computer-readable media of claim 17, wherein the instructions, when executed, cause the wireless device to send the PHR by sending, in a time slot, a PHR MAC control element (PHR MAC-CE) comprising the power headroom value.

22. The one or more non-transitory computer-readable media of claim 17, wherein the configuration parameters do not indicate a two PHR mode for the second MAC entity associated with the second cell.

23. The one or more non-transitory computer-readable media of claim 17, wherein the one of the two TCI states has a lowest TCI state index among one or more TCI state indexes of the two TCI states.

24. The one or more non-transitory computer-readable media of claim 17, wherein the instructions, when executed, cause the wireless device to trigger the PHR for the first cell.

* * * * *